US008281156B2

(12) United States Patent
Takashima et al.

(10) Patent No.: US 8,281,156 B2
(45) Date of Patent: Oct. 2, 2012

(54) INFORMATION PROCESSING DEVICE, INFORMATION RECORDING MEDIUM, INFORMATION PROCESSING METHOD, AND COMPUTER PROGRAM

(75) Inventors: Yoshikazu Takashima, Tokyo (JP); Tateo Oishi, Saitama (JP); Katsumi Muramatsu, Tokyo (JP); Kenjiro Ueda, Kanagawa (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1211 days.

(21) Appl. No.: 11/815,744

(22) PCT Filed: Feb. 16, 2006

(86) PCT No.: PCT/JP2006/302701
§ 371 (c)(1),
(2), (4) Date: Aug. 7, 2007

(87) PCT Pub. No.: WO2006/090628
PCT Pub. Date: Aug. 31, 2006

(65) Prior Publication Data
US 2009/0010437 A1 Jan. 8, 2009

(30) Foreign Application Priority Data
Feb. 25, 2005 (JP) .................................. 2005-051631

(51) Int. Cl.
*G06F 21/00* (2006.01)
(52) U.S. Cl. ............ 713/193; 705/51; 705/52; 709/201; 380/203
(58) Field of Classification Search .................... 713/193
See application file for complete search history.

(56) References Cited

U.S. PATENT DOCUMENTS

| 5,450,489 A | * | 9/1995 | Ostrover et al. ............... 705/51 |
| 5,513,260 A | * | 4/1996 | Ryan ............................. 380/200 |
| 5,784,464 A | * | 7/1998 | Akiyama et al. ............. 713/155 |
| 6,125,232 A | * | 9/2000 | Taira et al. ...................... 386/95 |

(Continued)

FOREIGN PATENT DOCUMENTS

JP  9-259237  10/1997

(Continued)

OTHER PUBLICATIONS

Blu-ray Disc™ Format|http://www.blu-raydisc.com/Assets/Downloadablefile/BD-R_physical_specifications-18326.pdf|Blu-ray Disc Association|5th Edition|Oct. 2010.*

(Continued)

*Primary Examiner* — Taghi Arani
*Assistant Examiner* — Mahfuzur Rahman
(74) *Attorney, Agent, or Firm* — K&L Gates LLP

(57) ABSTRACT

A data placement configuration which ensures seamless playback of contents having segment portions including multiple different variations of encrypted data is provided. With regard to contents having segment portions configured of multiple different variations of encrypted data to which individual segment keys have been applied, and non-segment portions serving as encrypted data to which a unit key has been applied, the placement of segment data and non-segment portion configuration data is determined such that the maximum jump distance executed at the time of playback processing is equal to or less than a maximum jump distance set beforehand. Data placement has been determined based on seek time, ECC block processing time, sequence key usage time which is key switchover time, and so forth.

8 Claims, 36 Drawing Sheets

U.S. PATENT DOCUMENTS

| | | | |
|---|---|---|---|
| 6,181,872 B1 * | 1/2001 | Yamane et al. | 386/112 |
| 6,263,313 B1 * | 7/2001 | Milsted et al. | 705/50 |
| 6,289,102 B1 * | 9/2001 | Ueda et al. | 380/201 |
| 6,389,538 B1 * | 5/2002 | Gruse et al. | 713/194 |
| 6,922,521 B2 * | 7/2005 | Okada et al. | 386/83 |
| 7,706,531 B2 * | 4/2010 | Yoshida et al. | 380/201 |
| 2004/0076402 A1 * | 4/2004 | Jung et al. | 386/69 |
| 2004/0105351 A1 * | 6/2004 | Ueki | 369/30.23 |

FOREIGN PATENT DOCUMENTS

| | | |
|---|---|---|
| JP | 9-274769 | 10/1997 |
| JP | HEI 09-259527 | 10/1997 |
| JP | HEI 09-274769 | 10/1997 |
| JP | 11-168711 | 6/1999 |
| JP | HEI 11-168711 | 6/1999 |
| JP | 2002-093047 | 3/2002 |
| JP | 2002-330407 | 11/2002 |
| JP | 2004-328450 | 11/2004 |
| JP | 2007-328450 | 11/2004 |

OTHER PUBLICATIONS

International Search Report (3 pages).

International Preliminary Report on Patentability for International Application No. PCT/JP2006/302701.

Japanese Office Action issued on Nov. 16, 2010, for corresponding Japanese Patent Appln. No. 2005-051631.

* cited by examiner

FIG. 5

| INDEX<br>INDEX DISTINGUISHABLE AT APPLICATION LAYER, SUCH AS TITLES, ETC. | CONTENT MANAGEMENT UNIT NO.<br>(CPS UNIT NO.) | UNIT CLASSIFICATION NO.<br>(MOVIE SEQUENCE NO.) | ENCRYPTED CPS UNIT KEY |
|---|---|---|---|
| TITLE 1 | CPS1 | 14 | [Ku1] |
| TITLE 2 | CPS1 | 14 | [Ku1] |
| APPLICATION 1 | CPS2 | 35 | [Ku2] |
| APPLICATION 2 | CPS3 | 22 | [Ku3] |
| . . | . . | . . | . . |
| DATA GROUP 1 | CPS4 | 138 | [Ku4] |
| DATA GROUP 2 | CPS5 | 3 | [Ku5] |
| . . | . . | . . | . . |

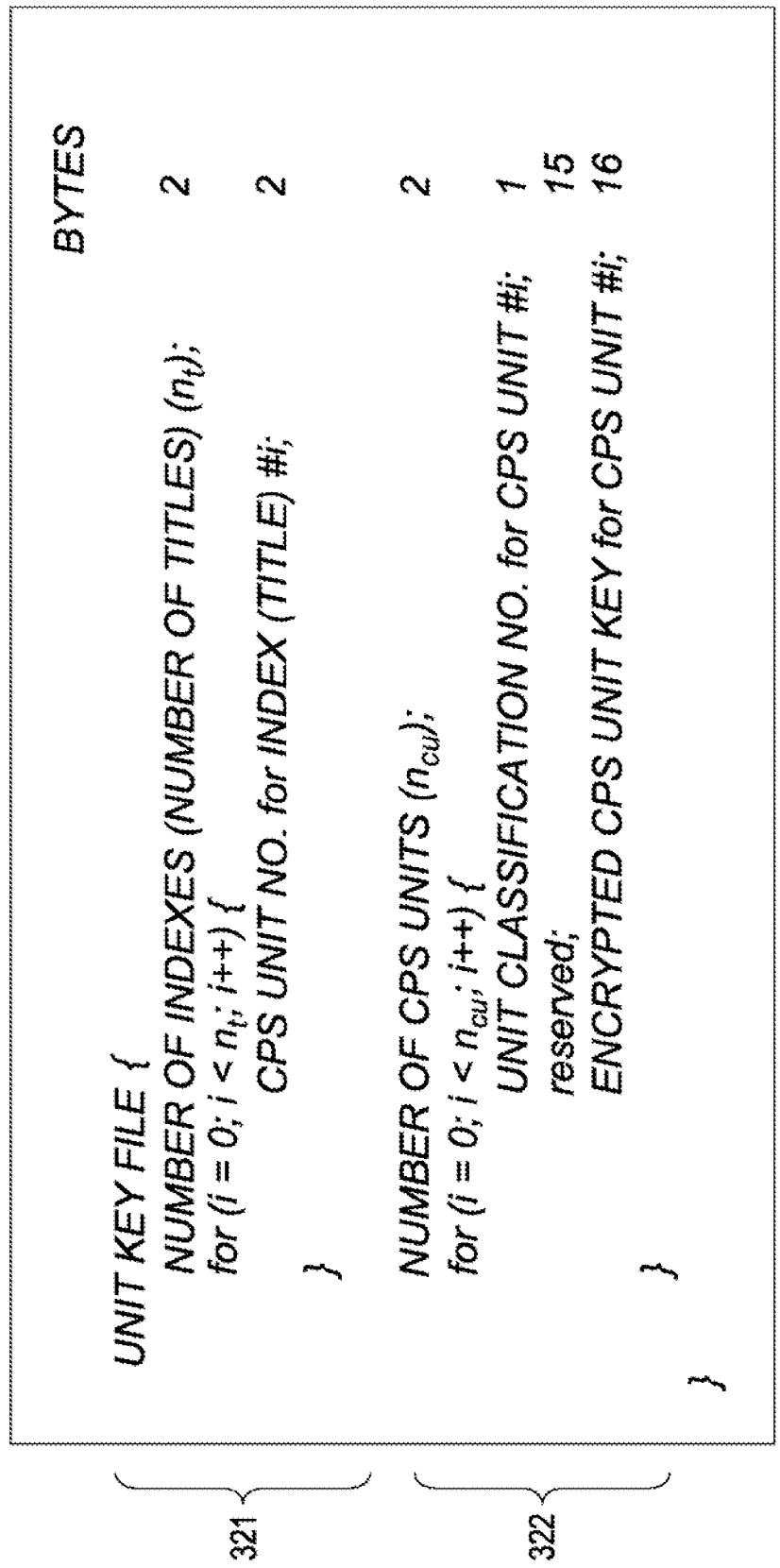

FIG. 7

| UNIT VERSION / UNIT CLASSIFICATION NO.: i | SEGMENT 0 | SEGMENT 1 | SEGMENT 2 | ... | SEGMENT 14 |
|---|---|---|---|---|---|
| V(0,j) | Enc(Ke'(0,i),Ks'(0,3)) | Enc(Ke'(0,i),Ks'(1,2)) | Enc(Ke'(0,i),Ks'(2,4)) | ... | Enc(Ke'(0,i),Ks'(14,14)) |
| V(1,j) | Enc(Ke'(1,i),Ks'(0,7)) | Enc(Ke'(1,i),Ks'(1,7)) | Enc(Ke'(1,i),Ks'(2,1)) | ... | Enc(Ke'(1,i),Ks'(14,1)) |
| V(2,j) | Enc(Ke'(2,i),Ks'(0,6)) | Enc(Ke'(2,i),Ks'(1,3)) | Enc(Ke'(2,i),Ks'(2,12)) | ... | Enc(Ke'(2,i),Ks'(14,6)) |
| V(3,j) | Enc(Ke'(3,i),Ks'(0,3)) | Enc(Ke'(3,i),Ks'(1,8)) | Enc(Ke'(3,i),Ks'(2,0)) | ... | Enc(Ke'(3,i),Ks'(14,12)) |
| ... | ... | ... | ... | ... | ... |
| V(j,i) | Enc(Ke'(j,i),Ks'(0,0)) | Enc(Ke'(j,i),Ks'(1,9)) | Enc(Ke'(j,i),Ks'(2,13)) | ... | Enc(Ke'(j,i),Ks'(14,11)) |
| ... | ... | ... | ... | ... | ... |
| V(255,i) | Enc(Ke'(255,i),Ks'(0,15)) | Enc(Ke'(255,i),Ks'(1,3)) | Enc(Ke'(255,i),Ks'(2,7)) | ... | Enc(Ke'(255,i),Ks'(14,8)) |

V (PATH NO., UNIT CLASSIFICATION NO.)

Ke' (PATH NO., UNIT CLASSIFICATION NO.)
Ks' (SEGMENT NO., VARIATION NO.)

FIG. 8

```
SEGMENT KEY FILE {
    for (i = 0; i < n_cu'; i++) {                                    BYTES
        Sequence Key Applied CPU UNIT NO.;                             2   ⎯331
        for (j = 0; j < 256; j++) {
            for (k = 0; k < 15; k++) {
                PlayList id(j, k);                                     2  ⎫
                PlayItem id(j, k);                                     2  ⎬ 332
                Enc (Ke', SEGMENT KEY (j, k));                        16  ⎭
            }
        }
    }
}
```

* $n_{cu}'$: NUMBER OF CPS UNITS TO WHICH SEQUENCE KEY (SEGMENT KEY STRING) IS APPLIED
* PlayList id: ID FOR UNIQUELY IDENTIFYING PLAYLISTS ON SAME DISK
* PlayItem id: ID FOR UNIQUELY IDENTIFYING PLAY ITEMS IN SAME PLAYLIST

FIG. 9

| UNIT VERSION (UNIT CLASSIFICATION NO.: i) | SEGMENT 0 | SEGMENT 1 | .. |
|---|---|---|---|
| V(0, i) | PLAYLIST ID (0, 3) PLAY ITEM ID (0, 3) Enc(Ke'(0, i),Ks'(0, 3)) | PLAYLIST ID (1, 2) PLAY ITEM ID (1, 2) Enc(Ke'(0, i),Ks'(1, 2)) | .. |
| .. | .. | .. | |

FIG. 10

| UNIT CLASSIFICATION NO. | UNIT VERSION | UNIT CLASSIFICATION KEY |
|---|---|---|
| 0 | V(35,0) | Kc(35,0) |
| 1 | V(241,1) | Kc(241,1) |
| 2 | V(74,2) | Kc(74,2) |
| 3 | V(35,3) | Kc(35,3) |
| .. | .. | .. |
| i | V(1,i) | Kc(1,i) |
| .. | .. | .. |
| 254 | V(95,254) | Kc(95,254) |

V (PATH NO., UNIT CLASSIFICATION NO.)

Kc (PATH NO., UNIT CLASSIFICATION NO.)

FIG. 25

| PARAMETERS FOR COMPARISON | | (A1) | (A2) | (A3) |
|---|---|---|---|---|
| MAXIMUM JUMP TIME [TJUMP] | | 1600 ms | 1030 ms | 710 ms |
| BUFFER SIZE [SRB] | | 9.36 MByte(*1) | 6.02 MByte | 4.15 Mbyte |
| MINIMUM DATA PLACEMENT SIZE [Usize] NECESSARY TO ENSURE CONTINUOUS SUPPLY OF DATA BEFORE AND AFTER JUMPS | DATA RECORDING RATE RTS (=TS_recording_rate) | | | |
| | 5 Mbps (*2) | — | — | — |
| | 10 Mbps | 1.1 MByte | 0.7 MByte | 0.5 Mbyte |
| | 20 Mbps | 2.5 MByte | 1.6 MByte | 1.1 Mbyte |
| | 30 Mbps | 6.3 MByte | 4.1 Mbyte | 2.8 Mbyte |
| | 40 Mbps | 13.6 MByte | 8.7 Mbyte | 6.0 Mbyte |
| | 48 Mbps | 32.0 MByte | 20.6 Mbyte | 14.2 Mbyte |
| | | 101.5 MByte | 65.3 Mbyte | 45.1 MByte |

(*1) MByte = $2^{20}$ byte
(*2) $R_{TS}$ : TS_recording_rate

FIG. 26

| PARAMETERS FOR COMPARISON | | $T_{SK}$=50 ms | $T_{SK}$=100 ms | $T_{SK}$=200 ms |
|---|---|---|---|---|
| MAXIMUM JUMP TIME [TJUMP] | | 760 ms | 810 ms | 910 ms |
| BUFFER SIZE [SRB] | | 4.44 MByte(*1) | 4.73 MByte | 5.32 Mbyte |
| MINIMUM DATA PLACEMENT SIZE [Usize] NECESSARY TO ENSURE CONTINUOUS SUPPLY OF DATA BEFORE AND AFTER JUMPS | DATA RECORDING RATE $R_{TS}$ (=TS_recording_rate) | | | |
| | 5 Mbps (*2) | — | — | — |
| | 10 Mbps | 0.5 Mbyte | 0.5 Mbyte | 0.6 Mbyte |
| | 20 Mbps | 1.1 Mbyte | 1.2 Mbyte | 1.4 Mbyte |
| | 30 Mbps | 3.0 Mbyte | 3.2 Mbyte | 3.6 Mbyte |
| | 40 Mbps | 6.4 Mbyte | 6.8 Mbyte | 7.7 Mbyte |
| | 48 Mbps | 15.2 MByte | 16.2 Mbyte | 18.2 Mbyte |
| | | 48.2 MByte | 51.3 Mbyte | 57.7 Mbyte |

(*1) MByte = $2^{20}$ byte
(*2) $R_{TS}$ : TS_recording_rate

FIG. 27

| $T_{SK}$ | (MINIMUM) SEGMENT LENGTH (PLAYBACK TIME) (bit rate = 40 Mbps OR SMALLER) | (MINIMUM) SEGMENT LENGTH (PLAYBACK TIME) (bit rate = 48 Mbps OR SMALLER) |
|---|---|---|
| 5 ms OR LESS | 3.00 sec | 7.92 sec |
| 50 ms | 3.19 sec | 8.42 sec |
| 100 ms | 3.40 sec | 8.97 sec |
| 200 ms | 3.82 sec | 10.08 sec |

FIG. 33

PlayList for Movie Version#XX
(example refers Page10 of this document)

PlayItem#0 (Scene1 TO 2)
```
is_multi_angle                    = Yes
connection_condition              = 5
number_of_angles                  = 3
is seamless_angle_change          = Yes
for(angle_id=1; angle_id <3; angle_id++){
   Clip_Information_file_name     = A1 TO A2
   Clip_Information_file_name     = B1 TO B2
   Clip_Information_file_name     = C1 TO C2
}
```

PlayItem#1 (Scene3)
```
is_multi_angle                    = Yes
connection_condition              = 5
number_of_angles                  = 3
is seamless_angle_change          = No
for(angle_id=1; angle_id <3; angle_id++){
   Clip_Information_file_name     = A3-XX
   Clip_Information_file_name     = B3-XX
   Clip_Information_file_name     = C3-XX
}
```

(*) FOR XX = 01 THROUGH 16, SPECIFY
DIFFERENT Path FOR EACH VARIATION OF PlayList

INFORMATION PROCESSING DEVICE, INFORMATION RECORDING MEDIUM, INFORMATION PROCESSING METHOD, AND COMPUTER PROGRAM

CROSS REFERENCE TO RELATED APPLICATIONS

The present application claims priority to Japanese Patent Document No. 2005-051631 filed on Feb. 25, 2005, the disclosure of which is herein incorporated by reference.

BACKGROUND

The present invention relates to an information processing device, information recording medium, information processing method, and computer program. More particularly, the present invention relates to an information processing device, information recording medium, information processing method, and computer program, for preventing playback interruption due to jump processing at the time of playback of recorded contents on a disc, thereby enabling seamless content playback.

Various types of software data, such as audio data like music and so forth, image data like movies and so forth, game programs, various types of application programs, and so forth, can be stored in recording media, e.g., discs such as Blu-ray discs applying blue laser, DVDs (Digital Versatile Disc), and so forth.

Data storage formats are stipulated corresponding to each of the various types of data, and each data is stored according to its respective format.

For example, in the event of performing playback of contents having a data recording configuration such that image data and audio data are stored separately on a disc, or multi-angle contents configured of image data from various angles, there is the need to jump between data recording regions that are away from one another on the disc, to read the necessary data for playing thereof.

In the reading and playing processing of contents stored in a disc, the procedures of
  obtaining information from the disc,
  temporary storage (buffering) of the obtaining information,
  decoding/decryption of buffer data, and
  output of data following decoding,
are executed.

Decoding/decryption of buffer data includes decoding processing of MPEG data in the event that the contents are MPEG data for example, and decryption of encrypted data in the event that the data is encrypted.

In the event that data, regarding which consecutive playing should be performed, is at positions with distance therebetween, the reading head needs to move, i.e., jump processing needs to be performed. In the event of jump processing occurring, time is required for performing jump processing from a data play position on the disc to a position which is distanced therefrom, to read the data at the next read position and perform play processing. In the event that this time is long, there are cases wherein play interruption can occur. For example, in the Patent Document 1 mentioned below, data is recorded in sections, for a case taking into consideration a case of jumping without playing a certain block, taking into consideration the capacity of buffer memory, the speed of track jumping, rotation wait time, and ECC block processing time. However, whether or not there is encoding/encryption is not described, nor is there any consideration given to cases wherein different encryption keys are used for each block. Moreover, in the case of parental lock, a few particular paths may be traveled, but in the case of identifying equipment used to create unauthorized copies, a great number of paths need to be prepared, and from this perspective as well, consecutive playback will be difficult unless there is some consideration given to a special data placement for performing consecutive playing.

Patent Document 1 Japanese Unexamined Patent Application Publication No. 9-274769

SUMMARY

The present invention has been made in light of the above problems, and it is an object thereof to provide an information processing device, information recording medium, information processing method, and computer program, enabling seamless content playback without playback data interruption, by employing a configuration wherein the recording format of encrypted data is stipulated and particular data recording processing and playback processing is executed.

Particularly, it is an object of the present invention to provide an information processing device, information recording medium, information processing method, and computer program, enabling seamless content playback without playback data interruption, by employing a configuration wherein the recording format of encrypted data is stipulated and particular data recording processing and playback processing is executed, regarding contents having a segment portion made up of segment data which is encrypted data of different variations regarding each of which an individual segment key has been applied, and a non-segment portion which is encrypted data to which has been applied a unit key that has been set corresponding to a content management unit set as a usage section of contents.

Means for Solving the Problems

According to a first aspect of the present invention, an information processing device for determining the placement of content-configuring data to be recorded in an information recording medium, and executing data recording processing comprises:
  data placement determining means for determining, regarding contents having a segment portion made up of segment data which is encrypted data of different variations regarding each of which an individual segment key has been applied, and a non-segment portion which is encrypted data to which has been applied a unit key that has been set corresponding to a content management unit set as a usage section of contents, the placement of data configuring the segment data and non-segment portion, such that the maximum jump distance executed between the segment portion and the non-segment portion at the time of playback processing is equal to or smaller than a maximum jump distance that has been set beforehand; and
  a data recording unit for executing recording processing of data configuring the segment data and non-segment portion to an information recording medium, based on the placement information determined by the data placement determining means.

Further, according to an embodiment of the information processing device of the present invention, the data placement determining means are of a configuration for determining the data configuring the segment data and non-segment portion such that the maximum jump distance executed between the segment portion and the non-segment portion at the time of playback processing is equal to or smaller than a distance which can be jumped within a jump permissible time that has been set beforehand; wherein the jump permissible time is, with regard to intra-layer jumping, a jump permissible time determined based on the added values of seek time of a pickup, overhead time accompanying processing of data in increments of blocks read out from the information recording medium, and sequence key usage time which is application key switchover time occurring at the time of making transition between data configuring the segment data and non-segment portion, and with regard to inter-layer jumping, a jump permissible time determined based on the added values of seek time of a pickup, pickup adjusting time accompanying inter-layer movement, overhead time accompanying processing of data in increments of blocks read out from the information recording medium, and sequence key usage time which is application key switchover time occurring at the time of making transition between data configuring the segment data and non-segment portion.

Further, according to an embodiment of the information processing device of the present invention, the data placement determining means are of a configuration for performing data placement which does not include a consecutive recording portion of a plurality of segment data belonging to different segments.

Further, according to an embodiment of the information processing device of the present invention, the data placement determining means are of a configuration for performing data placement which does not include a recording portion spanning different recording layers for a plurality of segment data belonging to the same segment.

Further, according to an embodiment of the information processing device of the present invention, the data placement determining means are of a configuration for performing, in the event of performing divided recording on different recording layers for a plurality of segment data belonging to the same segment, data placement of non-segment portion data consecutively played at the segment to which the segment data belongs, either between segment data at a plurality of segment data positions being subjected to divided recording, or a position adjacent to segment data.

Further, according to an embodiment of the information processing device of the present invention, the information processing device is further of a configuration for executing, in the event that the recorded contents are multi-angle contents including angle data, processing for generating control information for forbidding angle switchover at a non-segment portion and segment portion immediately prior to a segment, and recording in an information recording medium.

Further, according to a second aspect of the present invention, with an information recording medium having a configuration for storing, as recorded data, contents having a segment portion made up of segment data which is encrypted data of different variations regarding each of which an individual segment key has been applied, and a non-segment portion which is encrypted data to which has been applied a unit key that has been set corresponding to a content management unit set as a usage section of contents, wherein the placement of data configuring the segment data and non-segment portion is such that the maximum jump distance executed between the segment portion and the non-segment portion at the time of playback processing is equal to or smaller than a maximum jump distance that has been set beforehand.

Further, according to a third aspect of the present invention, an information processing method for determining the placement of content-configuring data to be recorded in an information recording medium, and executing data recording processing comprises:

a data placement determining step for determining, regarding contents having a segment portion made up of segment data which is encrypted data of different variations regarding each of which an individual segment key has been applied, and a non-segment portion which is encrypted data to which has been applied a unit key that has been set corresponding to a content management unit set as a usage section of contents, the placement of data configuring the segment data and non-segment portion, such that the maximum jump distance executed between the segment portion and the non-segment portion at the time of playback processing is equal to or smaller than a maximum jump distance that has been set beforehand; and a data recording step for executing recording processing of data configuring the segment data and non-segment portion, based on the placement information determined in the data placement determining step.

Further, according to a fourth aspect of the present invention, a computer program for causing a computer to execute determining processing regarding the placement of content-configuring data to be recorded in an information recording medium comprises:

a data placement determining step for determining, regarding contents having a segment portion made up of segment data which is encrypted data of different variations regarding each of which an individual segment key has been applied, and a non-segment portion which is encrypted data to which has been applied a unit key that has been set corresponding to a content management unit set as a usage section of contents, the placement of data configuring the segment data and non-segment portion, such that the maximum jump distance executed between the segment portion and the non-segment portion at the time of playback processing is equal to or smaller than a maximum jump distance that has been set beforehand; and a data recording step for executing recording processing of data configuring the segment data and non-segment portion, based on the placement information determined in the data placement determining step.

Note that the computer program according to the present invention is a computer program which can be provided to a computer system capable of executing various types of computer code, for example, by a storage medium of communication medium for providing in a computer-readable format, e.g., recording media such as CD, FD, MO, or the like, or communication media such as a network or the like. Providing such a program in a computer-readable format realizes processing at the computer system corresponding to the program.

Further objects, features, and advantages will become apparent from later-described embodiments of the present invention and detailed description with reference to the attached drawings. Note that system as used in the present specification is a logical collection of multiple devices, and the present invention is not restricted to an arrangement wherein each component device is in the same housing.

Advantages

According to the configuration of the present invention, the placement of data configuring the segment data and non-segment portion of contents having a segment portion made up of segment data which is encrypted data of different variations regarding each of which an individual segment key has been applied, and a non-segment portion which is encrypted data to which has been applied a unit key that has been set corresponding to a content management unit set as a usage section of contents, is determined, such that the maximum jump distance executed between the segment portion and the non-segment portion at the time of playback processing is equal to or smaller than a maximum jump distance that has been set beforehand, so even in cases wherein playback processing is performed following various paths set by one segment data being selected from a segment portion, seamless playback can be realized without playback interruption.

According to the configuration of the present invention, the jump permissible time is, with regard to intra-layer jumping, a jump permissible time determined based on the added values of seek time of a pickup, overhead time accompanying processing of data in increments of blocks read out from the information recording medium, and sequence key usage time which is application key switchover time occurring at the time of making transition between data configuring the segment data and non-segment portion, and with regard to inter-layer jumping, a jump permissible time determined based on the added values of seek time of a pickup, pickup adjusting time accompanying inter-layer movement, overhead time accompanying processing of data in increments of blocks read out from the information recording medium, and sequence key usage time which is application key switchover time occurring at the time of making transition between data configuring the segment data and non-segment portion, and jumping is executed between the segment data and non-segment portion within the jump distance, so even in cases wherein playback processing is performed following various paths, seamless playback can be realized without playback interruption.

Also, according to the configuration of the present invention, various data placement configurations are provided, such as data placement which does not include a consecutive recording portion of a plurality of segment data belonging to different segments, data placement which does not include a recording portion spanning different recording layers for a plurality of segment data belonging to the same segment, or, in the event of performing divided recording on different recording layers for a plurality of segment data belonging to the same segment, data placement of non-segment portion data consecutively played at the segment to which the segment data belongs, either between segment data at a plurality of segment data positions being subjected to divided recording, or a position adjacent to segment data. Further, in the event of multi-angle contents, a configuration for generating control information for forbidding angle switchover at a non-segment portion and segment portion immediately prior to a segment, and recording in an information recording medium, and so forth, realizes seamless playback for contents playback.

Additional features and advantages of the present invention are described in, and will be apparent from, the following Detailed Description and the Figures.

BRIEF DESCRIPTION OF THE FIGURES

FIG. 5 is a diagram for describing the configuration of a CPS unit key file.

FIG. 6 is a syntax diagram for describing the configuration of a CPS unit key file.

FIG. 7 is a diagram for describing the configuration of a segment key file.

FIG. 8 is a syntax diagram for describing the configuration of a segment key file.

FIG. 9 is a diagram for describing the configuration of a segment key file.

FIG. 10 is a diagram for describing the configuration of a unit classification key file.

FIG. 25 is a diagram illustrating data placement conditions (minimal value of consecutive data placement size) corresponding to each value of the necessary buffer size (SRB) and data recording rate (RTS), in a case of not using a sequence key in each case of the multiple jump models (A1) through (A3) described with reference to FIG. 23.

FIG. 26 is a diagram illustrating data placement conditions (minimal value of consecutive data placement size) corresponding to each value of the necessary buffer size (SRB) and data recording rate (RTS), in a case of using a sequence key in each case of the jump model (A3) described with reference to FIG. 23.

FIG. 27 is a diagram for describing the minimum segment length stipulated as a segment necessary for seamless playback.

FIG. 33 is a diagram for describing the configuration of a playlist with multi-angle contents.

DETAILED DESCRIPTION

The following is a detailed description of the information processing device, information recording medium, information processing method, and computer program, according to the present invention, with reference to the drawings. Note that description will be performed according to the following items.
1. Overview of Stored Data in an Information Recording Medium, and Information Processing Device
2. Detailed Configuration of Stored Data in an Information Recording Medium, and Stored Data in an Information Processing Device
 (2.1. CPS unit)
 (2.2. Segment)
 (2.3. CPS unit key file)
 (2.4. Segment key file)
 2.5. Unit classification key file)
 (2.6. Movie Object)
3. Contents Playback Processing at Information Processing Device
4. Jump Processing and Contents Storage Format
5. Contents Recording Processing
6. Configuration Example of Information Processing Device
[1. Overview of Stored Data in an Information Recording Medium, and Information Processing Device]

Figure 1:
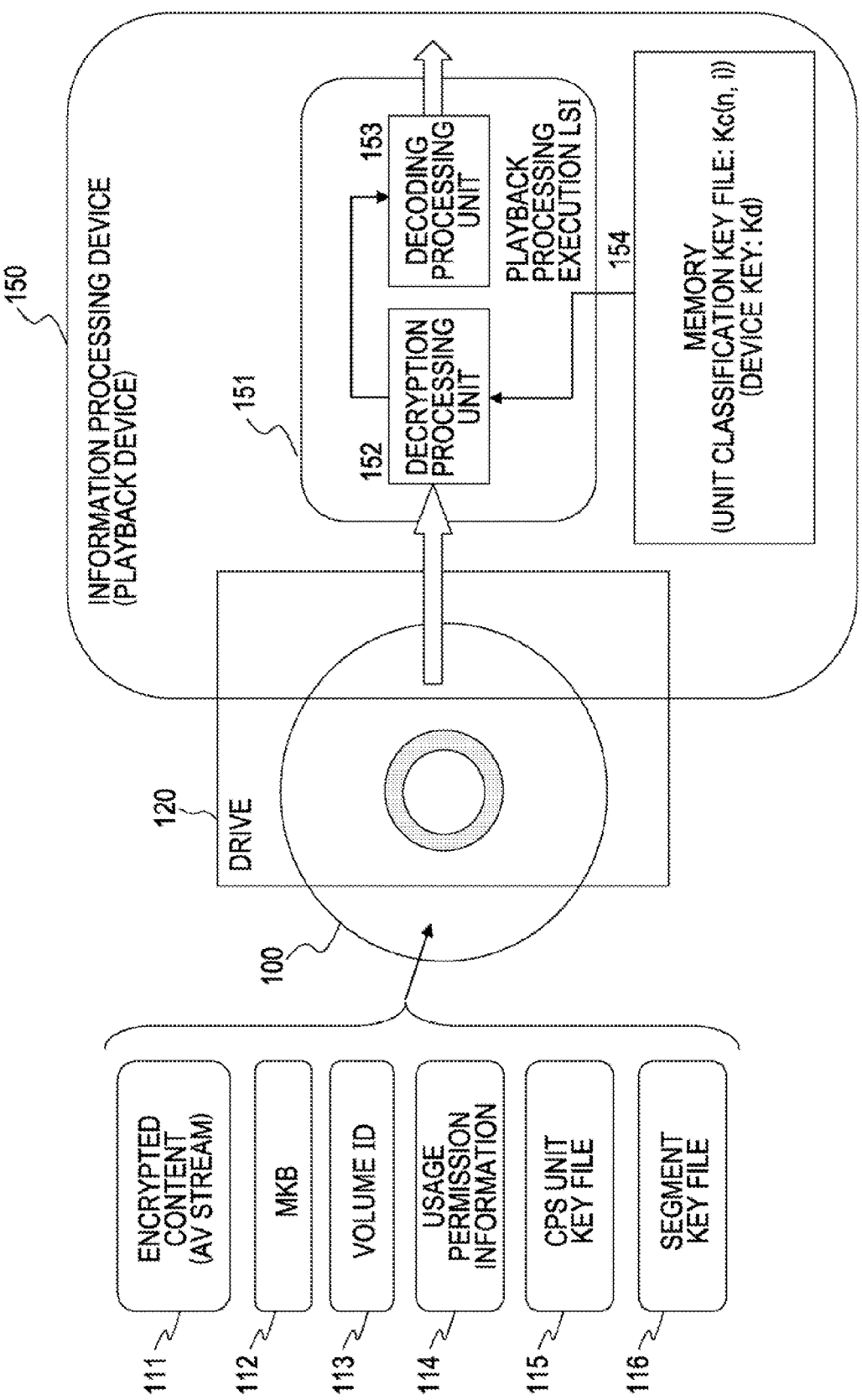
FIG. 1 is a diagram for describing the stored data configuration of an information recording medium, and the configuration and processing of an information processing device which executes playback processing.

First, description will be made regarding the overview of stored data in an information recording medium, and an information processing device. FIG. 1 illustrates the configuration of an information recording medium 100 with content stored therein, and an information processing device (player) 150. An information storage example is shown here of a ROM disc serving as a disc in which contents are already stored. The information processing device 150 is various types of information processing devices, such as a PC or playback-only device or the like, which has a drive for executing data reading processing from the information recording medium 100.

The ROM disc serving as an information recording medium is an information recording medium such as, for example, a Blu-ray disk, DVD, or the like, and is an information recording medium storing authorized content, manufactured at a disc manufacturing plant under the permission of the so-called content right holder, having proper content rights or distribution rights. Note that with the following embodiment, a disc-type medium will be used as an example for describing the information recording medium, but the present invention is capable of being applied to configurations using various types of information recording media.

As shown in FIG. 1, the information recording medium stores therein encrypted content 111 which has been subjected to encryption processing and partial replacement of data, an MKB (Medium Key Block) 112 which is the encryption key block generated based on a tree structure key distribution method known as a type of broadcast encryption method, a volume ID 113 set as identification information for each individual information recording medium or each information media in increments of a certain number thereof, usage permission information 114 including CCI (Copy Control Information) and the like serving as copying/reproduction control information of content, a CPS unit key file 115 storing a CPS unit key which is an encryption key set up for each content management unit (CPC unit) serving as content usage management increments, and further, a segment key file 116 which is a file for obtaining a segment key which has been applied as an encryption key for segment data wherein a part of the contents stored in the information recording medium 100 have been encrypted with a different encryption key. The overview of each of these types of information will be described.

(1) Encrypted Contents 111

Various types of contents are stored in the information recording medium 100. Examples of the contents include AV (Audio Visual) streams of moving picture contents such as HD (High-Definition) movie content which is high-definition moving picture data, game programs of a format stipulated under a particular standard, image files, audio data, text data, and so forth. These contents are data stipulated under a particular AV format, and are stored according to the particular AV data format. Specifically, this is stored according to the Blu-ray disc (Registered Trademark) ROM standard format, as Blu-ray disc (Registered Trademark) ROM standard data, for example. These will be referred to as main contents.

Further, there are cases wherein service data such as game programs, image files, audio data, text data, and so forth, are stored as sub-contents, for example. Sub-contents are data having a data format not following the particular AV data format. That is to say, these can be stored in arbitrary formats not following the Blu-ray disc (Registered Trademark) ROM standard format, as Blu-ray (Registered Trademark) disc ROM non-standard data. These will be called sub-contents.

Types of contents, for both main contents and sub-contents, include various contents such as music data, moving pictures, image data such as still images, game programs, Web contents, and so forth, and information of various forms is included in these contents, such as content information usable only by the data from the information recording medium 100, content information usable by combining data from the information recording medium 100 and data provided from the server connected to a network, and so forth. Contents stored in the information recording medium are stored encrypted, with a different key appropriated for each section content (title key)), to realize different usage control for each section content. Each unit to which one title key is appropriated is called a content management unit (CPS unit).

(2) MKB

The MKB (media key block) 112 is an encryption key block generated based on a tree structure key distribution method known as a type of broadcast encryption method. The MKB 111 is a key information block enabling acquiring of a media key (Km) necessary for decrypting contents, only for processing (decryption) based on a device key (Kd) stored on the information processing device of the user having a valid license. This is an application of an information distribution method following a so-called hierarchical tree structure, enabling the acquiring of the media key (Km) only in the event that the user device (information processing device) has a valid license, and user devices which are invalidated (revoking processing) are incapable of acquiring a media key (Km).

An administration center serving as a license entity can generate an MKB having a structure which cannot be decrypted with the device key stored in a certain user device, i.e., wherein the media key necessary for content decryption cannot be acquired, by changing the device key used for decryption of key information stored in the MKB. Accordingly, unauthorized devices can be an revoked at an arbitrary timing, thereby providing encrypted contents capable of decryption only to devices having valid licenses. Content decryption processing will be described later.

(3) Volume ID

A volume ID is an ID set as identification information for each individual information recording medium or each information media in increments of a certain number thereof. This volume ID is recorded in the individual information recording medium such as an optical disk or the like by a stamper, and is used as key generating information to be applied to decryption of contents. This processing will be described later.

(4) Usage Permission Information

Usage permission information includes, for example, copy/reproduction control information (CCI). This is copy restriction information and reproduction restriction information for usage control corresponding to the encrypted contents 111 stored in the information recording medium 100. There are various settings for the copy/reproduction control information (CCI), such as cases as information for individual CPS units set as content management units, cases for being set corresponding to multiple CPS units, and so forth.

(5) CPS Unit Key File

As described above, the encrypted contents 111 stored in the information recording medium 100 are encrypted applying encryption keys for individual CPS units set as content management units. The AV (Audio Visual) streams music data, moving pictures, image data such as still images, game programs, WEB contents, and so forth, making up the contents, are sectioned into CPS units which are management units for contents usage. An information processing device which executes playing processing needs to determine the CPS unit to which the content to be played belongs, and perform encryption processing using a CPS unit key serving as an encryption key corresponding to the determined CPS unit. The file storing the data necessary for obtaining this CPS unit key is the CPS unit key file. Details of the CPS unit key file will be described alter. Note that content playback requires not only a CPS unit key but also application of other various types of key information and key generating information and so forth. Specific processing of these will also be described later.

(6) Segment Key File

As described above, the contents stored in the information recording medium 100 are stored having been encrypted in increments of CPS units. Further, a content belonging to one CPS unit includes segment data made up of multiple variations, wherein a part of the content has been encrypted by different encryption keys. A segment key file is a file for obtaining a segment key applied as the encryption key for this segment data.

The information processing device, which performs the playback processing, performs content playback following a particular path (sequence) set by selecting particular segment data from the multiple segments included in the contents. The file storing the data for obtaining a segment key for decrypting the segment data (encrypted data) of a particular variation set in each segment is the segment key file. Note that obtaining of multiple segment keys and CPS unit keys following a particular path (sequence) is necessary for content playback.

That is to say, in content playback, there is the need to perform encryption while switching between a CPS unit key and a segment key corresponding to segment data of a particular variation. A string of keys following a particular path is called a sequence key (Sequence Key). Processing for obtaining and using segment key files and segment keys will be described in detail later.

FIG. 1 illustrates the overview of the configuration of the information processing device 150 for executing the playback processing of the contents stored in the information recording medium 100. The information processing device has a drive 120 for executing reading processing of stored data in the information recording medium. The data read by the drive 120 is input to a playback processing executing LSI 151 for executing decryption processing and decoding processing (e.g., MPEG decoding) of the encryption contents.

The playback processing executing LSI 151 has a decryption processing unit 152 for executing decryption processing of encrypted contents, and a decoding processing unit 153 for executing decoding (e.g., MPEG decoding) processing. The decryption processing unit 152 generates a key to be applied to decryption of the contents, applying various types of information stored in memory 154 and the read data from the information recording medium 100, and executes decryption processing of the encrypted contents 111.

The memory 154 stores a unit classification key file: Kc(n, i), and a device key: Kd. At the time of decryption of the encrypted contents in the information recording medium 100, the information processing device 150 generates a key to be applied to contents decryption, based on the data stored in the memory 154 and the data read from the information recording medium 100, and executes decryption processing of the encrypted contents 11. Details of the data stored in the memory, and details of the decryption processing, will be described at a later stage.

[2. Detailed Configuration of Stored Data in an Information Recording Medium, and Stored Data in an Information Processing Device]

Next, the detailed configuration of data stored in the information recording medium will be described with reference to FIG. 2 and subsequent drawings.

(2.1. CPS Unit)

As described above, the content stored in the information recording medium is subjected to decryption processing and is stored with different keys appropriated for each unit, in order to realize different usage control for each unit. That is to say, the content is sectioned into content management unit (CPS units), individual decryption processing is performed, and individual usage management is made.

At the time of using contents, first, there is the need to obtain a CPS unit key appropriated to each unit, and further, reproduction is performed by executing data processing based on decryption processing sequences determined beforehand, applying other necessary keys, key generating information, and so forth. The settings of a content management unit (CPS unit) will be described with reference to FIG. 2.

Figure 2:
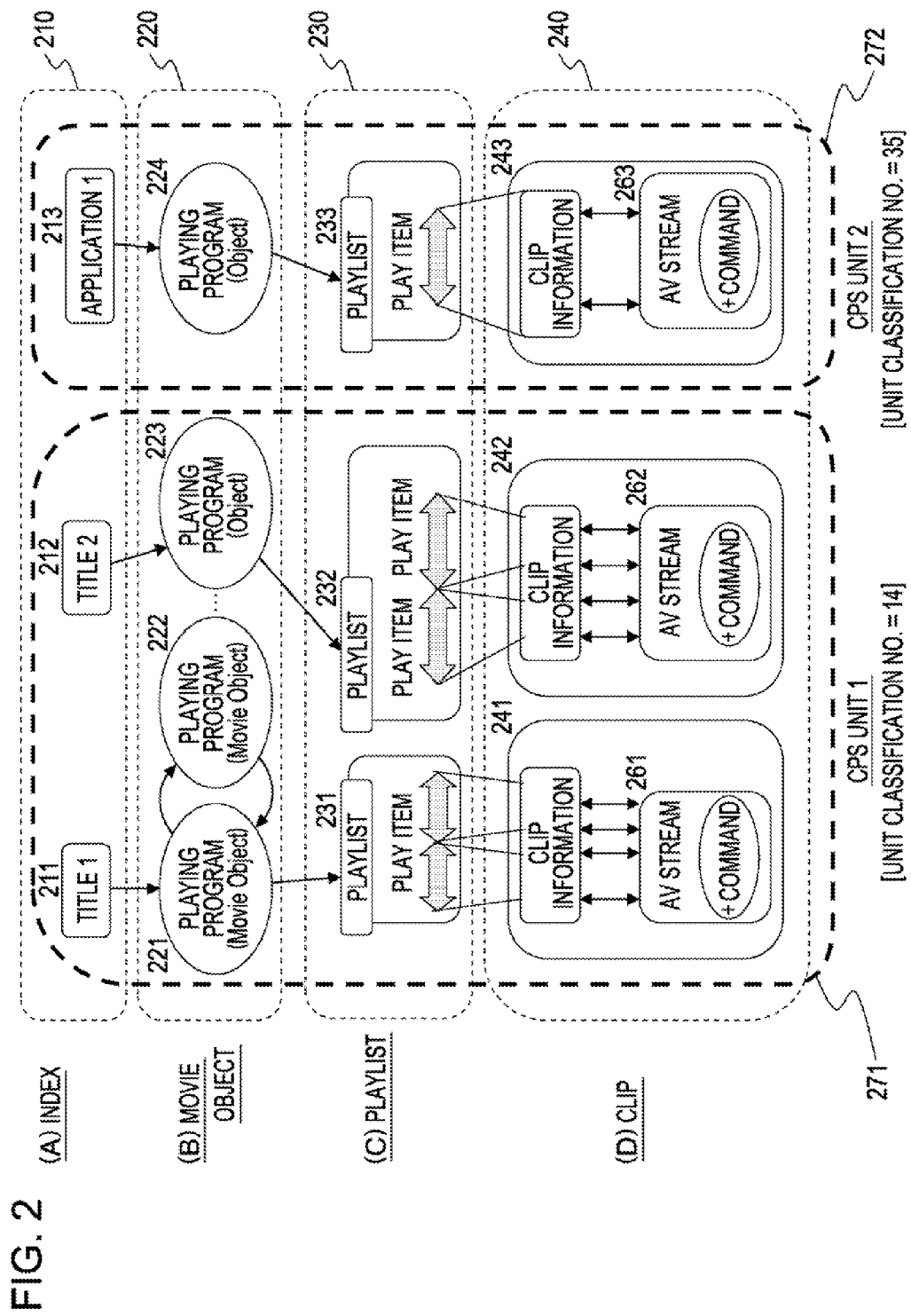
FIG. 2 is a diagram for describing a setting example of a content management unit to be set for stored contents of an information recording medium.

As shown in FIG. 2, the content has a hierarchical configuration of (A) index 210, (B) movie object 220, (C) playlist 230, and (D) clip 240. Specifying an index such as a title to be accessed by the reproduction application specifies a reproduction program correlated with the title, for example, and the playlist stipulating the order of reproducing the content is selected according to the program information of the reproduction program that has been specified.

Play items are included in the playlist as information of the data to be reproduced. An AV stream which is actual data of the content, or commands, is selectively read out by clip information for reproduction sections stipulated by play items included in the playlist, and reproduction of the AV stream and execution processing of the commands are performed. Note that a great number of playlists and play items exist, and each has a corresponding playlist ID and play item ID, as identification information.

FIG. 2 illustrates two CPS units. These make up a part of the content stored in the information recording medium. Each of the CPS unit 1, 271, and the CPS unit 2, 272 are CPS units which have been set as units including a title serving as an index, a movie object which is a reproduction program file, a playlist, and a clip including an AV stream file which is the actual contents data.

A content management unit (CPS unit) 1, 271 includes a title 1, 211 and title 2, 212, reproduction programs 221 and 222, playlists 231 and 232, a clip 241 and a clip 242, and AV stream data files 261 and 262 which are the actual data of the content contained in the two clips 241 and 242 are at least the object data of encryption, and accordingly is set as data encrypted applying a unit key (Ku1) which is an encryption key set corresponding to the content management unit (CPS unit) 1, 271 as a rule (also called a CPS unit key). While details will be described later, a segment serving as data configuring the contents is encrypted by a segment key. The contents are sectioned into a segment portion and a non-segment portion, with the non-segment portion being encrypted by a CPS unit key, and the segment portion being made up of multiple variations, with each of these being made of segment data encrypted by different segment keys. Configuration of these will be described in detail at a later stage.

A unit classification No. (Movie Sequence Number) is set to each content management unit (CPS unit). A unit classification No. is a number which a content owner serving as the content providing entity, or an authoring facility which is a content editing entity, can arbitrarily determined, and 255 types of numbers are assigned, from 0 to 254, for example. This unit classification No. is used as a determination parameter for a playback path for contents. A content playback path will be described at a later stage with reference to FIG. 3 and subsequent drawings. With the example, shown at the bottom in FIG. 2, the unit classification No.=14 is set for the content management unit (CPS unit) 1, 271.

The content management unit (CPS unit) 2, 272 includes an application 1, 213 as an index, a reproduction program 224, playlist 233, and a clip 243, and an AV stream data file 263 which is the actual data of the content contained in the clip 243 is encrypted applying a CPS unit key (Ku2) which is an encryption key set corresponding to the content management unit (CPS unit) 2, 272. The unit classification No.=35 is set for the content management unit (CPS unit) 2, 272.

For example, in order to execute an application file or content reproducing processing corresponding to the content management unit 1 271, a unit key: Ku1 serving as an encryption key which is set so as to be correlated with the content management unit (CPS unit) 1, 271, needs to be obtained and subjected to decryption processing. In order to execute an application file or content reproducing processing corresponding to the content management unit 2, 272, a unit key: Ku2 as an encryption which is set so as to be correlated with the content management unit (CPS unit) 2, 272, needs to be obtained and subjected to decryption processing.

(2.2. Segment)

Further, with contents playback processing, there are cases wherein, in addition these unit keys, there is the need to obtain segment keys (Ks) corresponding to segments which are data configuring the contents that have been broken down. The configuration of segments will be described with reference to FIG. 3.

Figure 3:
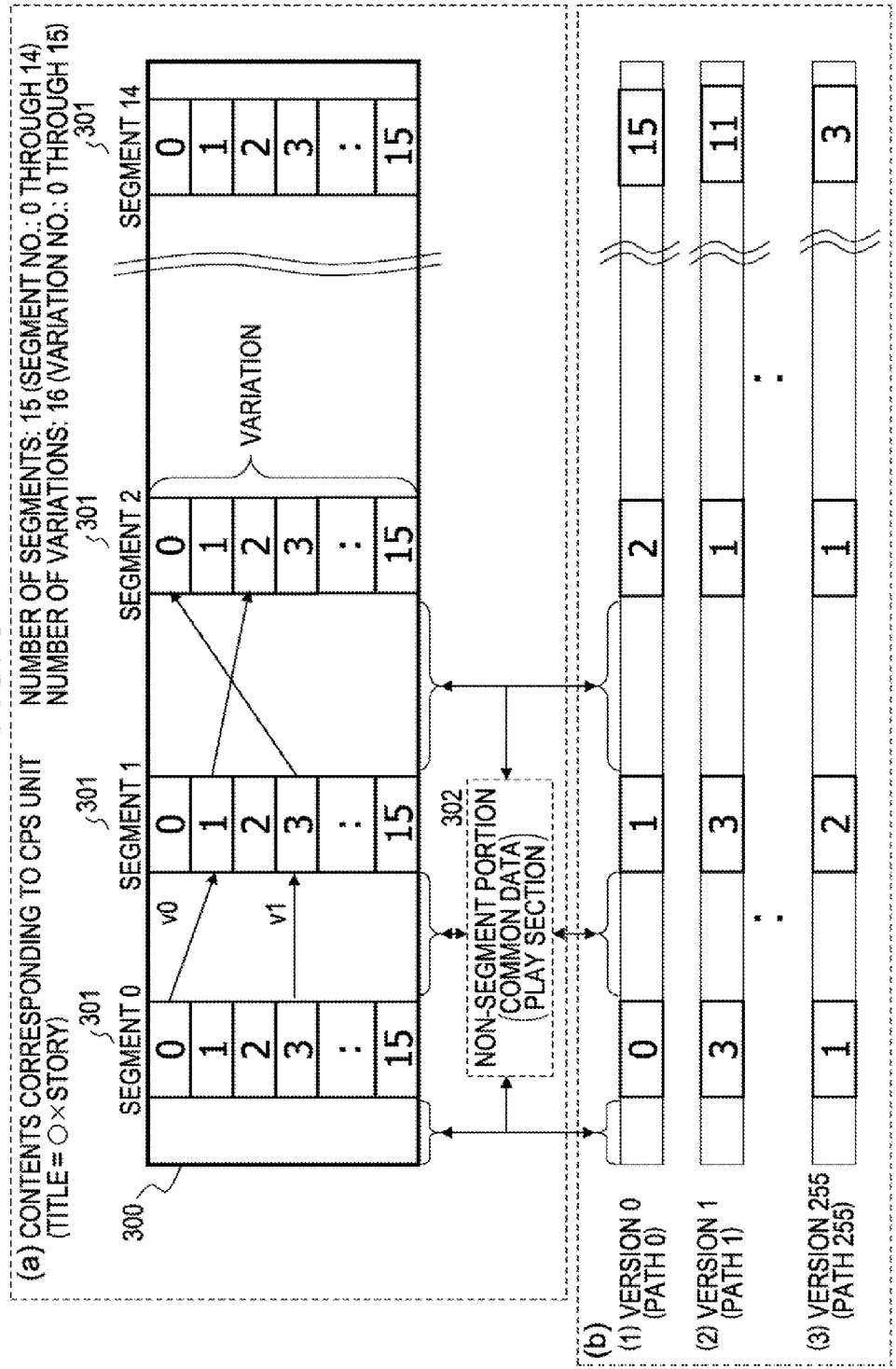
FIG. 3 is a diagram for describing a segment setting configuration for contents.

FIG. 3(*a*) is a diagram for describing the data configuration of one content belonging to a content management unit (CPS unit) stored in the information recording medium. The content 300 is a single movie content making up, for example, title=[OX Story]. The content 300 is configured of multiple segment portions 301 and multiple non-segment portions 302, as shown in the drawing.

To facilitate description, let us say that the playback data is stored following the playback time from the left side to the drawing to the right. The information processing device for playing the content alternately plays the non-segment portions and segment portions of the content 300 shown in the drawing, from the left. The non-segment portions 302 are content portions which can be played by obtaining processing of the above-described unit key (Ku), i.e., content portions which can be played by the unit key (Ku) common to all information processing devices being obtained and decryption processing being performed using the unit key (Ku).

On the other hand, segment portions 301 need to be decrypted by obtaining keys different form the above-described unit key (Ku), i.e., a segment key (Ks) corresponding to each variation of each segment. The number of segments per one content is 15 segments, from 0 through 14 for example, as shown in the drawing, and each of these multiple segment portions 301 is configured of segment data having 16 variations of 0 through 15.

Each of the 16 sets of segment data included in each segment portion 301 is made up of the same data (e.g., the same playback image scene of the movie, several seconds in length). For example, the 16 sets of segment data included in segment 0 store a scene continuing from the non-segment portion 302 preceding the segment 0 (to the left in the drawing).

Each of the 16 sets of segment data of the variations 0 through 15 included in the segment 0 is data corresponding to the same scene, with each being data encrypted with different segment keys [Ks(0, 0) through Ks(0, 15)].

Note that the notation of segment key Ks(x, y) represents x=segment No., and y=variation No. That is to say, a segment key Ks(x, y) is a segment key corresponding to a segment No.=x and a version No. y. All segment data included in the segments 0 through 14 shown in the drawing (15×16=240 sets) is data that has been encrypted by the segment keys [Ks(0, 0) through Ks(14, 15)]. The information processing device which performs content playback can only decrypt one segment data selected from the 16 sets of segment data of variations 0 through 15 included in the segment 0. For example, an information processing device A is capable of obtaining only one segment key [Ks(0, 0)] from the segment keys [Ks(0, 0) through Ks(0, 15)], and an information processing device B is capable of obtaining only one segment key [Ks(0, 3)] from the segment keys [Ks(0, 0) through Ks(0, 15)].

In the same way, each of the 16 sets of segment data of the variations 0 through 15 included in the segment 1 is data corresponding to the same scene, with each being data encrypted with different segment keys [Ks(1, 0) through Ks(1, 15)]. The information processing device can only decrypt one segment data selected from the 16 sets of segment data of variations 0 through 15 included in the segment 1, as well. For example, the information processing device A is capable of obtaining only one segment key [Ks(1, 1)] from the segment keys [Ks(1, 0) through Ks(1, 15)], and the information processing device B is capable of obtaining only one segment key [Ks(1, 3)] from the segment keys [Ks(1, 0) through Ks(1, 15)].

At the time of content playback processing, each information processing device obtains a version No. corresponding to the CPS unit based on the unit classification No. set in each CPS unit and the stored data of the unit classification file: Kc(n, i) stored in the memory of the information processing device, obtains a playlist storing the path to be played based on the obtained version No. and executes playback. Processing for obtaining a playlist based on the version No. is performed by program execution of a movie object serving as a playing program belonging to a CPS unit (see FIG. 2). The configuration of a movie object will be described at a later stage.

As for a path which each information processing device can play, an only path is determined based on the version No. corresponding to the CPS unit determined by the information processing device. The arrows v0 and v1 indicate a path set for the information processing device of which the version value obtained corresponding to the CPS unit to which the content (OX Story) belongs is 0 (v0), and a playback path set for the information processing device of which the version value is 1 (v1). That is to say, the playback path is determined according to the version.

With the example shown in the drawing, the information processing device for version 0 (v0) selects data of the variation No. 0 at segment 0, selects data of the variation No. 1 at segment 1, and performs decryption applying the segment keys corresponding to each. This is the playback sequence shown in (1) of FIG. 3(b). The information processing device for version 1 (v1) selects data of the variation No. 3 at segment 0, selects data of the variation No. 3 at segment 1, and performs decryption applying the segment keys corresponding to each. This is the playback sequence shown in (2) of FIG. 3(b). As for the non-segment portions, a key common to all information processing devices (CPS unit key (Ku)) is obtained and the same data is decrypted.

Note that FIG. 3(b) shows the version No. and the path No. matching for sake of ease of description, but these numbers do not always have to match. In FIG. 3(b), the path No. of the path set as to version 0 is 0, and the path No. of the path set as to version 1 is 1. With a setting of 15 segments and 16 versions, a total of $15^{16}$ different paths can be set.

As with the set number of passes, the number of versions what can be set is $15^{16}$. That is to say, each information processing device can be set such that a different version is set. Alternatively, with regard to contents of a certain CPS unit, an arrangement may be made wherein settings of a single version are used for each model of information processing device. That is to say, a configuration may be made wherein the same version settings are used for information processing devices of the same mode, for contents corresponding to one CPU unit.

Though $15^{16}$ different version settings can be made in reality, the following description will be made regarding an example wherein the versions are set to the 256 types of 0 through 255.

As shown in FIG. 3(b), an information processing device which has obtained the 256 types of version, of version 0 through version 255, regarding a certain content, executes playback following each of the different path 0 through path 255. At least these 256 paths are of different settings.

A data placement configuration of contents stored in the information recording medium will be described with reference to FIG. 4. FIG. 4(a) is a diagram for describing a segment configuration, as with FIG. 3(a). The actual data placement on the disc serving as the information recording medium is the placement shown in FIG. 4(b). That is to say, the segment portions 301 and non-segment portions 302 are arrayed alternately. Segment data corresponding to the different version Nos. 0 through 15 is placed in the segment portions.

The arrows in FIG. 4(b) illustrate the playback path (path 0) of the information processing device which has obtained the version 0 (v0) as the value of the version corresponding to the playback content. The non-segment portion 302 is data common to all versions, and can be decrypted and played using the above-described CPS unit key. The segment portions 301 are data of the same scene encrypted with the different encryption keys 0 through 15, with data of one variation determined based on the version being selected and decryption and playback being performed.

Note that variation identification information is recorded by electronic watermarking or the like for example, for each of the segment data corresponding to the number of variations set for each segment. As shown in FIG. 3 and FIG. 4, in the event that there are 16 variations of 0 through 15 for a segment, identification information for identifying the variation of each segment data is embedded in the segment data. For example, numerical data equivalent to the variation No. of 0 to 15 is embedded as an electronic watermark. This is in order to, in the event that an unauthorized copied disc is circulated at a later data, the path of the unauthorized copy data can be analyzed and the copying source can be identified.

The information processing device obtains a playlist determined based on a version No. that has been obtained by obtaining the version No. of the corresponding unit, based on the unit classification No. correlated with the CPS unit to be played, and the setting data of the unit classification key file stored in itself, and performs playback based on the playlist. Performing playback of the selected playlist executes playback following a particular playback path.

What sort of path to set for each playlist in a CPS unit can be arbitrarily set at the content production or editing side, and paths applicable to information processing devices of versions 0 through 255 can be arbitrarily set, corresponding to contents belonging to the contents management unit.

(2.3. CPS Unit Key File)

A contents management unit (CPS unit) stored in the information recording medium is assigned a unit classification No., as described earlier with reference to FIG. 2. Setting information of the unit classification Nos. for each of the multiple contents management units (CPS units) stored in the information recording medium is stored in the CPS unit key file 115 shown in FIG. 1.

A specific configuration of the CPS unit key file will be described with reference to FIG. 5 and FIG. 6. FIG. 5 illustrates the configuration of a CPS unit key file as a table, and FIG. 6 is a syntax diagram illustrating the actual file data configuration. As shown in FIG. 5, the CPS unit key file is sectioned into index information such as title and so forth, and is of a data configuration within a contents management unit No. (CPS unit No.) corresponding to each index, a unit classification No. (Movie Sequence Number), and an encrypted CPS unit key [Kun], having been correlated.

Numbers of 0 through 254, for example are set for the unit classification No. (Movie Sequence Number), and one of the unit classification Nos. selected from the 255 types of 0 through 254 is set for each contents management unit (CPS unit). This setting processing can be carried out at the content production or editing side.

The CPS unit key file shown in FIG. 5 corresponds with the configuration shown in FIG. 2, with Title 1 and Title 2 belonging to the same CPS unit (CPS1) for example, and the unit classification No.=14 is set. Application 1 belongs to the CPS unit (CPS2), and the unit classification No.=35 is set.

The information processing device which executes contents playback obtains a version No. corresponding to the CPS unit based on the unit classification No. set for each CPS unit and the stored data of the unit classification key file stored in itself, and performs playback based on a playlist determined based on the version (path information has already been set). That is to say, with a segment portion in the content already described with reference to FIG. 3, a single segment data is selected, and decryption and playback processing is executed.

FIG. 6 is a syntax diagram illustrating the data configuration corresponding to the CPS unit key file shown in FIG. 5. The data unit 321 is a definition information recording region of the CPS unit No. corresponding to each index, and the data portion 322 is a region recording definition information of the unit classification No. corresponding to each CPS unit and encryption CPS unit key corresponding to each CPS unit.

(2.4. Segment Key File)

Next, description will be made regarding the detailed configuration of a segment key file 116 stored in the information recording medium 100 (see FIG. 1), with reference to FIG. 7, FIG. 8, and FIG. 9. A segment key file is set for each contents management unit (CPS unit) stored in the information recording medium. That is to say, in the event that there are n CPS units stored in the information recording medium, n segment key files are set and stored in the information recording medium.

FIG. 7 shows the configuration of a segment key file as a table, and FIG. 8 is a syntax diagram illustrating the actual data configuration of a segment key file. As shown in FIG. 7, a segment key file is configured as corresponding data of unit version, and encrypted data of segment keys corresponding to segments 0 through 14.

The n in unit version V(n, i) is path Nos. 0 through 255, and i is the unit classification No. Note that the path No. is the path identification No. set by selecting one segment data from the segment portions described earlier with reference to FIG. 3 and FIG. 4. As described earlier, a path is determined based on the unit classification No. set for each CPS unit, and the version No. corresponding to the CPS unit determined based on the stored data in a unit classification key file: Kc(n, i) stored in the memory of the information processing device. That is to say, the configuration is such that one path is determined based on one version No. Description will be made with version No.=path No. for the same of ease of description, but these numbers do not necessarily have to match.

The i in unit version V(n, i) is unit classification No., and since the Title 1 described with reference to FIG. 2 and FIG. 5 is CPS unit 1 and the unit classification No.=14, so contents corresponding to the title 1 of the CPS unit 1 have the settings of unit version (0, 14) through (255, 14).

The information processing device which executes content playback selects one from the 256 types of unit versions (0, 14) through (255, 14), obtains encrypted segment key generating keys Ks'(x, y) from the entries of the segments 0 through 14 set corresponding to the selected row of the table, decrypts each encrypted segment key generating key Ks'(x, y) so as to obtain an segment key generating key Ks'(x, y), and further obtains a segment key Ks(x, y) based on the segment key generating key Ks'(x, y), and decrypts one segment data corresponding to the variation No. 0 through 15 set for each segment 0 through 14. Specific processing thereof will be descried later.

In the segment key file shown in FIG. 7, stored in the region of segment 0 through segment 14 are encrypted segment key generating keys, i.e., [Enc(Ke'(n, i), Ks'(x, y))]. Note that Enc(a, b) indicates data b which has been encrypted by a. The n and i in Ke'(n, i) are the same as the n and i in unit version V(n, i), wherein n is path No. 0 through 255, and i is unit classification No. In Ks'(x, y), x is the segment No. (0 through 14), and y is the variation No. (0 through 15) in each segment. The segment No. and variation No. are as described with reference to FIG. 3. Key Ke'(n, i) is a key capable of being generated based on the stored data of the information processing device and the stored data of the information recording medium. Generating of this key will be described at a later stage.

The information processing device which executes content playback selects one from the 256 types of unit version (0, i) through (255, i), obtains an encrypted segment key generating key Ks'(x, y) from the entries of the segments 0 through 14 set corresponding to the selected row of the table, and performs playback.

Which unit version to be selected is determined based on the unit classification No. set corresponding to the CPS unit to which the playing contents belong, and the stored data of the unit classification key file stored in the memory of the information processing device. For example, a playlist set to one certain path is selected, based on for example, the version No. determined based on the unit classification No. and the stored data of the unit classification key file. A selected playlist is configured of play items following any one path of the 256 types of unit versions (0, i) through (255, i) shown in FIG. 7, and playback following the playlist means that playback follows one path of the 256 types of unit versions (0, i) through (255, i) shown in FIG. 7.

For example, with an information processing device which selects the top version (0, i) in FIG. 7 as the playback path, at segment 0 the encrypted segment key generating key Ks'(0, 3) can be obtained, and segment data of variation No. 3 with the segment No. 0 can be selected and decrypted, and at segment 1 the encrypted segment key generating key Ks'(1, 2) can be obtained, and segment data of variation No. 2 with the segment No. 1 can be selected and decrypted. Thus, each of the 256 types of unit versions (0, 14) through (255, 14) correspond to a different path, and the information processing device selects segment data and executes playback following an only path selected from the 256 types of paths.

Figure 12:
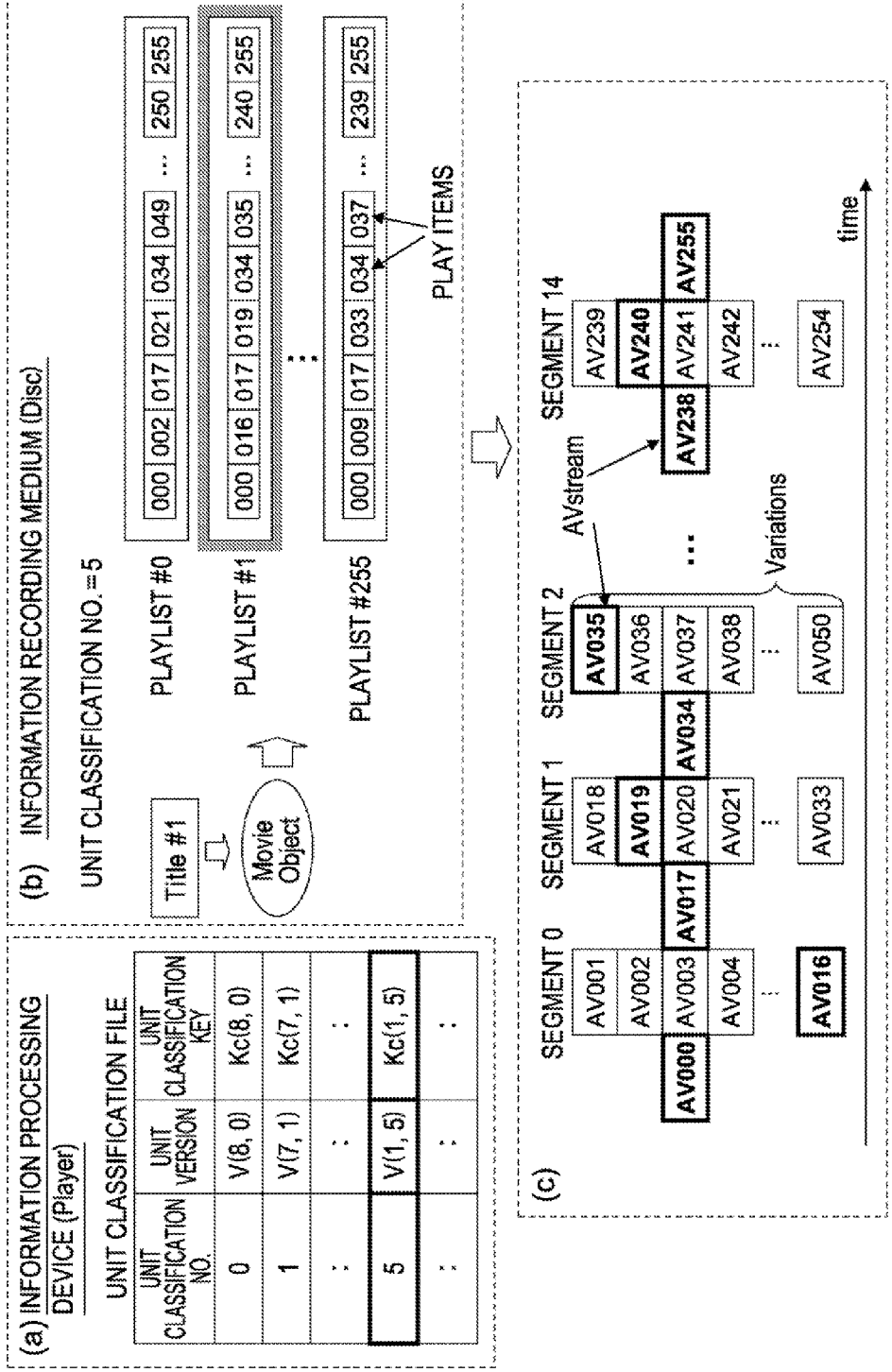
FIG. 12 is a diagram for describing selection of a playlist based on a movie object which is a content playback program, and playback processing based on a play item.

Actual path setting information is recorded in the playlist described with reference to FIG. 2. That is to say, playlists are set corresponding to the 256 types of paths, and the information processing device executes playback following the playlists selected based on determination of the unit versions, thereby selecting and playing one path corresponding to one of the unit versions set in the table shown in FIG. 7. Path setting configuration based on playlists and play items will be described at a later stage with reference to drawings (FIG. 12).

FIG. 8 is a syntax diagram illustrating the data configuration corresponding to the segment key file shown in FIG. 7. The data unit 331 is a recording region of a CPS unit No. which performs content playback applying a sequence key (Sequence Key) made up of a sequence of a particular segment key and CPS unit key, and further, the data portion 332 is a recording region of definition information corresponding to the table shown in FIG. 7, i.e., playlists corresponding to the 256 types of unit versions, and further, play item information in the playlists, and further, encrypted segment key generating key Ks'(x, y) for each segment. While the table shown in FIG. 7 only shows the encrypted segment key generating key Ks'(x, y) for each segment, the segment key file stores playlist ID and play item ID corresponding to each segment, as shown in FIG. 9.

At the time of content playback, the information processing device selects and plays a playlist and play items identified by a movie object serving as a playing program, which will be described with reference to FIG. 11.

A playlist is sequence data of play items serving as increments of playing following a playing path, set as a play item string, with the segment portions and non-segment portions described earlier with reference to FIG. 3 arrayed following the playing path. Individual playlists and play items have assigned thereto a playlist ID or play item ID, as an identifier, and at the time of playing contents, the segment key file is referred to determination is made regarding whether or not the ID is the same as the playlist ID or play item ID set in the segment key file, and in the same of having the same ID, determination is made that playing is of data corresponding to the segment, a segment key is generated, and decryption is formed of data of one of the variations 0 through 15 selected from the segment by a play item in the playlist.

(2.5 Unit Classification Key File)

Next, the unit classification key files which the information processing device which executes content playback holds in the memory will be described with reference to FIG. 10. FIG. 10 is a diagram illustrating the configuration of a unit classification key file which the information processing device 150 stores in memory. As described earlier with reference to FIG. 1, the information processing device 150 stores unit classification key file: Kc(n, i) in the memory 154.

As shown in FIG. 10, a unit classification key file is configured of corresponding data of unit classification No., unit version V(n, i), and unit classification key (n, i). The unit version V(n, i) and unit classification key (n, i) are the same as the n and i in unit version V(n, i) described earlier with reference to FIG. 7, wherein n is path No. 0 through 255, and i is unit classification No. The information processing device which executes content playback holds the 255 unit classification keys, corresponding to the unit classification Nos. 0 through 254 shown in FIG. 10.

AS described above, a unit classification No. is a number set corresponding to each content management unit (CPS unit), and the information processing device which executes content playback selects a unit classification key based on the unit classification No. of the content to be played. For example, in the event of an information playing device having the table shown in FIG. 10 playing contents corresponding to a CPS unit having a unit classification No.=0, the unit classification key: Kc(35, 0) is selected. Specific processing in content playback will be described later.

(2.6. Movie Object)

Next, description will be made regarding the configuration of a movie object, which is a content playing program included in a content managing unit recorded in the information recording medium, with reference to FIG. 11. A movie object is a program applied to playing of contents set in the (B) movie object hierarchical level in the CPS hierarchical configuration diagram shown in FIG. 2.

Figure 11:
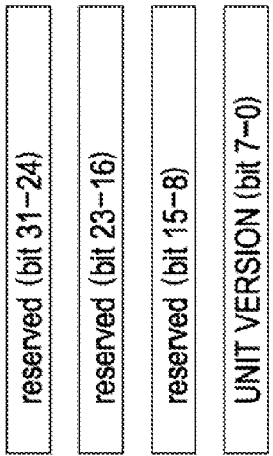
FIG. 11 is a diagram for describing the configuration of a movie object which is a content playback program.

FIG. 11 illustrates the register configuration of the information processing device in (a), and illustrates three movie object examples of (b1), (b2), and (b3). A movie object is a program which selects one of playlists 0 through 255, in accordance with register setting values (0 to 255) of the information processing device.

At the time of executing content playback processing, the information processing device sets a value obtained based on the unit classification No. set to the CPS unit to which the contents to be played belong and the unit classification key data which the information processing device has, in the register. The register setting value is the version No. A playlist with one particular path set, is selected based on the version No. determined based on the unit classification No. and the stored data of the unit classification key file.

For example, the register and setting value is defined as follows.

Register No.=PSR29
Name=unit version
Range of value=0 to 255
Definition=information used for selecting playing path for contents corresponding to sequence key (Sequencekey)
Operation=at the time of inserting information recording medium, and at the time of changing CPS unit, sets a value obtained based on the unit classification No. set to the CPS unit and the unit classification key data which the information processing device has, in the register. Note that PSR29 means player status register 29, which is one of registers for holding state and setting information of the equipment.

With the movie object settings shown in FIG. 11 (b1), in the event that the setting value of the register [PSR29] is 0, the playlist A is selected and playing is executed. In the event that the setting value of the register [PSR29] is 1, the playlist B is selected and playing is executed. In the event that the setting value of the register [PSR29] is 255, the playlist X is selected and playing is executed. Each of the playlists are playlists having play items corresponding to one of the paths of the 256 types of unit versions (0, i) through (255, i), shown in FIG. 7 for example.

The movie object shown in FIG. 11(b1) is of a program configuration describing playlists corresponding to each of the register setting values, but a program may be made wherein the register setting value itself is set as the playlist ID, as with the movie object shown in FIG. 11(b2), for example. With this setting example, in the event that the setting value of the register [PSR29] is 0, the playlist 0 is selected and playing is executed. In the event that the setting value of the register [PSR29] is 1, the playlist 1 is selected and playing is executed.

Further, the movie object shown in FIG. 11(b3) is an example of executing computation processing (F) with regard to each of the register setting values, and setting the values obtained as a result thereof as playlist IDs. The computation employed with this setting example is capable of calculation wherein a predetermined number (256) is added to the register setting value, or the like, such as Playlist_id=256+[PSR29].

Selection of a playlist based on a movie object, and setting of a playing path, will be described with reference to FIG. 12. FIG. 12(a) illustrates a unit classification key file stored in the information processing device. (b) illustrates the configuration of contents corresponding to one CPS unit stored in the information recording medium. With this configuration, a unit classification No.=5 is set for the contents corresponding to the CPS unit, a movie object is specified as a playing program based on the Title #1, and a play list is selected based on this movie object. This configuration corresponds to the CPU unit configuration described earlier with reference to FIG. 2.

The playlist shown in FIG. 12(*b*) is configured of 255 playlists corresponding to the playing paths, each having a different play item sequence. That is to say, with segments 0 through 14, settings are made such that play items are selected corresponding to a path regarding which one segment data has been selected. Note that one segment data has been illustrated in the drawing as one play item, to facilitate understanding. Also, regarding the amount of a play item, either a configuration wherein this is set to be equal to the data amount of a segment, or a configuration wherein this is set to be different, may be employed.

As described earlier with reference to FIG. 11, a movie object is of a setting wherein one playlist is selected based on the version No. determined based on the unit classification No. and the stored data of the unit classification key file stored in the memory of the information processing device. With the example shown in FIG. 12, the unit classification No.=5.

At the unit classification key file stored in the memory of the information processing device, the entry wherein the unit classification No.=5 is extracted, and the unit version set corresponding this entry is obtained. V(1, 5) has been set for the unit version. 1 is the number serving as the path No., and 5 is the unit classification No. Here, [1] which is the number serving as the path No. is used as the version No. obtained by the move object. Note that configurations may also be made wherein the version No. is calculated applying the path No. or unit classification No.

As described earlier with reference to FIG. 11, a movie object specifies a playlist corresponding to each version No., and in this case, we will say that playlist 1 is specified as to version No. 1.

A playlist has sequence information of multiple play items, as shown in the drawing. The playlist 1 has play item information of [000] [016] [017] [019] . . . [255]. The content playing processing is performed as playing processing with these play items selected in order.

FIG. 12(*c*) illustrates the playing processing configuration for play item 1 correlated to segment portions and non-segment portions. As shown in FIG. 12(*c*), the play item specified by play item 1 is the sequence of [AV000] of the non-segment portion, [AV016] of the segment portion, and [AV017] of the non-segment portion, within one path being set and played according to the playlist. Note that [AVxxx] means AV stream data corresponding to a play item [xxx].

At each segment portion, one segment data is selected from multiple versions of segment data, and playing processing is performed. Note that at the time of playing processing, decryption processing by segment key is performed at the segment portions, and decryption processing by unit key is performed at the non-segment portions.

Figure 13:
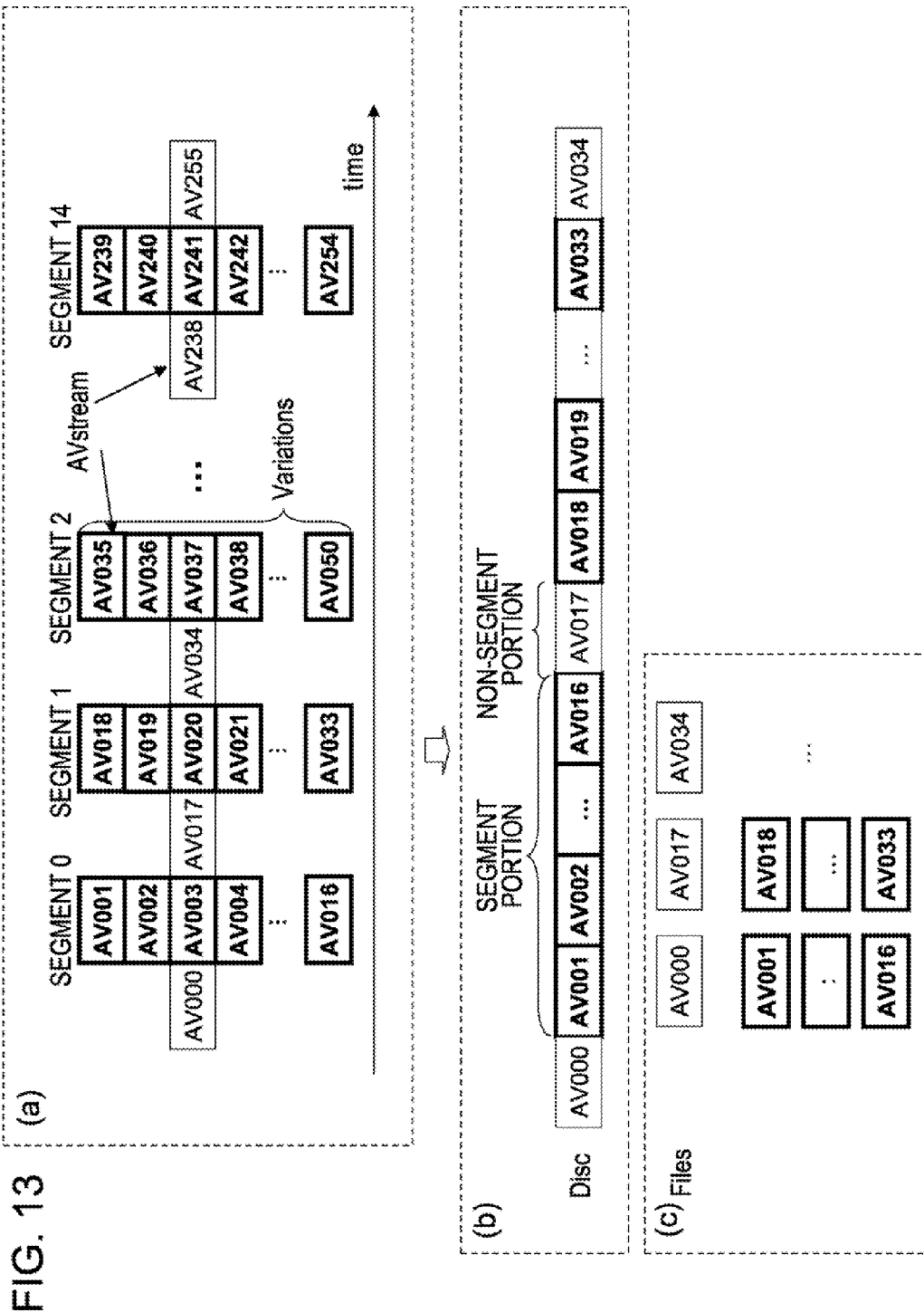
FIG. 13 is a diagram for describing the configuration of contents recorded at the information processing device, and setting configuration of an AV stream data file.

Note that as shown in FIG. 13(*b*), on the information recording medium, AV stream data corresponding to each play item is recorded with AV stream data of non-segment portions and segment data corresponding to multiple variations of segment portions recorded sequentially. This is as described earlier with reference to FIG. 4. Note that as shown in FIG. 13(*c*), the AV stream files set in each of the segment portions and non-segment portions are each set as independent encrypted files, with the start portion and end portion of the files being recorded in a format such that seamless consecutive playback is ensured at the contact point of each of the files.

[3. Contents Playback Processing According to Information Processing Device]

Next, description will be made regarding a contents playback processing sequence according to the information processing device with reference to FIG. 14 and FIG. 15. As described earlier with reference to FIG. 3 and FIG. 4, the contents stored in an information recording medium include segment portions and non-segment portions. With playback processing of a non-segment portion, common processing is performed wherein a unit key (Ku) is obtained to play the non-segment portion regardless of the version of the information processing device, but when playing a segment portion, it is necessary to determine a path for selecting different segment data depending on the version of the information processing device, and select and decrypt segment data along the path.

Figure 14:
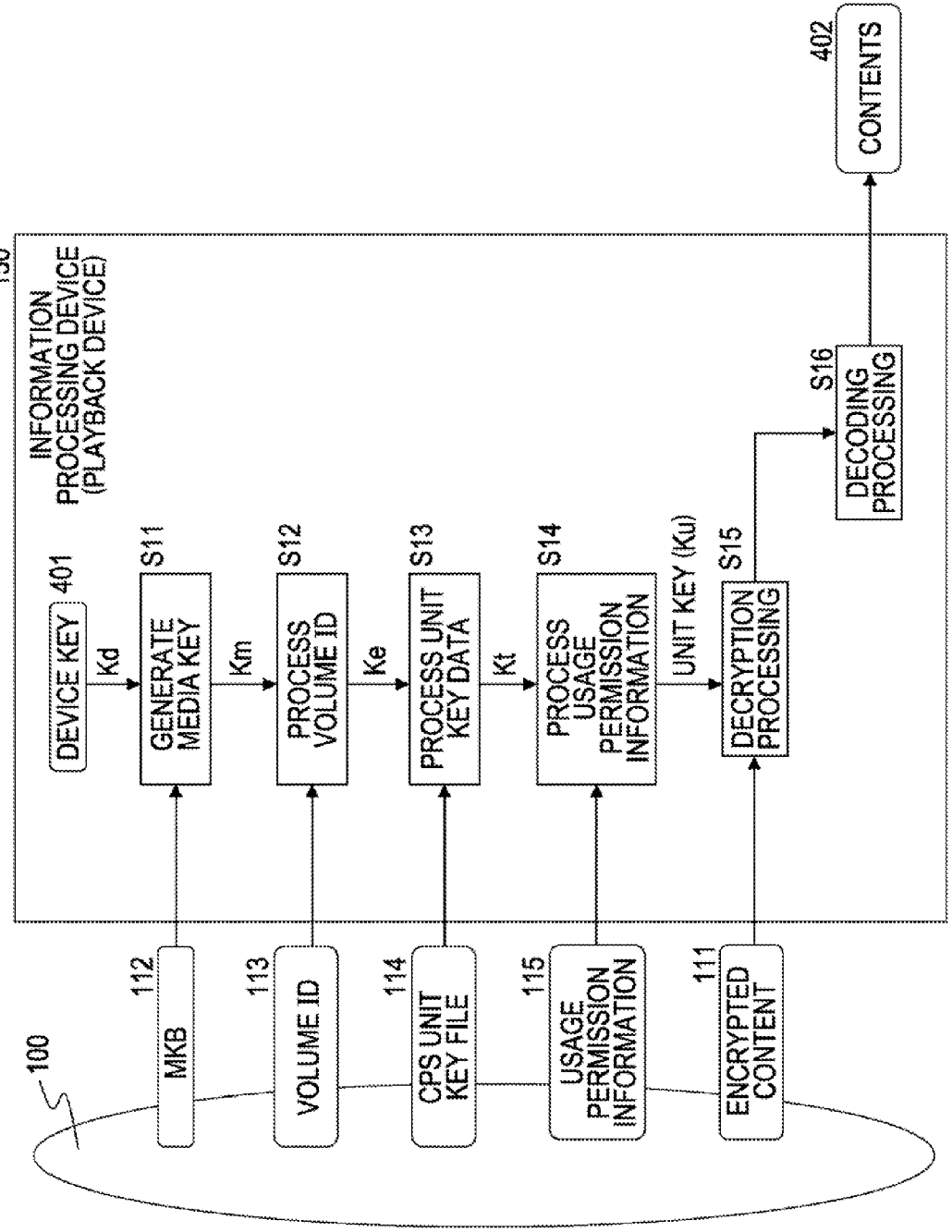
FIG. 14 is a diagram for describing a content playback processing sequence at the information processing device.
Figure 15:
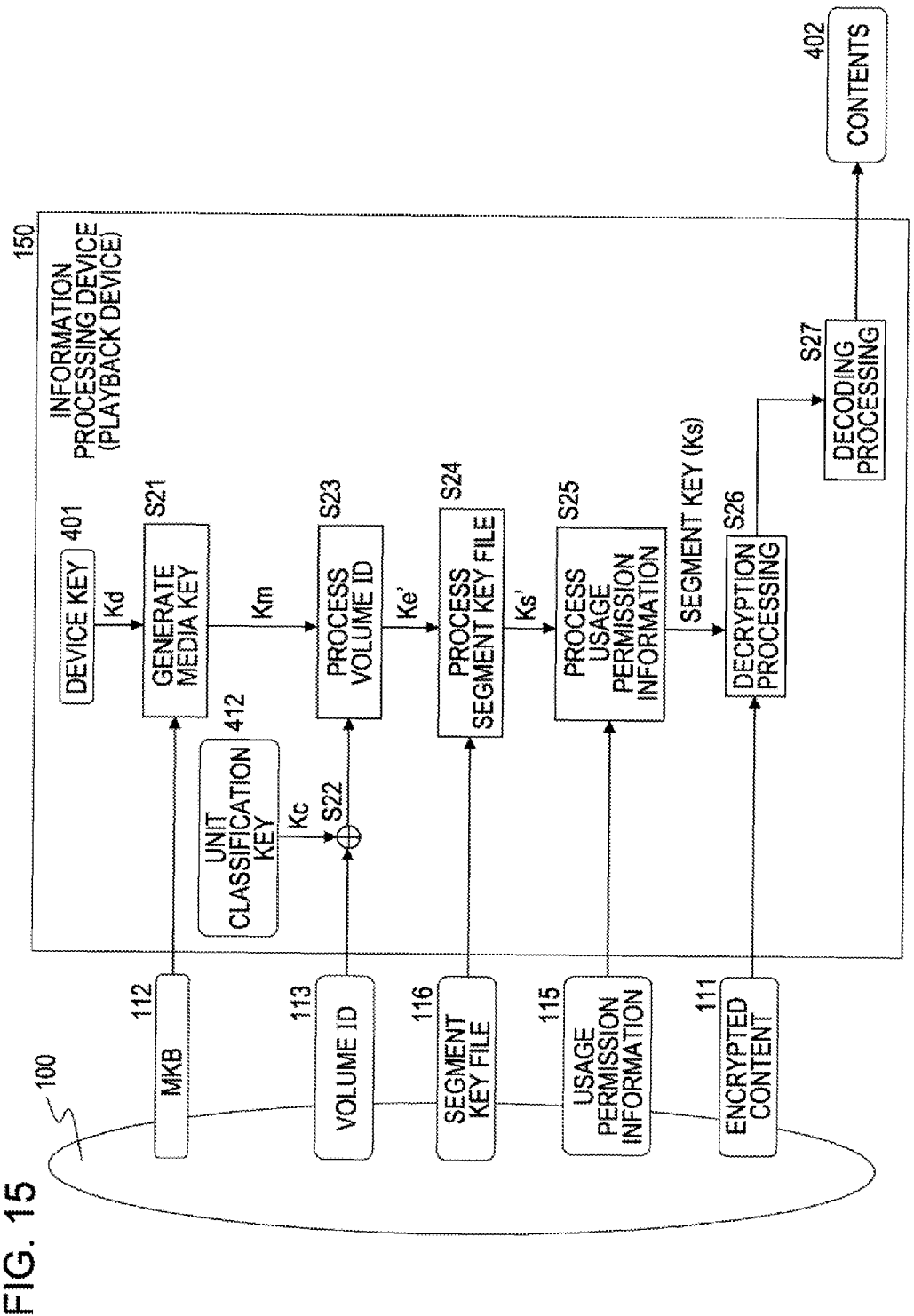
FIG. 15 is a diagram for describing a content playback processing sequence at the information processing device.

FIG. 14 is a diagram describing processing wherein a unit key (Ku) is obtained to perform playback, and FIG. 15 is a diagram describing a playback sequence wherein playback of a segment, i.e., a segment key (Ks) is obtained to perform decryption of segment data.

First, description will be made regarding a playback sequence performed by obtaining a unit key shown in FIG. 14. The information processing device 150 reads various types of information from the information recording medium 100, and the decryption processing of encrypted contents is performed based on a unit key (Ku) generated by key generating processing to which the read data, and a device key 401 possessed by the information processing device 150 are applied.

First, the information processing device 150 reads out the device key (Kd) 401 stored in the memory. The device key 401 is a secret key stored in the information processing device which has received a license relating to usage of contents.

Next, in step S11 the information processing device 150 executes the decryption processing of MKB 112 serving as an encrypted key block storing a media key Km stored in the information recording medium 100 by applying the device key 401 to obtain the media key Km.

Next, in step S12 the information processing device 150 generates a title key generating key Ke (embedded Key) by encryption processing based on the media key Km obtained at MKB processing in step S11, and a volume ID 113 read from the information recording medium 100. The information processing device 150 executes this key generating processing, for example, as processing in accordance with an AES encryption algorithm.

Figure 16:
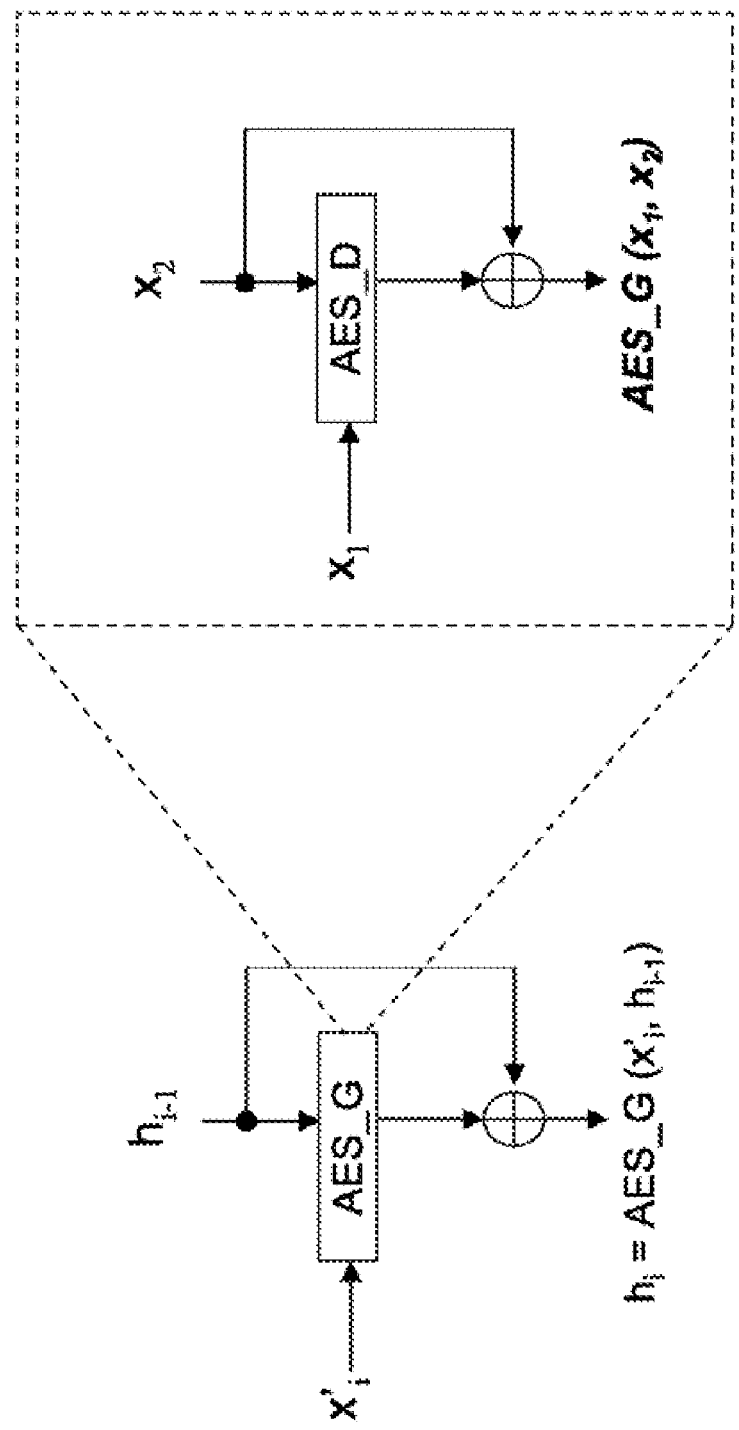
FIG. 16 is a diagram for describing an AES encryption algorithm in detail.

Description will be made regarding the details of the AES encryption algorithm with reference to FIG. 16. As for the processing in accordance with the AES encryption algorithm, for example, the hash function of the AES base [AES_H] is applied. The hash function of the AES base is, as shown in FIG. 16, configured of a combination between a key generating processing execution section (AES_G) and an exclusive-OR section accompanying data decryption processing to which the AES encryption processing is applied. The AES_G section is, further as shown in FIG. 16, configured of a combination of an AES decryption section (AES_D) and an exclusive-OR section.

The information processing device 150 executes the title key generating key Ke (embedded Key) in step S12 in FIG. 14 as the processing wherein, for example, the hash function of the AES base [AES_H] shown in FIG. 16 is applied with the media key Km obtained in the MKB processing in step S11, and the volume ID 113 read from the information recording medium 100 as input.

Next, in step S13 the information processing device 150 executes, for example, unit-key data processing such as encryption processing (AES_H) based on the title key generating key Ke (Embedded Key), and an encrypted CPS unit key [Kun] obtained from a CPS unit key file 114 read from the information recording medium 100 (see FIG. 5 and FIG. 6) to obtain a title key Kt.

Next, in step S14 the information processing device 150 generates a unit key Ku with the encryption processing (AES_H) based on the title key Kt, and the use permission information 115 read from the information recording medium 100, and in step S15 subjects the encrypted contents read from the information recording medium 100 to decryption processing to which the unit key is applied (e.g., AES_D).

Next, in step S16 the information processing device 150 executes necessary decoding processing, for example, such as MPEG decoding, decompression, descrambling, or the like to obtain contents 402.

Description has been made thus regarding the decryption processing sequence as to non-segment data other than segment portions. An information recording medium includes contents having no segment portion made up of multiple variations described with reference to FIG. 3 and FIG. 4, i.e., contents made up of a non-segment portion alone in some cases. With regard to such contents, decryption and playback of the contents can be performed only by generating a unit key such as shown in FIG. 14.

With regard to contents having a segment portion made up of multiple variations described with reference to FIG. 3 and FIG. 4, a segment key is generated in accordance with the sequence shown in FIG. 15. Description will be made regarding each step of the sequence shown in FIG. 15.

The information processing device 150 reads out the device key (Kd) 401 stored in the memory. The device key 401 is a device key described with reference to FIG. 14, and also a secret key stored in an information processing device having received a license relating to contents use.

Next, in step S21 the information processing device 150 executes the decryption processing of the MKB 112 serving as an encrypted key block storing the media key Km stored in the information recording medium 100 by applying the device key 401 to obtain the media key Km.

Next, in step S22 the information processing device 150 executes a calculation based on the volume ID 113 read from the information recording medium 100, and a unit classification key (Kc) 412 stored in the information processing device, e.g., an exclusive-OR (XOR) operation. Note that the unit classification key (Kc) 412 is selected based on the unit classification No. set in the CPS unit to which contents to be played belongs from a unit classification file (see FIG. 10) stored in the information processing device.

In step S23, the information processing device 150 subjects the calculation result in step S22 to encryption processing with the media key Km obtained by the MKB processing in step S21 to generate a title key generating key Ke' (embedded Key). The information processing device 150 executes this key generating processing, for example, as processing in accordance with the AES encryption algorithm described earlier with reference to FIG. 16.

Next, in step S24 the information processing device 150 decrypts [Enc(Ke'(n, i), Ks'(x, y))] obtained from a segment key file 116 (see FIG. 7 and FIG. 8) read from the information recording medium 100 based on the title key generating key Ke' to obtain a segment key generating key Ks'(x, y). The information processing device 150 performs decryption processing by obtaining encrypted data corresponding to any one of segments 0 through 14 set in the segment key file 116 based on the segment No. to be played.

Further, in step S25 the information processing device 150 generates a segment key Ks(x, y) by the encryption processing (AES_H) based on the segment key generating key Ks'(x, y), and the use permission information 115 read from the information recording medium 100, and in step S26 subjects the segment data of the encrypted contents read from the information recording medium 100 to the decryption processing applying the segment key (e.g., AES_D).

Note that the segment data selected here is any one of variation Nos. 0 through 15. This selected data is automatically selected by a play list. That is to say, the segment data selected here is data corresponding to a play item selected by a play list determined by a movie object based on the version No. which is based on the unit classification No. of the CPS unit to which the contents to be played belongs, and the unit classification key file possessed by the information processing device. The y of the segment key Ks(x, y) is equivalent to a variation No. The x is a segment No. The information processing device consequently executes processing arranged to generate a segment key for each segment.

Upon the decryption processing of segment data being performed by the generated segment key Ks, next in step S27 the information processing device 150 executes necessary decoding processing, for example, such as MPEG decoding, decompression, descrambling, or the like to obtain contents 402. Description made so far is regarding the decryption processing sequence as to segment portion data.

Figure 17:
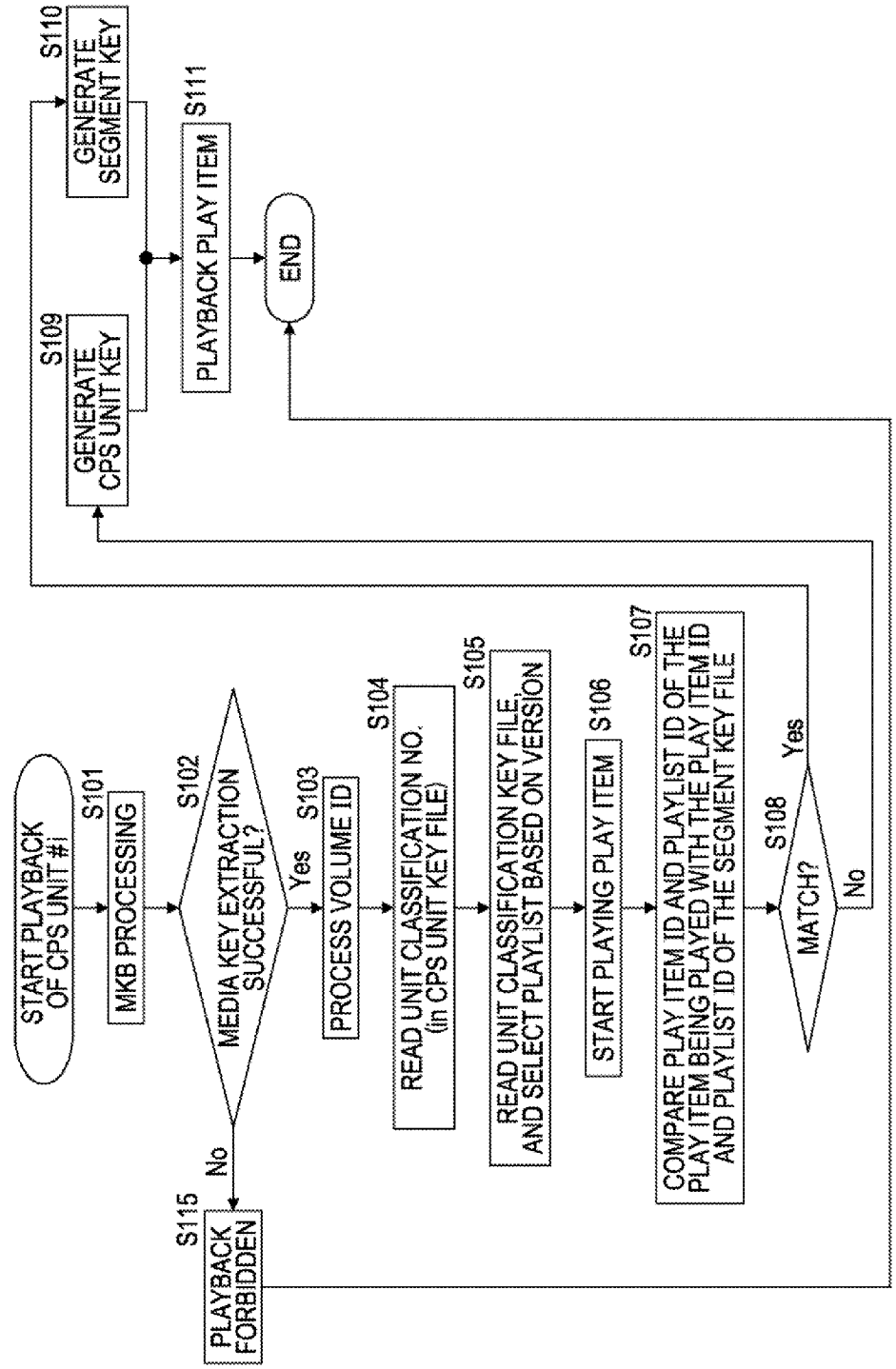
FIG. 17 is a diagram illustrating a flowchart for describing the sequence of content playback processing.

In FIG. 14 and FIG. 15, description has been made with the segment data and the non-segment data as separate processing, but next, description will be made regarding a contents playback processing sequence in the information processing device including both of those processing with reference to the flowchart shown in FIG. 17.

Description will be made regarding each step of the flowchart shown in FIG. 17. First, the information processing device selects the CPS unit of contents to be played. A unit No. (#i) serving as a unit identifier has been set in the CPS unit, as described earlier with reference to FIG. 2 and FIG. 5, for example.

The information processing device in step S101 reads out the MKB from the information recording medium, performs encryption processing to which a media key stored in the information processing device is applied to obtain the media key from the MKB. This processing is equivalent to the processing in step S11 shown in FIG. 14 and in step S21 shown in FIG. 15.

In the event of determining in step S102 that the obtaining of the media key has been unsuccessful, the information processing device is not capable of proceeding to the subsequent processing, so proceeds to step S115, where the playback is cancelled, and the processing ends. This case means that the information processing device has been revoked, i.e., has not been recognized as a valid playback permission device. The MKB is updated as necessary, which can be set so as to prevent the media key from being obtained by an invalid device key.

Upon succeeding in obtaining of the media key, the information processing device proceeds to step S103 to execute the processing of the volume ID read out from the information recording medium. According to the processing of the volume ID, a title key generating key Ke (embedded Key) is generated. This processing is equivalent to the processing in step S12 shown in FIG. 14.

Next, in step S104 the information processing device reads out a unit classification No. from the CPS unit key file (see FIG. 5 and FIG. 6) stored in the information recording medium. Next, in step S105 the information processing device reads out the unit classification file (see FIG. 10) stored in the memory of the information processing device, obtains a unit version based on the unit classification No. of contents to be played, and the unit classification file, and a play list is selected by a movie object based on the selected unit version (see FIG. 11 and FIG. 12).

Next, in step S106 the information processing device starts the playback of a play item. A play item is information specifying a playback zone included in the play list specified by the playback program of contents to be played. A play item is included in the play list selected based on the playback program (movie object) described earlier with reference to FIG. 11 and FIG. 12.

Next, in step S107 the information processing device compares the play list ID and play item ID selected as a playback object with the play item ID and play list ID set in the segment key file (see FIG. 7, FIG. 8, and FIG. 9) corresponding to the CPS unit to which contents to be played belongs, based on a playback program (movie object). In the event that these are in agreement, the information processing device determines these to be the playback of segment associated data, generates a segment key in step S110, and performs decryption and playback of the play item serving as segment data in step S111. The generation processing of a segment key executed in step S110 is processing in accordance with the sequence described earlier with reference to FIG. 15.

In the event that the play list ID and play item ID selected as a playback object are not identical with the play item ID and play list ID set in the segment key file (see FIG. 7, FIG. 8, and FIG. 9) corresponding to the CPS unit to which contents to be played belongs in step S107, based on a playback program (movie object), the information processing device determines these to be the playback of non-segment data which is not segment associated data, generates a unit key in step S109, and performs the decryption and playback of the play item serving as non-segment data in step S111. The generation processing of a unit key executed in step S109 is processing in accordance with the sequence described earlier with reference to FIG. 14.

[4. Jump Processing and Contents Storage Format]

In the event that contents including segment data described earlier with reference to FIG. 3 and FIG. 4 are recorded in an information recording medium (disk), and is played, for example, upon employing the recording configuration described with reference to FIG. 4(b) and FIG. 18(b), it is necessary to employ processing wherein a reading head of the information processing device is jumped at the time of playback processing. Description will be made regarding this processing with reference to FIG. 18.

Figure 18:
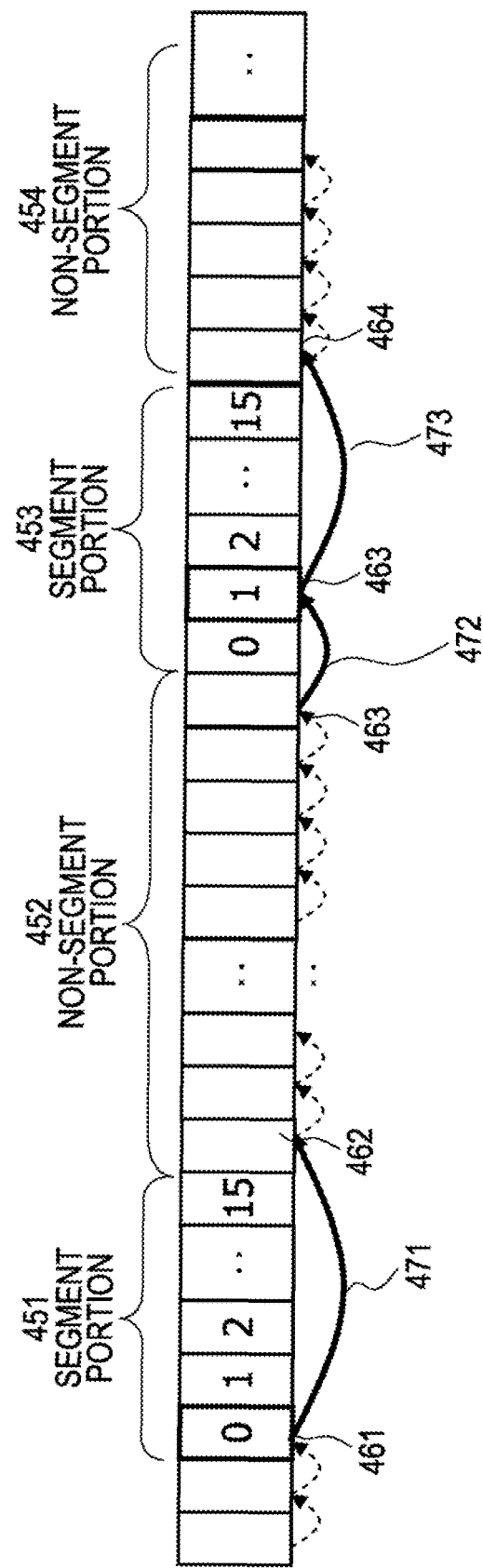
FIG. 18 is a diagram for describing occurrence of jump processing when playing contents recorded at the information processing device.

FIG. 18 illustrates a data recording configuration wherein segment portions 451 and 453, and non-segment portions 452 and 454 are alternately sequentially arrayed and recorded, as with the data recording configuration described with reference to FIG. 4(b). Let us consider the playback processing of recorded contents having such a placement.

As described above, the information processing device is provided with a path selecting one piece of segment data from each segment portion, and reads and plays the data in accordance with the path thereof. For example, in the event that the path shown in the arrow in FIG. 18 has been set, and playback is performed, the segment data 461 of the segment portion 451 and the data 462 of the non-segment portion 452 are not recorded in a continuous area, so a jump 471 occurs. Similarly, the data 462 of the non-segment portion 452 and the data 463 of the segment portion 453 are also not recorded in a continuous area, so a jump 472 occurs, and similarly, the segment data 463 of the segment portion 453 and the data 464 of the non-segment portion 454 are also not recorded in a continuous area, so a jump 473 occurs.

Thus, when employing a configuration wherein multiple segment data are integrally recorded, and segment data and non-segment data are arrayed in playback sequence, jump processing frequently occurs at the time of playback of contents.

With the reading and playback processing of contents stored in a disk, a procedure such as
  obtaining of information from the disk,
  temporarily storing (buffering) the obtained information,
  decryption of the buffered data, and
  output of decrypted data, is executed.

In the event of accompanying jump processing, obtaining of the information from the disk delays, which increases the possibility that a playback break will occur.

With the playback of a disc-type information recording medium storing contents, in order to execute playback processing without a break in the event that jump processing occurs, it is necessary to stipulate a contents storage position, and set the longest jump distance serving as jump occurrence permission distance, and perform contents recording in accordance with this setting.

With a DVD (Digital Versatile Disc) serving as a disc-type recording medium, in order to enable playback without a break in the event that a jump occurs within one recorded layer, as the drive specifications wherein the playback of the disc is performed, the drive specifications have been already determined wherein time from the end of playback at a jump starting point to the start of playback at a jump destination is set to be predetermined time or less.

Figure 19:
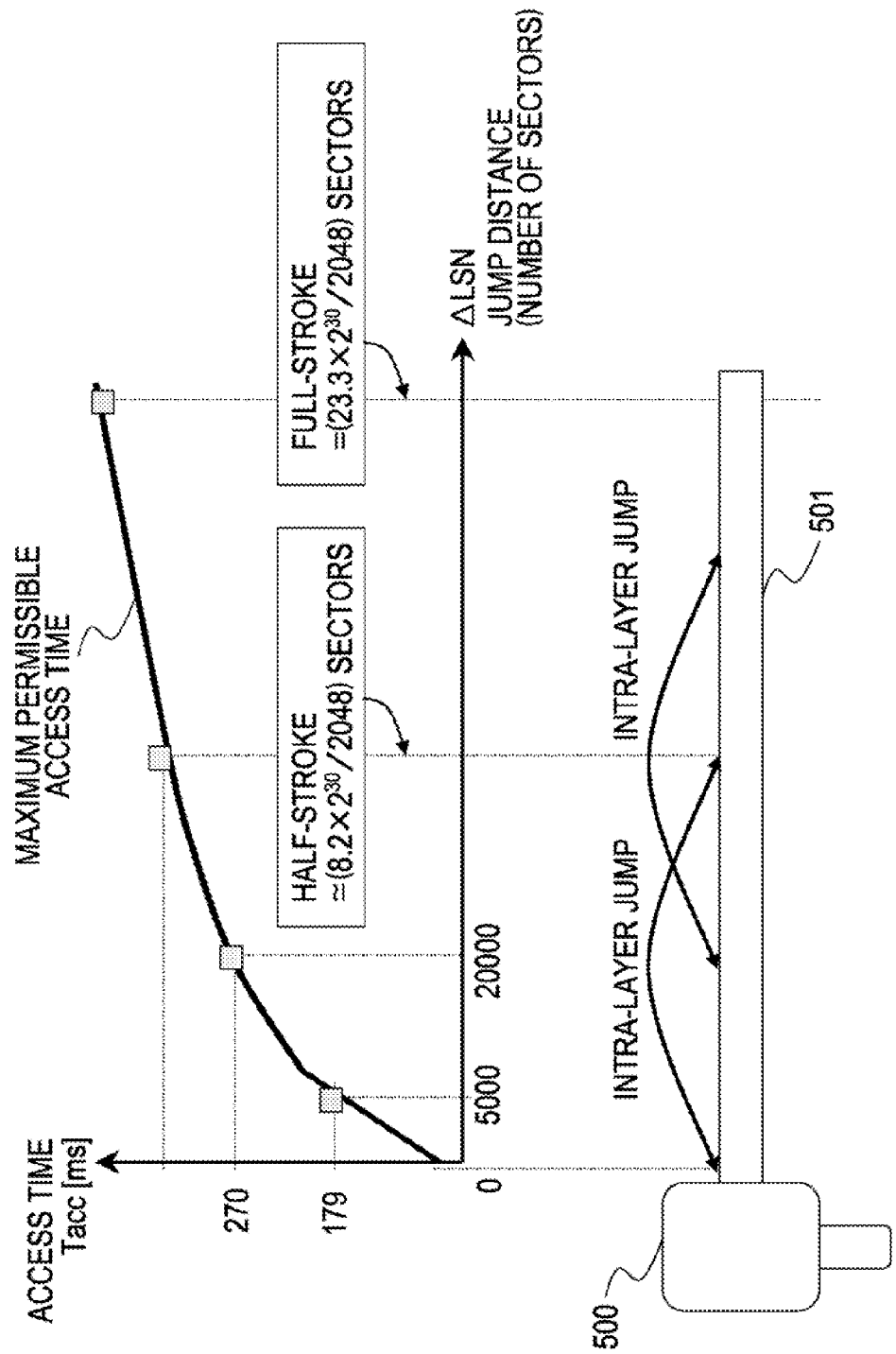
FIG. 19 is a diagram for describing a drive standard stipulating the jumping processing at the time of disc playback, and the amount of time from ending of playback at a jump start point to starting playback at the jump destination.

Description will be made regarding the drive specifications with reference to FIG. 19. In FIG. 19, a disc 501 mounted on a spindle motor 500 revolves, and the playback and recording of data is performed by an unshown pickup. Contents to be stored in the disc are stored in increments of sectors of predetermined data amount.

In the graph shown in FIG. 19, a horizontal axis represents jump distance shown by the number of sectors, and a vertical axis represents access time [ms]. With the drive specifications according to DVD, such as the graph shown in FIG. 19, the maximum permission access time at the time of a jump occurring, which is equivalent to the predetermined number of sectors, is stipulated.

As long as a drive apparatus is capable of access accompanying jump processing at the maximum permission access time or less shown in FIG. 19, contents are stored in a DVD compliant with the specifications such that seamless playback is ensured even if a jump occurs within the same layer at the time of the playback of the contents. That is to say, contents to be stored in the disc are disposed such that jump processing does not occur at a position exceeding the maximum permission access time such as in the graph shown in FIG. 19, thereby performing the recording of contents.

However, the data recording format of contents having the above-mentioned segment data has not been stipulated. The present invention provides an arrangement wherein contents having the above-mentioned segment data can be played seamlessly without a break. Description will be made below regarding the details thereof.

Note that recently, study has been made regarding a disc having multiple recorded layers handling the increase in recorded data. With a disc having multiple recorded layers, a jump occurs between different layers. Hereafter, with a disc having multiple recorded layers, let us consider requirements for realizing seamless playback taking both a jump within the same layer of a disc (intra-layer jump) and a jump between different layers of a disc (inter-layer jump) into consideration.

FIG. 20(a) illustrates the disc configuration having a two-layer configuration. Data is recorded in a first layer 511, and a second layer 512 in increments of sector serving as a contents data recording unit.

Note that there are two modes in jump processing according to the playback of a disc having multiple recorded layers. That is to say, there are jump processing between recorded areas of the same layer, and jump processing between recorded areas of different layers. The present invention realizes an arrangement enabling seamless playback regarding either an intra-layer jump or an inter-layer jump. First, total required time is calculated at the time of an inter-layer jump which is assumed to require the most jump time.

Figure 20:
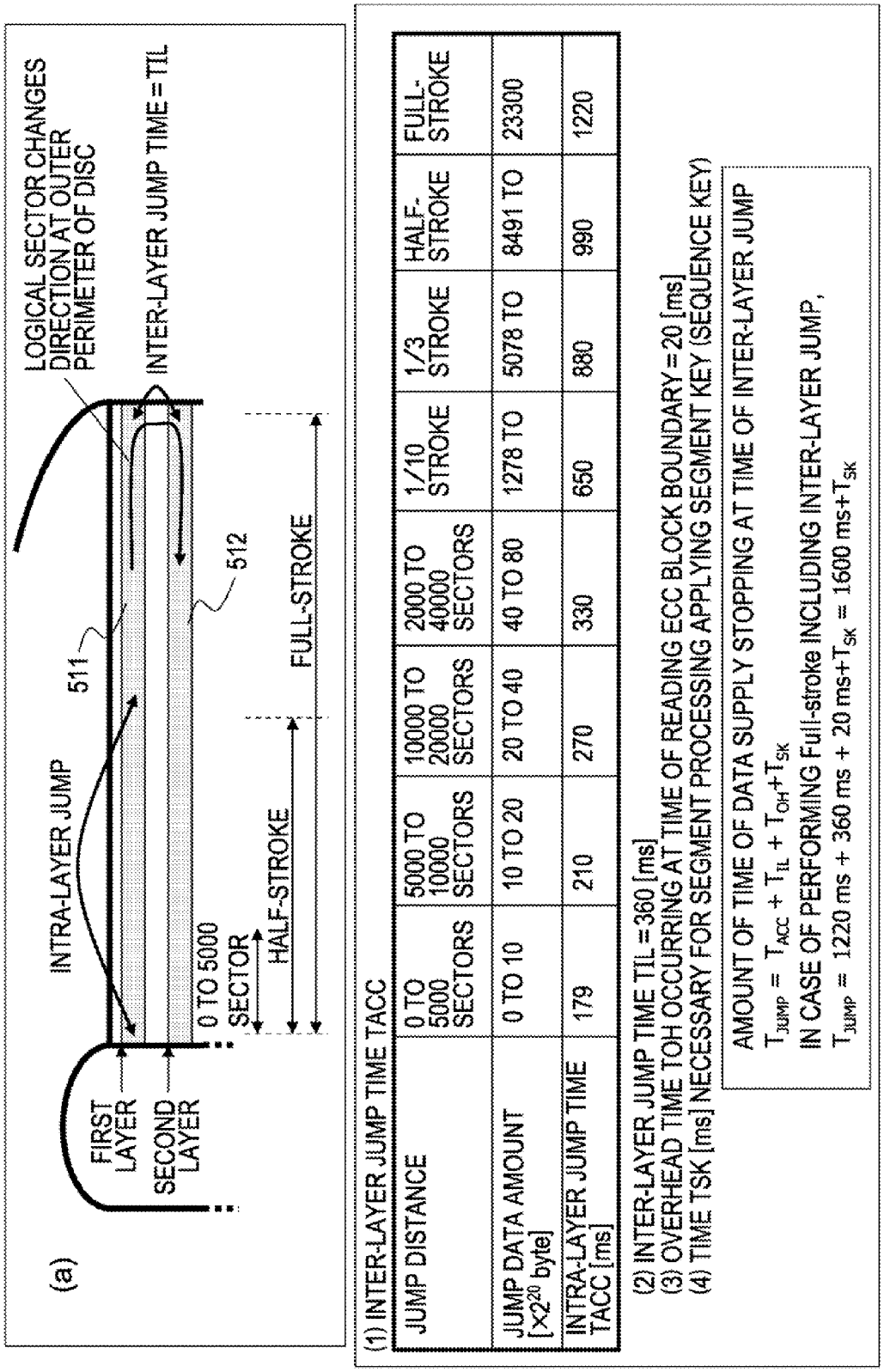
FIG. 20 is a diagram for describing necessary conditions for realizing seamless playback in a case that an inter-layer jump has occurred at a disc having multiple recording layers.

FIG. 20(1) is a table illustrating one example of the intra-layer jump time $[T_{ACC}]$ depending on jump distance in a disc configuration having recording capacity of 23.3 gigabytes per one layer. From the top of the table, there are described "jump distance (sector or stroke)", "data size equivalent to jump distance (MB)", and "intra-layer jump (ms)". "intra-layer jump (ms)" is equivalent to time necessary for movement of the pickup of the drive apparatus which performs the playback of a Blue-ray disc (registered trademark), i.e., equivalent to seek time.

According to the table shown in FIG. 20(1), with "jump distance (sector or stroke)", 40000 sectors or less are displayed with sectors, 1/10 strokes or more are displayed with strokes. Full strokes correspond to strokes from the innermost circumference to the outermost circumference of a disc, as shown in FIG. 20(a).

Note that with the relation of jump distance between 40000 sectors and 1/10 strokes, 40000 sectors <1/10 strokes holds, and following the table from the left of the table to the right, jump distance becomes longer. The reason why the stroke notation is used in a portion with long jump distance is that in the event of long jump distance, the number of sectors greatly differ between the inner circumference and the outer circumference of a disc, so representation with the number of sectors results in extreme increase in the range of the number of sectors.

Also, with regard to 1/10 strokes, 1/3 strokes, and a half stroke, representation is made with the lower limit of data size, but this is because even with the same 1/10 strokes, the data sizes corresponding to the inner circumference and the outer circumference of a disc differs, so the lower limit is represented with a calculation value at the inner circumference where the data becomes the smallest. Note that when determining later-described data placement conditions, all that is necessary is that the lower limit of the data size corresponding to a particular jump distance is known, and accordingly, no description is made regarding the upper limit of the corresponding data size.

For example, jump distance=full strokes corresponds to the strokes from the innermost circumference through the outermost circumference of a disc, and the amount of jump data at this time is 23.3 gigabytes. The time necessary for this intra-layer full stroke jump, i.e., intra-layer jump time $[T_{ACC}]$ is 1220 ms.

Also, in the event that the jump distance is 0 through 5000 sectors, the amount of jump data is 0 through 10×220 bytes, so the time necessary for this intra-layer jump, i.e., intra-layer jump time $[T_{ACC}]$ is 179 ms.

FIG. 20(2) illustrates the measured value of inter-layer jump time $[T_{IL}]$ according to a certain drive apparatus. That is to say, inter-layer jump time $[T_{IL}]$=360 ms This is equivalent to regulation time such as focal control of the pickup when modifying a playback position to different layers of the first layer 511 and second layer 512 shown in FIG. 20(a) in a drive apparatus configured to perform the playback of a Blu-ray disc.

FIG. 20(3) illustrates the measured value of overhead time $[T_{OH}]$ which occurs at the time of reading out of an ECC block boundary in a certain drive apparatus. That is to say, $[T_{OH}]$=20 ms For example, when reading contents stored in a disc such as Blu-ray disc (registered trademark), a predetermined data reading unit is set. This data reading unit is referred to as an ECC block. The ECC block is configured as a block comprising user data made up of, for example, AV stream data serving as actual contents data, user control data (UCD) storing various types of control data, parity data from error correction, and so forth.

When playing contents, it is necessary to read data in increments of ECC blocks, and execute data processing such as error correction or the like based on parity in increments of ECC blocks.

In the event of executing a jump at the time of the playback of data, it is necessary to perform processing of two different ECC blocks of an ECC block at a jump source, and an ECC block at a jump destination. The overhead time along with this ECC block processing is overhead time $[T_{OH}]$ which occurs at the time of reading out an ECC block boundary shown in FIG. 20(3).

FIG. 20(4) illustrates sequence key used time $[T_{SK}]$ which occurs based on the use processing of a sequence key serving as a key row of the above-mentioned segment key and CPS unit key, which is time delay which occurs based on switching processing of an application key or the like. As described above, in the event of playing a segment portion and a non-segment portion along a particular path, it is necessary to switch and decrypt the segment key corresponding to the segment data of a particular variation. The key row along a particular row is a sequence key, and time delay based on switching of a key which occurs at the time of use of the sequence key is defined as the sequence key used time $[T_{SK}]$.

Figure 21:
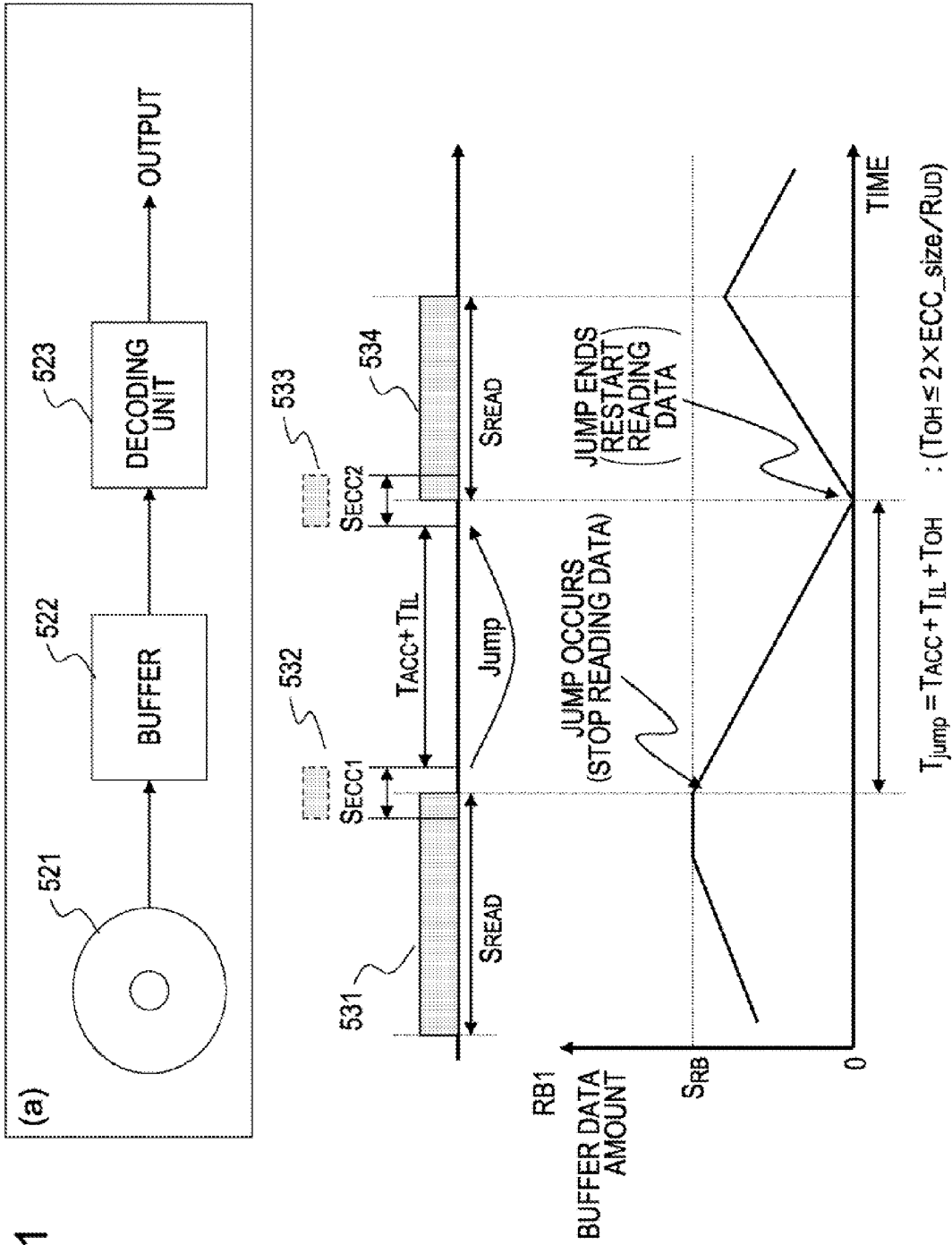
FIG. 21 is a diagram for describing the details of overhead time accompanying an ECC block occurring at the time of jump processing.

Thus, in the event of executing an inter-layer jump, the intra-layer jump time $[T_{ACC}]$ shown in FIG. 20(1), the inter-layer jump time $[T_{IL}]$ shown in FIG. 20(2), the ECC block readout overhead time $[T_{OH}]$ shown in FIG. 20(3), and the sequence key usage time $[T_{SK}]$ occur respectively, and consequently, in the event of executing an inter-layer jump, total inter-layer jump time $[T_{JUMP}]$ serving as time wherein reading of data from a disc is interrupted is calculated as $T_{JUMP}=T_{ACC}+T_{IL}+T_{OH}+T_{SK}$ Description will be made regarding the details of the overhead time accompanied by the processing of an ECC block occurring at the time of jump processing with reference to FIG. 21.

With reading and playback processing of data from a disc, as shown in FIG. 21(a), first, data is read from a disc 521 in increments of ECC block, and is stored in a buffer 522. Further, the data output from the buffer is subjected to decoding processing at a decoding unit 523. Note that processing such as error correction processing before the decoding processing is executed, but is omitted in the drawing. The decoding unit 523 executes decoding with playback sequence and playback time being regulated in accordance with time stamp information set in a transport stream (TS) making up an AV stream data within an ECC block, and outputs the decoded data as playback contents.

The decoding unit 523 can perform playback continuously as long as there is an ECC block stored in the buffer 322. The graph of the lower portion in FIG. 21 illustrates the elapse of playback time, and the transition of the amount of data stored in the buffer 522.

With regard to the amount of buffer data of a vertical axis, reading of data from the disc is stopped along with the occurrence of a jump, reduction of the amount of data is started, and reading of data from the disc is resumed along with the end of the jump to increase the amount of buffer data. Upon the amount of buffer data becoming zero, and the output of data from the decoding unit 523 being completed, consequently playback is interrupted. Accordingly, it is necessary to set a buffer size such that the amount of buffer data is prevented from becoming zero.

With the example shown in FIG. 21, upon an inter-layer jump occurring during execution of processing of an ECC block [$S_{ECC1}$] 532 included in data 531 read from a disc, obtaining of data from the disc is interrupted, the ECC block position of an ECC block [$S_{ECC2}$] 533 of the reading start position of data 534 read at a jump destination is subjected to seek processing, and further is subjected to pickup control, following which the ECC block [$S_{ECC2}$] 533 is obtained, and is subjected to storing in the buffer, and decoding processing, thereby executing the playback of the data.

In this case, it is necessary to perform the error correction and decoding processing of the final ECC block [$S^{ECC1}$] 532 at a jump source, and the error correction and decoding processing of the first ECC block [$S_{ECC2}$] 533 at a jump destination, but all of the data generated at those processing is not always output as playback data.

In the worst case, wasteful data processing time occurs wherein most of the processing data of the two ECC blocks is not used as playback data. The time necessary for this data processing is stipulated as ECC block readout overhead time [$T_{OH}$] shown in FIG. 20(3)

The overhead time [$T_{OH}$] in the worst case wherein most of the stored data of the ECC block data of the jump source and the ECC block data of the jump destination is not used for playback is $$T_{OH} = (2 \times ECC\_size)/R_{UD}$$

With this expression, ECC_size denotes the data size of one ECC block, and $R_{UD}$ denotes a readout rate, which is equivalent to the transfer rate of data output to the decoding unit 523 from the buffer 522.

For example, when assuming that
ECC block size=64 KB, and
data transfer rate $R_{UD}$=54 Mbps,
calculation is made as $$T_{OH} \leq (2 \times 64 \times 1024 \times 8)/54/10^6 = 20 \text{ ms}$$

That is to say, the maximum value of the ECC block readout overhead time [$T_{OH}$] is calculated as 20 ms.

The reduction velocity of the amount of buffer data depends on data recording rate [$R_{TS}$]. This data recording rate [$R_{TS}$] becomes a rate corresponding to the amount of data consumption accompanied with the data processing at the decoding unit 523.

The amount of playback data included in one ECC block is not fixed since there is a difference in compressibility, and accordingly, the amount of playback data for each ECC block, i.e., playback data time differs.

Figure 22:
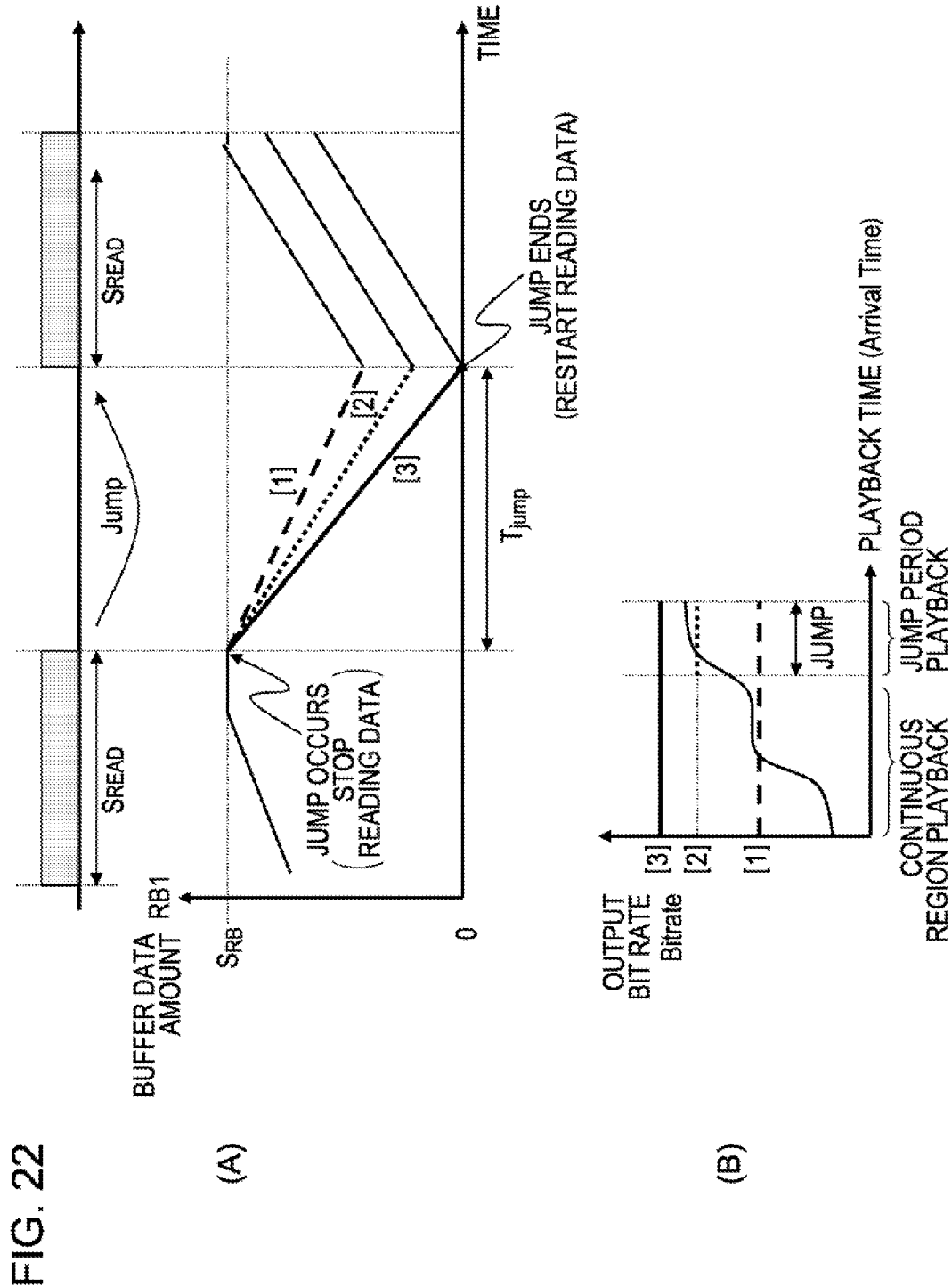
FIG. 22 is a diagram for describing reduction in buffer data amount in a case of a jump occurring.

Accordingly, the reduction velocity of the amount of buffer data in the case of an inter-layer jump occurring is not fixed all the time. Description will be made regarding reduction of the amount of buffer data in the case of an inter-layer jump occurring with reference to FIG. 22.

The graph shown in FIG. 22(A) illustrates the elapse of playback time, and the transition of the amount of data stored in the buffer, as with the graph shown in FIG. 21.

With regard to the amount of buffer data of a vertical axis, reading of data from the disc is stopped along with the occurrence of a jump, reduction of the amount of data is started, and reading of data from the disc is resumed along with the end of the jump to increase the amount of buffer data. Upon the amount of buffer data becoming zero, and the output of data from the decoding unit 523 being completed, playback is interrupted. Accordingly, it is necessary to set a buffer size such that the amount of buffer data is prevented from becoming zero.

In order to stipulate the maximum buffer amount [SRB], it is necessary to assume the reduction velocity of the amount of buffer data during a jump period. However, the reduction velocity of the amount of buffer data is not fixed all the time as described above.

Accordingly, some presumption is set, the reduction velocity of the amount of buffer data during a jump period is assumed, and the buffer size [SRB] is determined under such assumption.

The line [1] in the graph shown in FIG. 22(A) is a line wherein the reduction velocity of the amount of buffer data during a jump period is set based on the mean rate at the time of reading and playback of a continuous recorded data area recorded in a disc.

The line [2] in the graph is a line wherein the reduction velocity of the amount of buffer data during a jump period is set based on the mean rate calculated based on the playback rate obtained by extracting data in which a jump actually occurs instead of the continuous recorded data area recorded in a disc.

The line [3] in the graph is a line set based on the maximum recording rate of recorded data set as attribute information corresponding to contents to be recorded in a disc.

The graph shown in FIG. 22(B) illustrates the value of each assumed rate of [1], [2], and [3] shown in (A). A vertical axis denotes a data output bit rate during playback, and a horizontal axis denotes playback time.

With an output bit rate, as shown in the drawing, the relation of $$[1] < [2] < [3]$$

holds, playback is performed such that an output bit rate is generally along the line of [1] at the time of the playback of the continuous recorded data area of the disc, and also, in the event of a jump occurring, playback is performed such that an output bit rate is generally along the line of [2].

As the reduction velocity of the amount of buffer data during a jump period, upon [1], i.e., the mean playback rate of the continuous recorded data area recorded in the disc being applied, as shown in FIG. 22(B), the amount of buffer data is reduced at the velocity faster than the assumed bit rate to which [1] is applied, and in the worst case, the amount of buffer data is eliminated, there is a possibility that an interruption of playback occurs. Also, upon [2], i.e., the mean rate calculated based on a playback rate during a jump period being applied, the assumed bit rate applied is accurately identical to the actual reduction speed of buffer data. Therefore, it can be said that [2] is ideally the optimal assumed bit rate, but it is extremely difficult to determine the data positions corresponding to the head and terminal points of the jump period, and accordingly, it is difficult to calculate an assumed bit rate employing [2].

On the other hand, according to the assumption of [3] shown in FIG. 22(A), i.e., assumption based on the maximum recording rate set as attribute information corresponding to contents to be recorded in a disc, the playback bit rate of the recorded data of the disc is ensured so as not to exceed the bit rate of [3] shown in FIG. 22(B), so even when a jump occurs, playback processing exceeding the bit rate of [3] does not occur. Also, the bit rate of [3] is set as attribute information when creating contents, obtaining of the bit rate value can be readily performed by referencing the attribute information.

Accordingly, assuming that playback at a bit rate corresponding to the maximum recording rate of [3] is executed, presuming that the reduction of the amount of buffer data occurs at the time of a jump, and the maximum buffer amount [SRB] is calculated under this presumption.

With the Blu-ray Disc (registered trademark) specifications, a transport stream (TS) packet (TS packet recording rate is TS_recording_rate) of 188 bytes is added with a four-byte header, and is recorded in a disc as a 192-byte packet. In the case of regarding as a 192-byte packet, the maximum recording rate [$R_{TS}$] is $$RTS=(TS\_recording\_rate) \times 192/188$$

With the playback of a disc whose data was recorded in accordance with the Blu-ray Disc (registered trademark) specifications, playback is performed at the maximum recording rate [$R_{TS}$] or less calculated based on this TS packet size. Accordingly, in the event of performing playback in which an inter-layer jump occurs, the buffer size [SRB] necessary for preventing buffer data from becoming zero during a jump is calculated as $$SRB=RTS \times Tjump$$

Next, description will be made regarding a setting example wherein playback with no data break as to an inter-layer jump is ensured with reference to FIG. 23. In order to determine the specifications of data recording to a disc, it is necessary to determine a permissible mode of an inter-layer jump, i.e., the range of a jump that wherein the occurrence of a data break can be prevented, and perform the recording of contents in a mode wherein only the determined range of a jump occurs.

Figure 23:
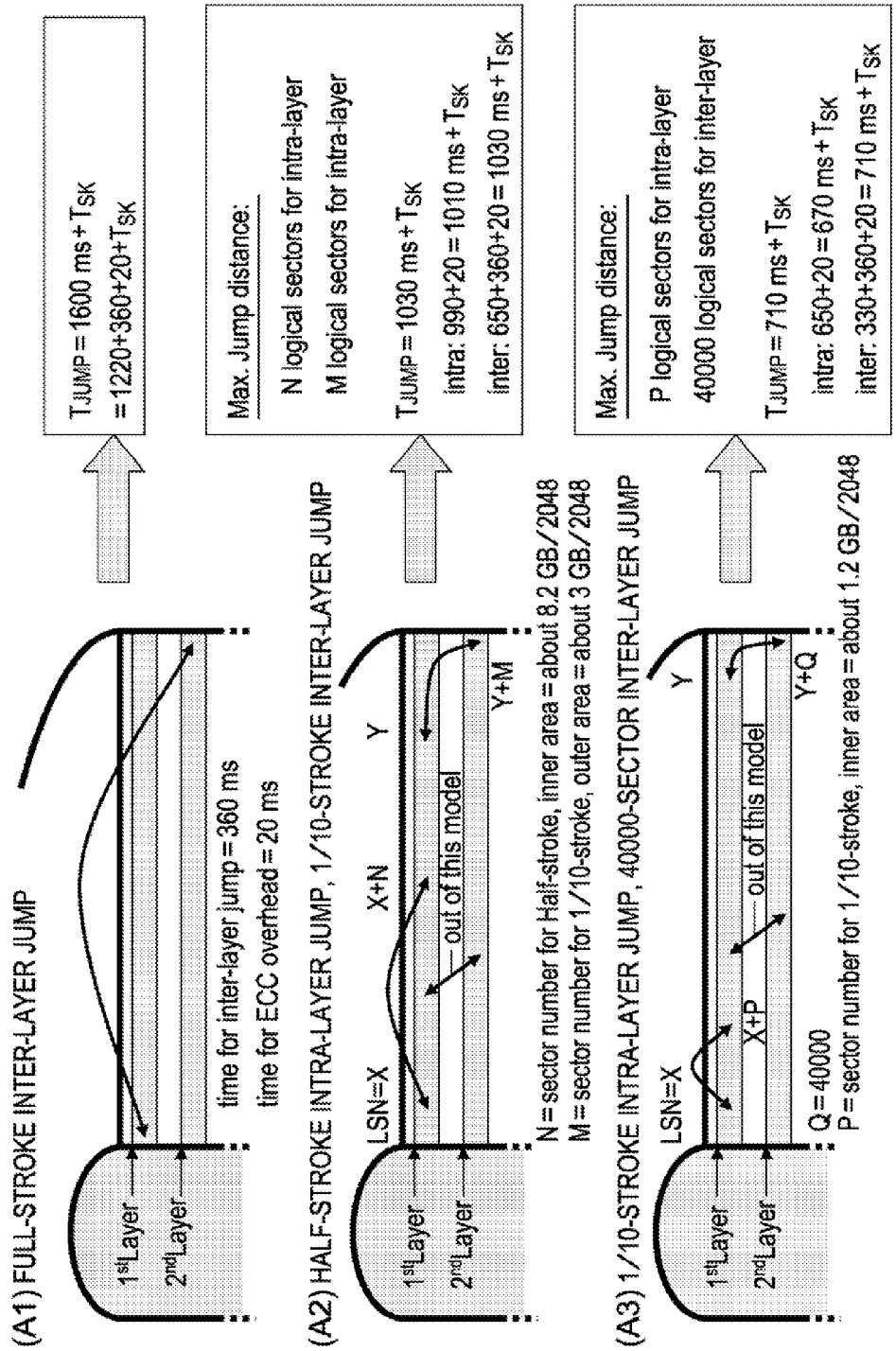
FIG. 23 is a diagram for describing setting examples of multiple jump models (A1) through (A3) which ensure playback with no data interruption for inter-layer jumps.

FIG. 23 illustrates a mode setting example of a permissible inter-layer jump, and a calculation example of total jump time [$T_{JUMP}$] in the processing of the jump thereof. The total jump time is, as described above, the sum value of time equivalent to the movement (seek) time of the pickup [$T_{ACC}$],
regulation time of the pickup [$T_{IL}$],
overhead time due to ECC block processing [$T_{OH}$], and
sequence key usage time due to sequence key usage [$T_{SK}$],
that is to say, calculated as $$T_{JUMP}=T_{ACC}+T_{IL}+T_{OH}+T_{SK}$$

The example of FIG. 23(A1) is an example in the case of permitting a full stroke inter-layer jump from the innermost circumference of the first layer to the outermost circumference of the second layer, and the total jump time [$T_{JUMP}$] of this case is $$T_{JUMP}=1220(T_{ACC})+330(T_{IL})+20(T_{OH})+T_{SK}=1600\text{ ms}+T_{SK}$$

Note that each time of the time equivalent to the movement (seek) time of the pickup [$T_{ACC}$], the regulation time of the pickup [$T_{IL}$], and the overhead time due to ECC block processing [$T_{OH}$] is based on the example described with reference to FIG. 20.

If the placement conditions of recorded data as to a disc is determined base on this case, the continuous supply of data can be ensured even in the event of performing a jump between arbitrary addresses within a recording medium. However, on the other hand, jump time is consequently set to be greater than later-described (A2) and (A3), so as described with reference to FIG. 24, the buffer size necessary for ensuring the continuous supply of data increases.

The example of FIG. 23(A2) is an example in the case of setting a half stroke jump within the same layer, and a 1/10 stroke inter-layer jump as the maximum permission jump distance, and the total jump time [$T_{JUMP}$] in this case is (1) Half stroke jump within the same layer $$T_{JUMP}=990(T_{ACC})+0(T_{IL})+20(T_{OH})+T_{SK}=1010\text{ ms}+T_{SK}$$

(2) 1/10 stroke inter-layer jump $$T_{JUMP}=650(T_{ACC})+360(T_{IL})+20(T_{OH})+T_{SK}=1030\text{ ms}+T_{SK}$$

The maximum jump time becomes 1030 ms+$T_{SK}$.

Figure 24:
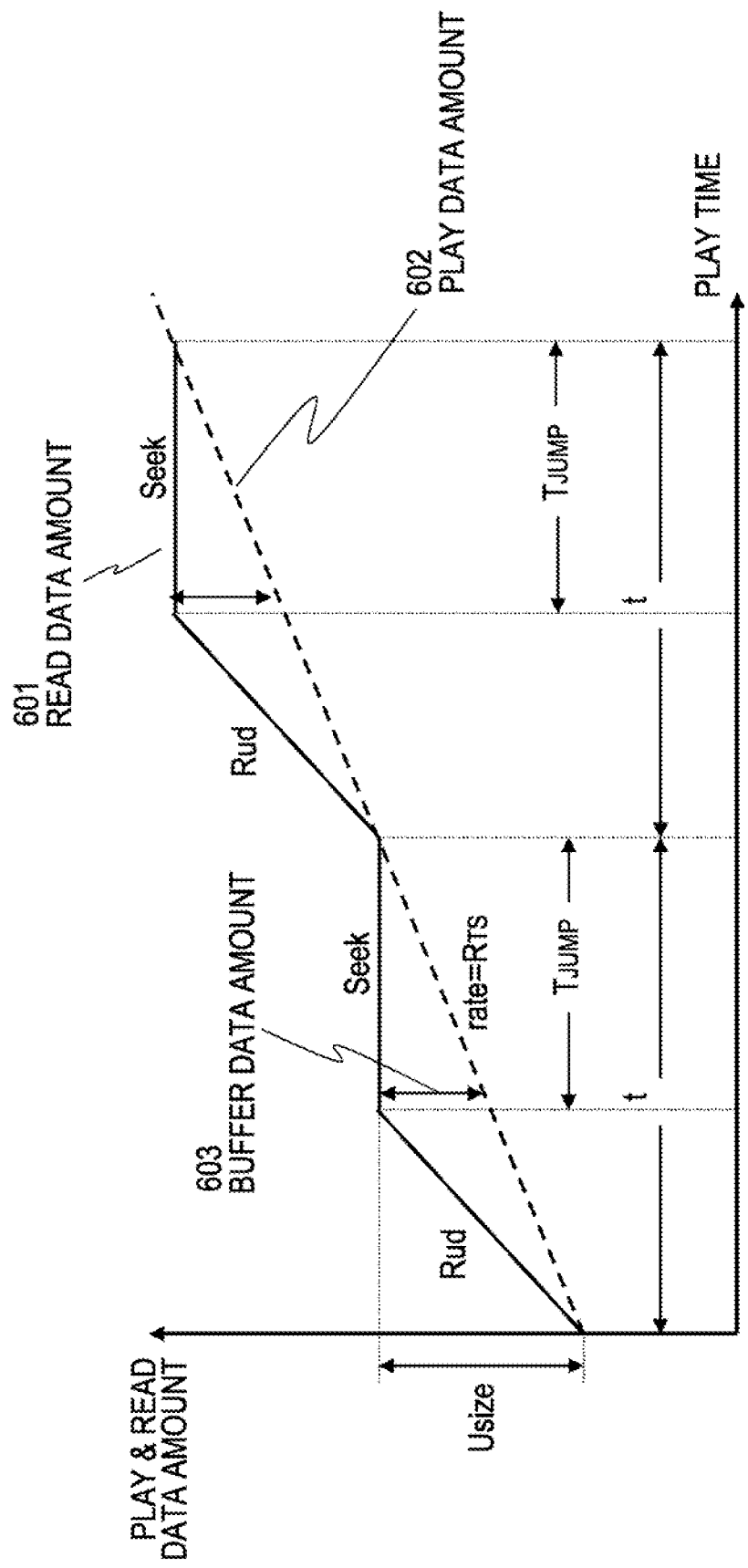
FIG. 24 is a diagram for describing a method for determining a consecutive data placement condition corresponding to the value of the data recording rate, with regard to jump time.

With this model, it is necessary to determine data placement conditions by restricting an intra-layer jump to the jump distance of around [$8.2 \times 2^{30}/2048$] sectors, and restricting an inter-layer jump to the jump distance of around [$3 \times 2^{30}/2048$] sectors, but as described with FIG. 24, the buffer size necessary for ensuring the continuous supply of data is smaller than the model of (A1).

The example of FIG. 23(A3) is an example in the case of setting a 1/10 stroke jump within the same layer, and a 40000-sector inter-layer jump as the maximum permission jump distance, and the total jump time [$T_{JUMP}$] in this case is (1) 1/10 stroke jump within the same layer $$T_{JUMP}=650(T_{ACC})+0(T_{IL})+20(T_{OH})+T_{SK}=670\text{ ms}+T_{SK}$$

(2) 40000-sector inter-layer jump $$T_{JUMP}=330(T_{ACC})+360(T_{IL})+20(T_{OH})+T_{SK}=710\text{ ms}+T_{SK}$$

The maximum jump time becomes 710 ms+$T_{SK}$.

With this model, it is necessary to determine data placement conditions by restricting an intra-layer jump to the jump distance of around [$1.2 \times 2^{30}/2048$] sectors, and restricting an inter-layer jump to the jump distance of around 40000 sectors, but as described with FIG. 24, the buffer size necessary for ensuring the continuous supply of data is smaller than the models of (A1) and (A2).

FIG. 24 is a diagram describing a method for determining continuous data placement conditions corresponding to the value of a data recording rate as to jump time. The shortest permission playback time [t] corresponding to the minimum data unit to be continuously disposed in a disc is calculated based on the total jump time [$T_{JUMP}$], the data readout rate from a disc in a drive [Rud], and the data recording rate [RTS]. The value obtained by multiplying the shortest permission playback time [t] of this continuous data by the data readout rate {Rud} is calculated as continuous data placement size [Usize]. That is to say, $$Usize=Rud \times t$$

holds. Description will be made regarding the details of the calculation processing of this continuous data placement size [Usize].

In FIG. 24, the horizontal axis denotes playback time, and the vertical axis denotes the amount of data read out from a disc, and the amount of playback data. A solid line denotes the transition of the amount of data 601 read out from a disc along with the elapse of playback time, and a dotted line denotes the transition of the amount of playback data 602 along with the elapse of playback time.

The difference between the amount of readout data 601 and the amount of playback data 602 is equivalent to the amount of buffer data 603. With regard to the amount of playback data 602, the fixed amount of data is played along with the elapse of playback time, so as shown in the drawing, the amount of playback data 602 increases in proportion to time.

On the other hand, with regard to the amount of readout data 601, upon a jump occurring, the readout of data from a disc stops, so the increase in the amount of readout data 601 stops, but in the event of the readout processing of a continuous data stored area other than a jump, the readout of data is executed at a fixed readout rate, e.g., 54 Mbps.

The difference between the amount of readout data 601 and the amount of playback data 602 shown in FIG. 24 becomes the amount of buffer data 403, but if the amount of buffer data 603 is set so as not to be zero or less even in the event of jump processing occurring, no playback interruption occurs during playback including a jump, thereby enabling seamless playback.

In the event that the amount of readout data 601 and the amount of playback data 602 are steady, in order to increase the amount of buffer data 603 serving as the difference between the amount of readout data 601 and the amount of playback data 602, it is necessary to increase the value of [Usize] shown in FIG. 24.

[Usize] shown in FIG. 24 is equivalent to the size of data whose continuous reading is executed accompanying no jump processing in a disc. This data size is referred to as continuous data placement size [Usize].

The shortest permission playback time [t] of the continuous placement data of a disc is calculated in accordance with the following expression based on the total jump time $[T_{JUMP}]$, the data readout rate from a disc in a drive [Rud], and the data recording rate [RTS]. That is to say, $$t = T_{JUMP} \times Rud/(Rud-RTS)$$

holds.

If data recording is performed in a disc as a data block greater than the shortest permission playback time [t] of continuous data or more, continuous playback is ensured so as not to cause the data in the buffer to become zero or less when a jump occurs.

The value obtained by multiplying the shortest permission playback time [t] of continuous data by the data recording rate [RTS] is calculated as the continuous data placement size [Usize]. That is to say, $$Usize = RTS \times t$$

holds.

If data recording is performed in a disc as a data block greater than the continuous data placement size [Usize] or more, continuous playback is ensured so as not to cause the data in the buffer to become zero or less when a jump occurs.

Description will be made regarding a specific calculation example of the continuous data placement size [Usize]. Let us say that the total jump time $[T_{JUMP}]$, the data readout rate from a disc in a drive [Rud], and the data recording rate [RTS] are the following values.

$T_{JUMP}$ [msec]: intra-layer access time $T_{ACC}$+inter-layer jump time $T_{IL}$+overhead $T_{OH}$ due to ECC block boundary+sequence key usage time $T_{SK}$ Rud [×10$^6$ bps]: readout rate=54 Mbps
RTS [×10$^6$ bps]: maximum recording rate (TS_recording_rate×192/188)

At this time, t [msec]: shortest permission playback time of continuous data

Usize [×2$^{20}$ byte]: continuous data placement size are calculated.

The shortest permission playback time [t] of continuous data, and the continuous data placement size [Usize] are calculated as $$t(\text{msec}) = T_{JUMP} \times Rud/(Rud-RTS)$$

$$Usize(\text{Byte}) = t/1000 \times RTS/8$$

For example, when calculating the continuous data placement size [Usize] by applying the above-mentioned expressions to the model shown in FIG. 23(A3), i.e., $T_{JUMP}$=710+ sequence key usage time $[T_{SK}] \approx 760$ ms, and if we say that $RTS=(TS\_recording\_rate \times 192/188)=40$ Mbps, the continuous data placement size [Usize] can be obtained as $$Usize(\text{Byte})=15.2 \text{ MBytes}$$

That is to say, in the event that the model shown in FIG. 23(A3), i.e., the maximum jump time is set as $T_{JUMP}$=760 ms, data recording to a disc is continuous data placement size [Usize]=15.2 MBytes i.e., it is necessary to set a continuous data placement area of or greater than 15.2 MBytes, and perform data recording.

As described above, the shortest permission playback time [t] of continuous data, and the continuous data placement size [Usize] are calculated as $$t(\text{msec}) = T_{JUMP} \times Rud/(Rud-RTS)$$

$$Usize(\text{Byte})=t/1000 \times RTS/8$$

In the event that the maximum jump time $[T_{JUMP}]$ is set to a large value, it is necessary to set both of the shortest permission playback time [t] and the continuous data placement size [Usize] greatly, and along therewith it is necessary to set the size of the buffer greatly.

FIG. 25 is a diagram wherein with the multiple jump models (A1) through (A3) described with reference to FIG. 23, assuming a case in which switching between a segment key and a unit key is not performed, i.e., a sequence key is not applied, the buffer size (SRB) necessary for ensuring the continuous supply of data, and the data placement condition (the minimum value of continuous data placement sizes) corresponding to each value of the data recording rates (RTS) are represented with a table employing the calculation method described with reference to FIG. 24.

With the example shown in FIG. 25, assuming that sequence key used time $T_{SK}$=0, and $T_{JUMP}$[msec]=intra-layer access time $T_{ACC}$+inter-layer jump time $T_{IL}$+overhead $T_{OH}$ by ECC block boundary, the data placement condition (minimum value of continuous data placement size) is obtained.

As described with reference to FIG. 23, (A1) is a case in which a full stroke inter-layer jump from the innermost circumference of the first layer to the outermost circumference of the second layer is permitted, the total jump time $[T_{JUMP}]$ in this case is $T_{JUMP}$=1220($T_{ACC}$)+360($T_{IL}$)+20($T_{OH}$)=1600 ms At this time, the necessary buffer size [SRB] is SRB=9.36 MBytes Also, the data placement conditions (minimum value of continuous data placement size) corresponding to the respective values of the data recording rates (RTS) are RTS=5 Mbps→continuous data placement size [Usize]= 1.1 Mbytes RTS=10 Mbps→continuous data placement size [Usize]= 2.4 Mbytes RTS=20 Mbps→continuous data placement size [Usize]= 6.3 Mbytes RTS=30 Mbps→continuous data placement size [Usize]= 13.6 Mbytes RTS=40 Mbps→continuous data placement size [Usize]= 32.0 Mbytes RTS=48 Mbps→continuous data placement size [Usize]= 101.5 Mbytes The example of (A2) is an example in the case of setting a half stroke jump within the same layer, and a 1/10 stroke inter-layer jump as the maximum permission jump distance, and each total jump time [$T_{JUMP}$] in this case is (1) Half stroke jump within the same layer $T_{JUMP}=990(T_{ACC})+0(T_{IL})+20(T_{OH})=1010$ ms (2) 1/10 stroke inter-layer jump $T_{JUMP}=650(T_{ACC})+360(T_{IL})+20(T_{OH})=1030$ ms the maximum jump time is 1030 ms.

At this time, the necessary buffer size [SRB] is

SRB=6.02 MBytes

Also, the data placement conditions (minimum value of continuous data placement size) corresponding to the respective values of the data recording rates (RTS) are RTS=5 Mbps→continuous data placement size [Usize]= 0.7 Mbytes RTS=10 Mbps→continuous data placement size [Usize]= 1.6 Mbytes RTS=20 Mbps→continuous data placement size [Usize]= 4.1 Mbytes RTS=30 Mbps→continuous data placement size [Usize]= 8.7 Mbytes RTS=40 Mbps→continuous data placement size [Usize]= 20.6 Mbytes RTS=48 Mbps→continuous data placement size [Usize]= 65.3 Mbytes The example of (A3) is an example in the case of setting a 1/10 stroke jump within the same layer, and a 40000-sector inter-layer jump as the maximum permission jump distance, and each total jump time [$T_{JUMP}$] in this case is (1) 1/10 stroke jump within the same layer $T_{JUMP}=650(T_{ACC})+0(T_{IL})+20(T_{OH})=670$ ms (2) 40000-sector inter-layer jump $T_{JUMP}=330(T_{ACC})+330(T_{IL})+20(T_{OH})=710$ ms wherein the maximum jump time is 710 ms.

At this time, the necessary buffer size [SRB] is

SRB=4.15 MBytes

Also, the data placement conditions (minimum value of continuous data placement size) corresponding to the respective values of the data recording rates (RTS) are RTS=5 Mbps→continuous data placement size [Usize]= 0.5 Mbytes RTS=10 Mbps→continuous data placement size [Usize]= 1.1 Mbytes RTS=20 Mbps→continuous data placement size [Usize]= 2.8 Mbytes RTS=30 Mbps→continuous data placement size [Usize]= 6.0 Mbytes RTS=40 Mbps→continuous data placement size [Usize]= 14.2 Mbytes RTS=48 Mbps→continuous data placement size [Usize]= 45.1 Mbytes Thus, as the jump time is reduced such as (A1)→(A2) → (A3), both the minimum values of the buffer size and the continuous data placement size can be reduced. Reduction in the buffer size has an advantage of reduction in costs of a playback apparatus. Reduction in the minimum value of the continuous data placement size has an advantage that even with an AV stream having the same rate, seamless connection can be performed at a small placement unit at a small playback unit, thereby increasing flexibility in editing.

Next, let us consider the case of employing a sequence key made up of a segment key and a CPS unit key. FIG. 26 is a diagram wherein assuming that sequence key usage time $T_{SK}$=50 through 200 ms, and $T_{JUMP}$ [msec]=intra-layer access time $T_{ACC}$+inter-layer jump time $T_{IL}$+overhead $T_{OH}$ by ECC block boundary+sequence key usage time $T_{SK}$, and assuming the case of FIG. 23(A3), i.e., $T_{JUMP}$ [msec]=710 ms+$T_{SK}$ the data placement condition (minimum value of continuous data placement size) is obtained.

The example of FIG. 23(A3) is an example in the case of setting a 1/10 stroke jump within the same layer, and a 40000-sector inter-layer jump as the maximum permission jump distance, and each total jump time [$T_{JUMP}$] in this case is (1) 1/10 stroke jump within the same layer $T_{JUMP}=650(T_{ACC})+0(T_{IL})+20(T_{OH})+T_{SK}=670$ ms+$T_{SK}$ (2) 40000-sector inter-layer jump $T_{JUMP}=330(T_{ACC})+330(T_{IL})+20(T_{OH})+T_{SK}=$ 710 ms+$T_{SK}$ the maximum jump time is 710 ms+$T_{SK}$.

When assuming that $T_{SK}$=50 ms, the jump time is $T_{JUMP}$ [msec]=710 ms+$T_{SK}$=760 ms the necessary buffer size [SRB] is SRB=4.44 MBytes Also, the data placement conditions (minimum value of continuous data placement size) corresponding to the respective values of the data recording rates (RTS) are RTS=5 Mbps→continuous data placement size [Usize]= 0.5 Mbytes RTS=10 Mbps→continuous data placement size [Usize]= 1.1 Mbytes RTS=20 Mbps→continuous data placement size [Usize]= 3.0 Mbytes RTS=30 Mbps→continuous data placement size [Usize]= 6.4 Mbytes RTS=40 Mbps→continuous data placement size [Usize]= 15.2 Mbytes RTS=48 Mbps→continuous data placement size [Usize]= 48.2 Mbytes When assuming that $T_{SK}$=100 ms, the jump time is $T_{JUMP}$ [msec]=710 ms+$T_{SK}$=810 ms the necessary buffer size [SRB] is SRB=4.73 MBytes Also, the data placement conditions (minimum value of continuous data placement size) corresponding to the respective values of the data recording rates (RTS) are RTS=5 Mbps→continuous data placement size [Usize]= 0.5 Mbytes RTS=10 Mbps→continuous data placement size [Usize]= 1.2 Mbytes
RTS=20 Mbps→continuous data placement size [Usize]= 3.2 Mbytes
RTS=30 Mbps→continuous data placement size [Usize]= 6.8 Mbytes
RTS=40 Mbps→continuous data placement size [Usize]= 16.2 Mbytes
RTS=48 Mbps→continuous data placement size [Usize]= 51.3 Mbytes When assuming that $T_{SK}$=200 ms, the jump time is $$T_{JUMP} \text{ [msec]}=710 \text{ ms}+T_{SK}=910 \text{ ms}$$

the necessary buffer size [SRB] is
SRB=5.32 MBytes

Also, the data placement conditions (minimum value of continuous data placement size) corresponding to the respective values of the data recording rates (RTS) are
RTS=5 Mbps→continuous data placement size [Usize]= 0.6 Mbytes
RTS=10 Mbps→continuous data placement size [Usize]= 1.4 Mbytes
RTS=20 Mbps→continuous data placement size [Usize]= 3.6 Mbytes
RTS=30 Mbps→continuous data placement size [Usize]= 7.7 Mbytes
RTS=40 Mbps→continuous data placement size [Usize]= 18.2 Mbytes
RTS=48 Mbps→continuous data placement size [Usize]= 57.7 Mbytes Thus, as the sequence key usage time TSK is lengthened such as 50 ms→100 ms→200 ms, it is necessary to increase the buffer size, and it is also necessary to increase the minimum value of the continuous data placement sizes. Reduction in the sequence key usage time TSK enables the necessary buffer size and continuous data placement size to be reduced. Reduction in the buffer size has an advantage of reduction in costs of a playback apparatus. Reduction in the minimum value of the continuous data placement size has an advantage that, even with an AV stream having the same rate, seamless connection can be performed at a small placement unit at a small playback unit, thereby increasing flexibility in editing.

With contents necessary for playback to which a sequence key is applied accompanying switching processing of a segment key and a CPS unit key, the continuous data placement size is assumed as a segment. That is to say, the minimum segment playback time in the event that the continuous data placement size necessary for seamless playback is taken as the minimum segment length is calculated with the following expression.

minimum segment playback time=($U$size×220×8)/ ($TS$_recording_rate [Mbps])

Now, in the case of TS packet recording rate (TS_recording_rate [Mbps])=40 Mbps, and in the case of 48 Mbps, when assuming that the sequence key usage time [$T_{SK}$] is
$T_{Sk}$=5 ms, 50 ms, 100 ms, 200 ms
the minimum segment length (playback time) for ensuring seamless playback results in the results shown in FIG. 27. That is to say, in the case of TS packet recording rate=40 Mbps, the minimum segment length as to each sequence key usage time is
$T_{Sk}$=5 ms→minimum segment length [playback time]= 3.00 sec
$T_{Sk}$=50 ms→minimum segment length [playback time]= 3.19 sec
$T_{Sk}$=100 ms→minimum segment length [playback time]= 3.40 sec
$T_{Sk}$=200 ms→minimum segment length [playback time]= 3.82 sec In the case of TS packet recording rate=48 Mbps, the minimum segment length as to each sequence key usage time is
$T_{Sk}$=5 ms→minimum segment length [playback time]= 7.92 sec
$T_{Sk}$=50 ms→minimum segment length [playback time]= 8.42 sec
$T_{Sk}$=100 ms→minimum segment length [playback time]= 8.97 sec
$T_{Sk}$=200 ms→minimum segment length [playback time]= 10.08 sec Description will be made regarding contents necessary for playback to which a sequence key is applied, and regarding a specific contents recorded configuration for ensuring seamless playback, and playback processing, with reference to FIG. 28 and so on.

Figure 28:
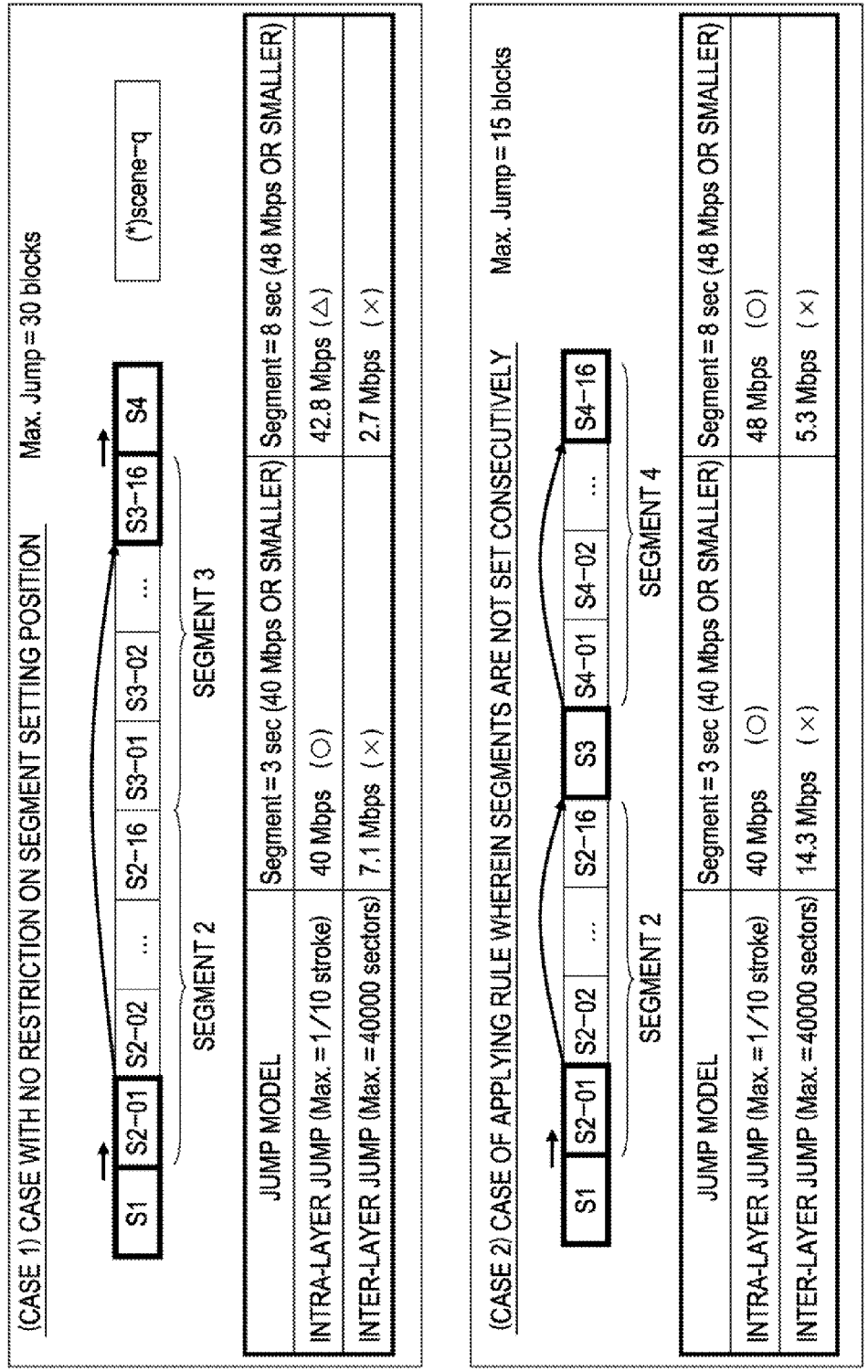
FIG. 28 is a diagram for describing a content placement example which satisfies seamless playback with contents to which a sequence key has been applied.

(Case 1) shown in FIG. 28 is a case in which there is provided no restriction regarding a segment setting position. In this case, a case in which two segments are continuously disposed over two continuous scenes is assumed. As shown in the drawing, in the event that a segment 2 and a segment 3 are continuously disposed, with each segment portion, 16 pieces of segment data corresponding to 16 variations in each segment are disposed. With the example shown in the drawing, S2-01 through S2-16 are segment data corresponding to 16 variations of the segment 2, and S3-01 through S3-16 are segment data corresponding to 16 variations of the segment 3.

With such a data array, various types of paths are set in the information processing device, wherein one piece of segment data is selected from each segment in accordance with a setting path, thereby performing playback thereof. The longest jump distance in this case is distance from the segment data [S2-01] to the segment data [S3-16] shown in the drawing, i.e., the jump distance of 30 blocks. However, let us say that one piece of segment data is taken as one block.

As described earlier with reference to FIG. 26 and FIG. 27, rules regarding segments for ensuring seamless playback are generally as follows in the event of TS packet recording rate=40 Mbps with $T_{SK}$=5 ms through 200 ms,
 minimum segment data size≈15 to 18 Mbyte, and
 minimum segment playback time≈3.00 sec
Also, in the event of TS packet recording rate=48 Mbps with $T_{SK}$=5 ms to 200 ms,
 minimum segment data size≈48 to 57 Mbytes, and
 minimum segment playback time≈8.00 sec The above-mentioned rules are the rules of segments which can be permitted in the case in which the jump restrictions described above with reference to FIG. 23(A3), i.e., a 1/10 stroke jump within the same layer, and a 40000-sector inter-layer jump are set as the maximum permission jump distance. In the event of assuming that the maximum permission jump distance is equal to the maximum jump distance in the case of Case 1 shown in FIG. 28, i.e., the jump distance of 30 blocks (segments), it is necessary that the distance of 30 segments is 1/10 strokes or less for a jump within the same layer, and 40000 sectors or less for an inter-layer jump.

With the table shown in Case 1 in FIG. 28, assuming that the jump distance of 30 blocks (segments) is equal to a 1/10 stroke jump within the same layer, and a 40000-sector inter-layer jump, in this case,
a realizable maximum recording rate is calculated in the event of the minimum segment playback time=3.00 sec, i.e., the minimum segment data size=15 to 18 Mbytes, and in the event of the minimum segment playback time=8.00 sec, i.e., the minimum segment data size=48 to 57 Mbytes.

As described earlier with reference to FIG. 24, the shortest permission playback time [t] of continuous data, and the continuous data placement size [Usize] are calculated as $$t(\text{msec}) = T_{JUMP} \times Rud/(Rud-RTS) \quad \text{(Expression 1)}$$

$$U\text{size}(\text{Byte}) = t/1000 \times RTS/8 \quad \text{(Expression 2)}$$

However, Rud [×10⁶ bps]: readout rate, e.g., Rud=54 Mbps.

RTS [×10⁶ bps]: maximum recording rate (TS_recording_rate×192/188)

With the above-mentioned expressions, the shortest permission playback time [t] is equivalent to the minimum segment playback time, and the continuous data placement size [Usize] is equivalent to the minimum segment data size.

With the jump restrictions described with reference to FIG. 23(A3), i.e., with a 1/10 stroke jump within the same layer, and a 40000-sector inter-layer jump, each total jump time $\{T_{JUMP}\}$ is (1) 1/10 stroke jump within the same layer $$T_{JUMP} = 650(T_{ACC}) + 0(T_{IL}) + 20(T_{OH}) + T_{SK} = 670 \text{ ms} + T_{SK}$$

(2) 40000-sector inter-layer jump $$T_{JUMP} = 330(T_{ACC}) + 330(T_{IL}) + 20(T_{OH}) + T_{SK} = 710 \text{ ms} + T_{SK}$$

If we say that the sequence key usage time $[T_{SK}]$ is
$T_{SK}$=5 ms, 50 ms, 100 ms, 200 ms
each total jump time $[T_{JUMP}]$ above mentioned is
(1) 1/10 stroke jump within the same layer $$T_{JUMP} = 670 \text{ ms} + (5 \text{ through } 200 \text{ ms})$$

(2) 40000-sector inter-layer jump $$T_{JUMP} = 710 \text{ ms} + (5 \text{ through } 200 \text{ ms})$$

The above-mentioned expression (Expression 1) is applied,
Rud [×10⁶ bps]: readout rate=54 Mbps
in the event of an intra-layer jump, let us say that $$T_{JUMP} = 670 \text{ ms} + (5 \text{ through } 200 \text{ ms})$$

upon segment playback time=3.00 sec or 8.00 sec being substituted,
a realizable maximum recording rate RTS can be obtained. Note that in the event of an inter-layer jump, let us say that $$T_{JUMP} = 710 \text{ ms} + (5 \text{ through } 200 \text{ ms})$$

The recording rates obtained by the above-mentioned recording rate calculation processing are the values set in the table shown in FIG. 28.

In the event of setting segment playback time=3.00 sec, assuming that a permissible recording bit rate is 40 Mbps or more,
in the event of setting segment playback time=8.00 sec, assuming that a permissible recording bit rate is 48 Mbps or more,
each entry of the table is recorded with a [○] mark. Values relatively close to these values are recorded with a [Δ] mark, and values far away from the permissible values are recorded with a [X] mark. Note that with the AV specifications of a certain specification organization, realizing a bit rate of 40 Mbps or 48 Mbps has been specified.

The (Case 1) in FIG. 28 is a case in which there is provided no restriction regarding a segment setting position, as shown in the drawing, the jump of 30 blocks (segments) are assumed. Realizable recording rates in this case are, as shown in the table, (A) Intra-layer jump (maximum jump distance=1/10 strokes)
(a) Segment playback time=3.00 sec→40 Mbps
(b) Segment playback time=8.00 sec→42.8 Mbps
(A) Inter-layer jump (maximum jump distance=40000 sectors)
(a) Segment playback time=3.00 sec→7.1 Mbps
(b) Segment playback time=8.00 sec→2.7 Mbps The (Case 2) in FIG. 28 is a case in which there is provided a restriction regarding a segment setting position, and continuous segments are not disposed. As shown in the drawing, with Case 2, a non-segment area [S3] is set between a segment portion 2 and a segment portion 4, which have multiple variations. With such a setting, the maximum jump becomes 15 blocks (segments). Realizable recording rates in this case are, as shown in the table, (A) Intra-layer jump (maximum jump distance=1/10 strokes)
(a) Segment playback time=3.00 sec→40 Mbps
(b) Segment playback time=8.00 sec→48 Mbps
(A) Inter-layer jump (maximum jump distance=40000 sectors)
(a) Segment playback time=3.00 sec→14.3 Mbps
(b) Segment playback time=8.00 sec→5.3 Mbps It can be mentioned based on the Case 1 and Case 2 that setting of continuous segments is prohibited such as Case 2,
no segment is set in a portion wherein an inter-layer jump occurs.

These two rules are applied, whereby a bit rate of 40 Mbps is realized in the event of segment playback time=3 sec, and a bit rate of 48 Mbps is realized in the event of segment playback time=8 sec, and accordingly, recording/playback satisfying the specifications can be realized.

Figure 29:
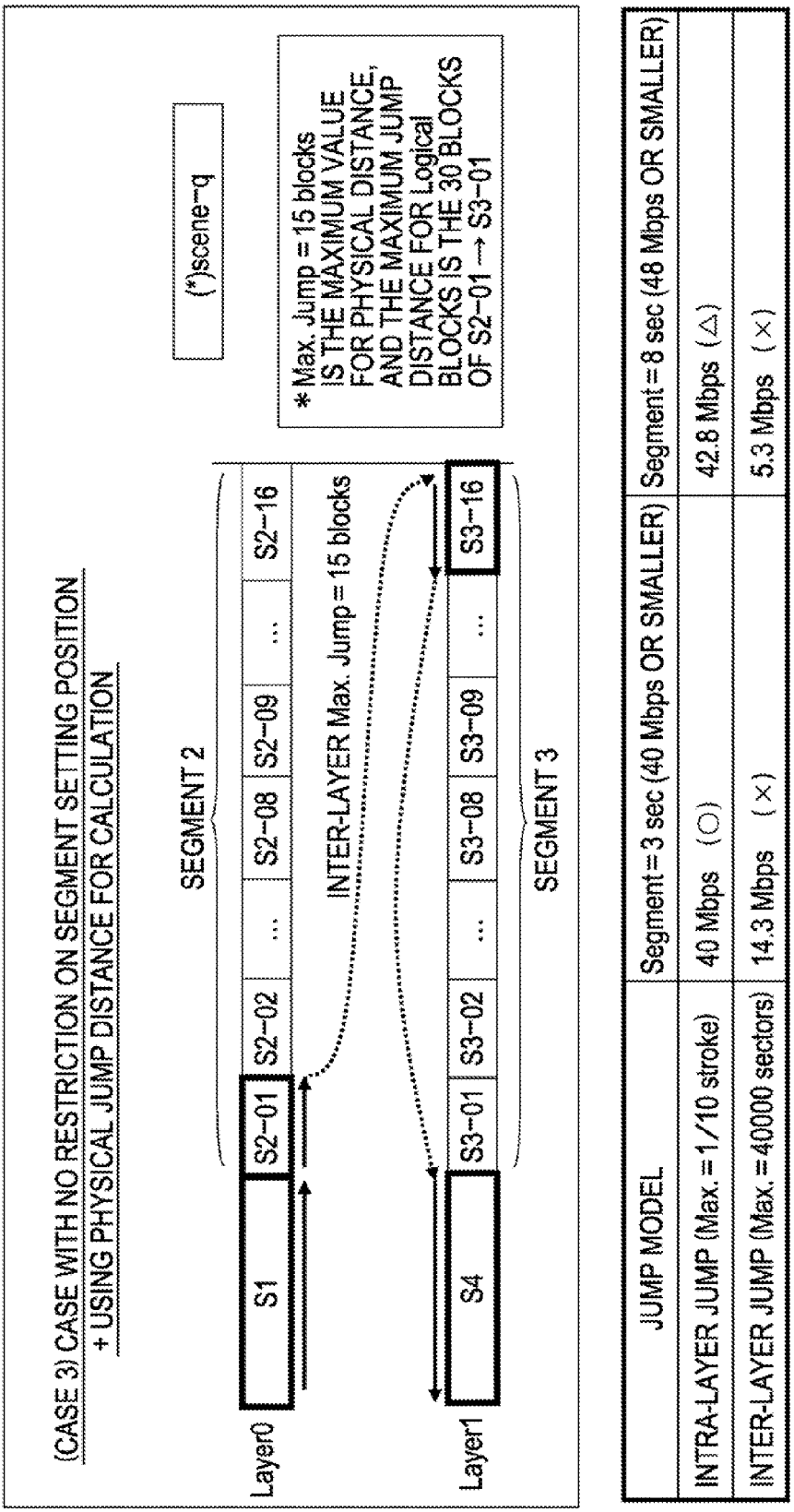
FIG. 29 is a diagram for describing a content placement example which satisfies seamless playback with contents to which a sequence key has been applied.

(Case 3) shown in FIG. 29 is a case in which there is no restriction regarding a segment setting position, but with an inter-layer jump, actual physical distance is applied when calculating jump distance. As shown in the drawing, the jump from a block [S2-01] to a block [S3-16] shown in the drawing is the maximum jump distance, the jump distance serving as the number of logical blocks is the 30 blocks of [S2-01] through [S3-16], but as shown in the drawing, physical jump distance is 15 blocks. Realizable recording rates in this case are, as shown in the table, (A) Intra-layer jump (maximum jump distance=1/10 strokes)
(a) Segment playback time=3.00 sec→40 Mbps
(b) Segment playback time=8.00 sec→42.8 Mbps
(A) Inter-layer jump (maximum jump distance=40000 sectors)
(a) Segment playback time=3.00 sec→14.3 Mbps
(b) Segment playback time=8.00 sec→5.3 Mbps With this arrangement, the actual physical distance of an inter-layer jump is applied, whereby a recordable bit rate can be improved.

Figure 30:
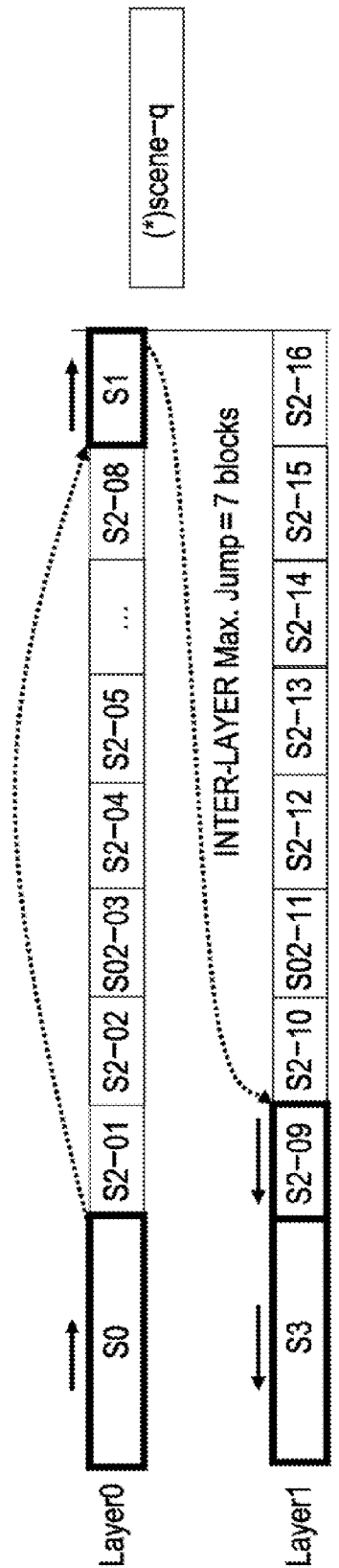
FIG. 30 is a diagram for describing a content placement example which satisfies seamless playback with contents to which a sequence key has been applied.

(Case 4) shown in FIG. 30 is a case in which as with the above-mentioned (Case 2), continuous settings of segments are prohibited, and further the maximum jump distance is set so as to be short in a portion where an inter-layer jump occurs. As shown in the drawing, an arrangement is made wherein the segment data made up of 16 variations of the segment 2 are divided into half, which are disposed in a layer 0 and a layer 1 respectively, and further, the playback data block of continuous scenes is set in the segment 2, in this case, a block [S1] is set in the end portion of the divided segment data. With this arrangement, the maximum jump distance which occurs in inter-layer jumps is seven blocks. Realizable recording rates in this case are, as shown in the table, (A) Intra-layer jump (maximum jump distance=1/10 strokes)
   (a) Segment playback time=3.00 sec→40 Mbps
   (b) Segment playback time=8.00 sec→48 Mbps
   (A) Inter-layer jump (maximum jump distance=40000 sectors)
   (a) Segment playback time=3.00 sec→30.5 Mbps
   (b) Segment playback time=8.00 sec→11.4 Mbps This arrangement enables the jump distance of an inter-layer jump to be reduced, whereby a recordable bit rate can be improved.

Figure 31:
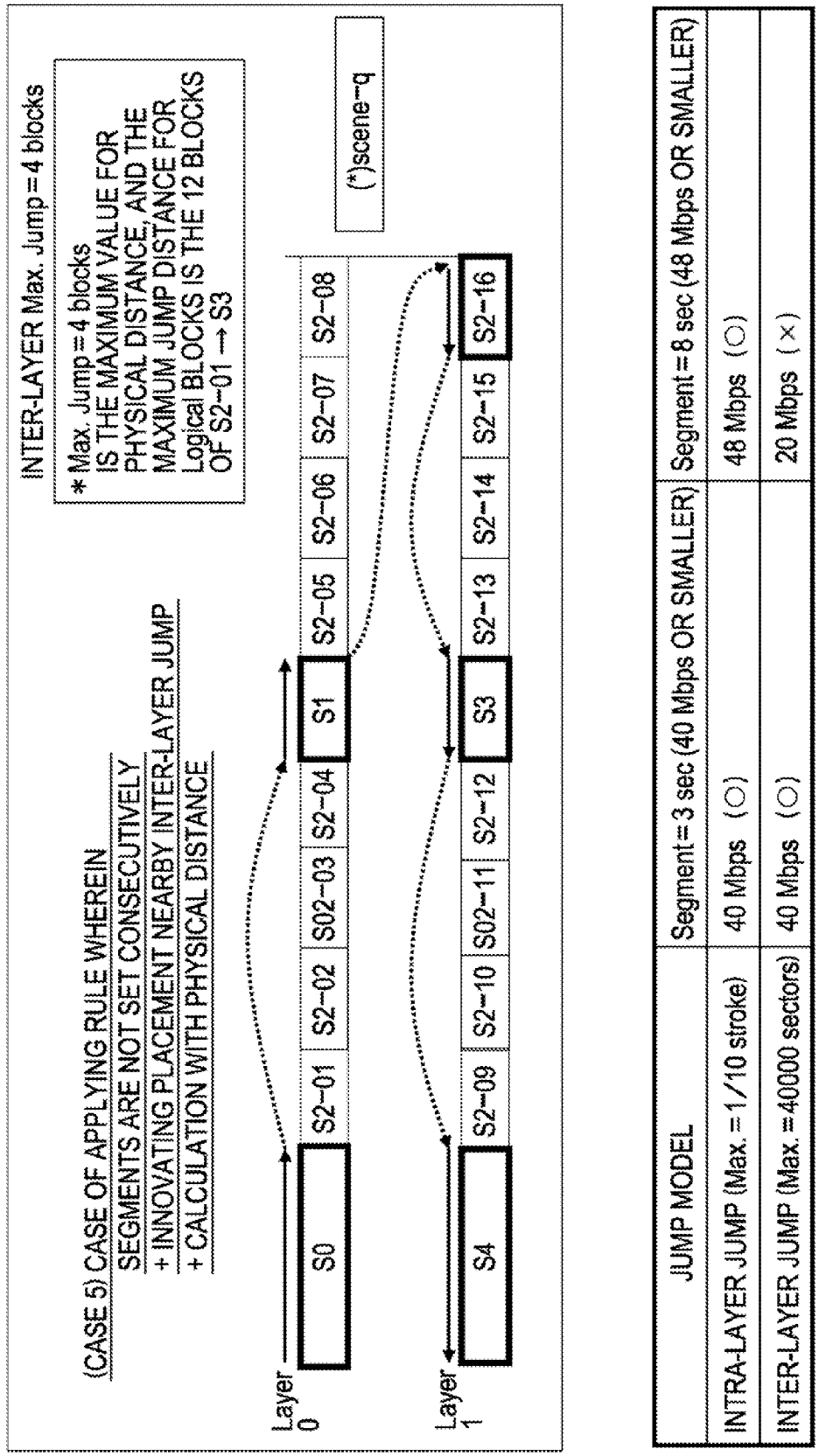
FIG. 31 is a diagram for describing a content placement example which satisfies seamless playback with contents to which a sequence key has been applied.

(Case 5) shown in FIG. 31 is a case in which as with the above-mentioned (Case 2), continuous settings of segments are prohibited, and further the maximum jump distance is set shortly in a portion where an inter-layer jump occurs, and the calculation of jump distance is performed by applying physical distance.

As shown in the drawing, an arrangement is made wherein the segment data made up of 16 variations of the segment 2 are divided into half, which are disposed in a layer 0 and a layer 1 respectively, and further, eight pieces of segment data divided and disposed in each layer are further divided into two, the playback data block of continuous scenes, in this case, blocks [S1] and [S3] are disposed at the divided portion of the segment 2. With this arrangement, the maximum physical jump distance which occurs in inter-layer jumps is four blocks. Realizable recording rates in this case are, as shown in the table, (A) Intra-layer jump (maximum jump distance=1/10 strokes)
   (a) Segment playback time=3.00 sec→40 Mbps
   (b) Segment playback time=8.00 sec→48 Mbps
   (A) Inter-layer jump (maximum jump distance=40000 sectors)
   (a) Segment playback time=3.00 sec→40 Mbps
   (b) Segment playback time=8.00 sec→20 Mbps This arrangement enables the jump distance of an inter-layer jump to be further reduced, whereby a recordable bit rate can be improved.

Next, description will be made regarding contents layout in the case of applying a sequence key with multi-angle contents with reference to FIG. 32. Multi-angle contents are made up of image data from various angles.

Figure 32:
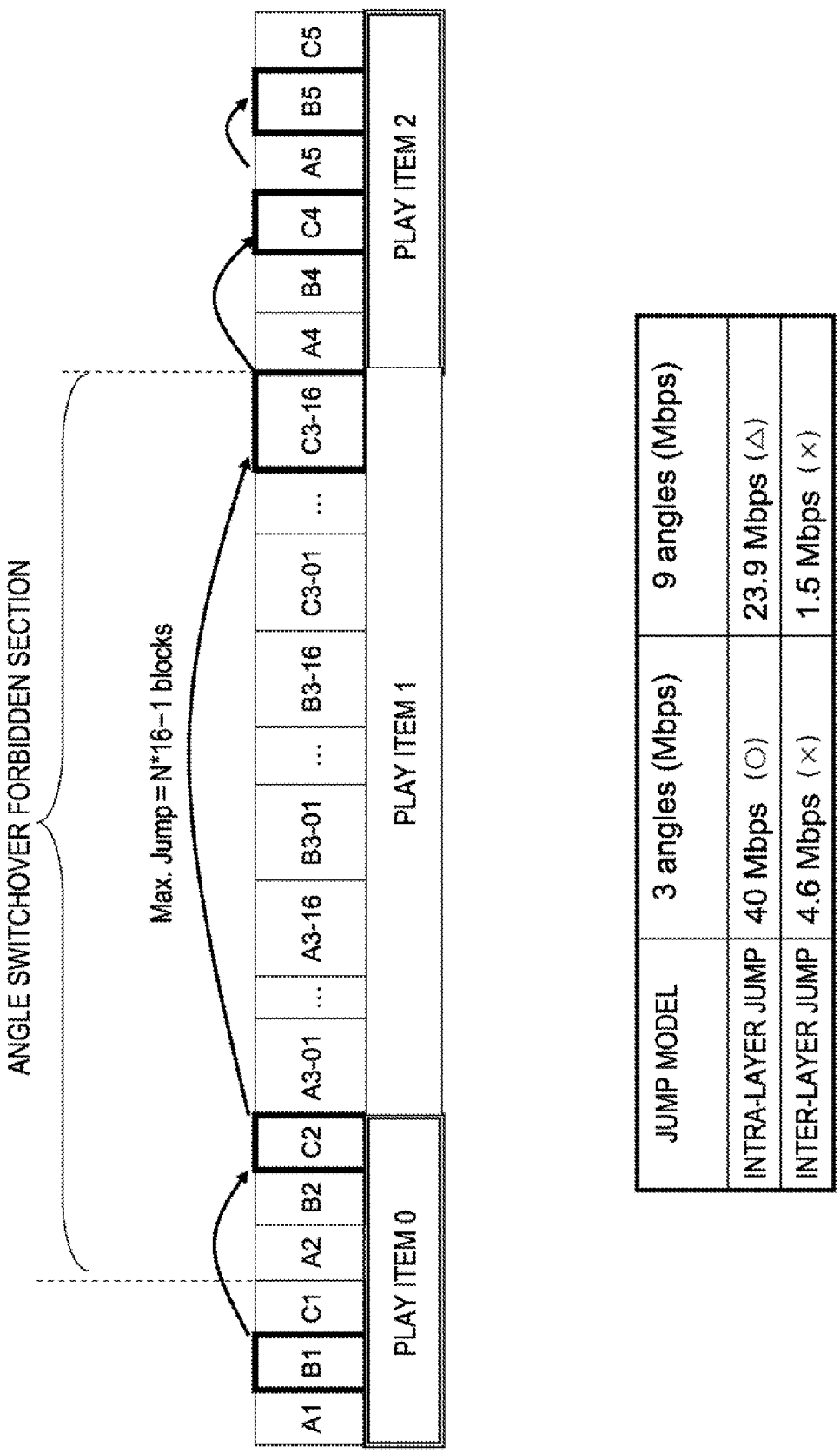
FIG. 32 is a diagram for describing a content placement example which satisfies seamless playback with contents to which a sequence key has been applied, in a case of multi-angle contents.

With a contents array shown in FIG. 32, a play item 0, a play item 1, and a play item 2 are play items each including multi-angle image data. With this example, an arrangement having three different pieces of angle image data of A, B, and C. The play item 1 has segment data. The play item 1 has the segment data of 16 variations as to each of angles A, B, and C, so consequently has the segment data of

3×16=48

In the event of such multi-angle contents, switching of angles is prohibited in a segment portion. That is to say, the immediately previous scene of the segment portion, for example, with the arrangement in the drawing, during the playback period of scene 2, (any of A2, B2, and C2) belonged to the play item 0, and the play item 1, switching of angles is prohibited. When setting of prohibition of switching of angles, the setting information of EP_map serving as contents playback control information is employed.

EP_map is the list of entry point (EP) data, which is extracted from an elementary stream and a transport stream. This has address information for finding out the place of an entry point to start decoding within an AV stream. One piece of EP data is made up of a pair of a presentation stamp (PTS), and the data address within the AV stream of the access unit corresponding to the PTS thereof. EP_map corresponding to multi-angle contents includes angle switching enable/disable setting flag [is_angle_change_point_flag], and with this setting, switching of angles is set to be prohibited, whereby switching of angles can be prevented in the immediately previous scene of a segment, and a segment portion.

Thus, the angle switching function of multi-angle is turned OFF, whereby contents using a sequence key can be created while suppressing deterioration of a bit rate even with multi-angle contents to the minimum. Specifically, when assuming that a segment made up 3 seconds, and contents are created at 40 Mbps or less, as shown in the table in FIG. 31, a bit rate is 40 Mbps or less in the case of three angles, and 23.9 Mbps or less in the case of nine angles. Note that as with the above-mentioned examples, this arrangement is premised on two conditions of a condition wherein segments are not set continuously, and a condition wherein no segment is set in an inter-layer jump portion.

FIG. 33 illustrates a setting example of a play list of multi-angle contents described with reference to FIG. 32. A play list includes information of
   whether or not multi-angle is employed: is_multi_angle=Yes
   connection condition: connection_condition=5
   number of angles: number_of_angles=3
   enable/disable of seamless angle switching: is_seamless_angle_change=Yes
   and each clip file name information.

The connection condition is information indicating a connection state between a preceding play item and the current play item. For example, this includes information relating to absence/presence of seamless connection.

Note that with regard to the play item 1, clip file names corresponding to the number of variations of a segment are described, which are equivalent to [A3-xx] through [C3-xx] shown in the drawing. Also, with regard to the play item 1,
   enable/disable of seamless angle switching: is_seamless_angle_change=No
is set. This means that seamless angle switching is prohibited. According to this information, prohibition of angle switching is set in a zone of segment data (A3-01 through C3-16) included in the angle switching prohibition zone of the play item 1 shown in FIG. 32.

In the event of prohibiting switching of angles as to the whole play item, such as the play item 1 of the play list shown in FIG. 33,
   enable/disable of seamless angle switching: is_seamless_angle_change=No
is set.

In the event of prohibiting switching of angles as to data A2 through C2 serving as a part of the play item 0 shown in FIG. 32, processing for prohibiting switching of angles is performed by setting the above-mentioned angle switching enable/disable setting flag of EP_map.

Figure 4:
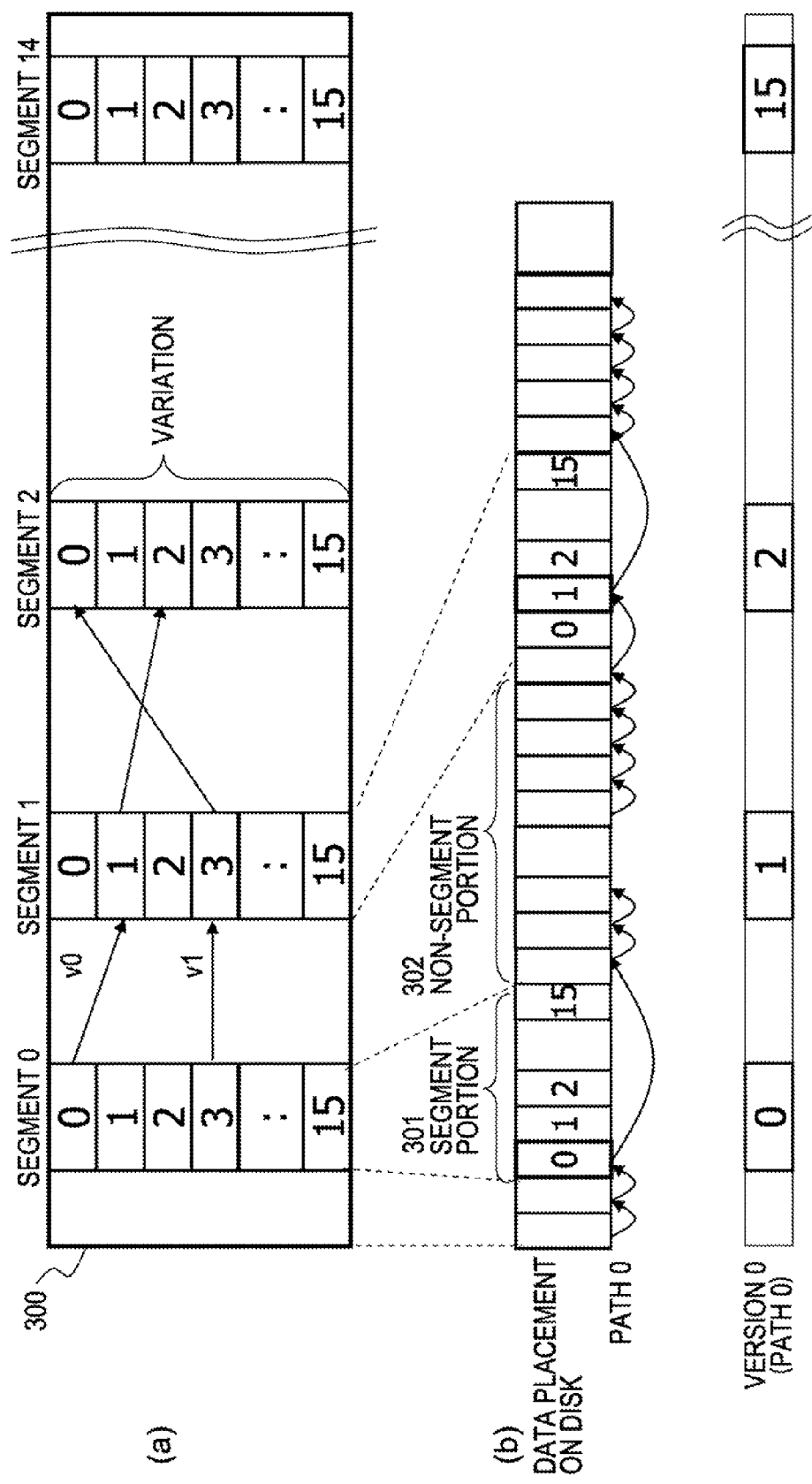
FIG. 4 is a diagram for describing a segment setting configuration for contents.

As described above, contents including segment data described with reference to FIG. 4 are recorded in an information recording medium (disc), and with an arrangement for playing this, as described above with reference to FIG. 19 through FIG. 27, the minimum segment data size, and the minimum segment playback time of segment data is calculated as a data placement condition, and based on these calculation results, further various types of data recording configuration are set described with reference to FIG. 28 through FIG. 32, whereby data recording ensuring seamless playback can be performed even with contents using a sequence key which needs switching of a segment key and a unit key.

[5. Content Recording Processing]

Figure 34:
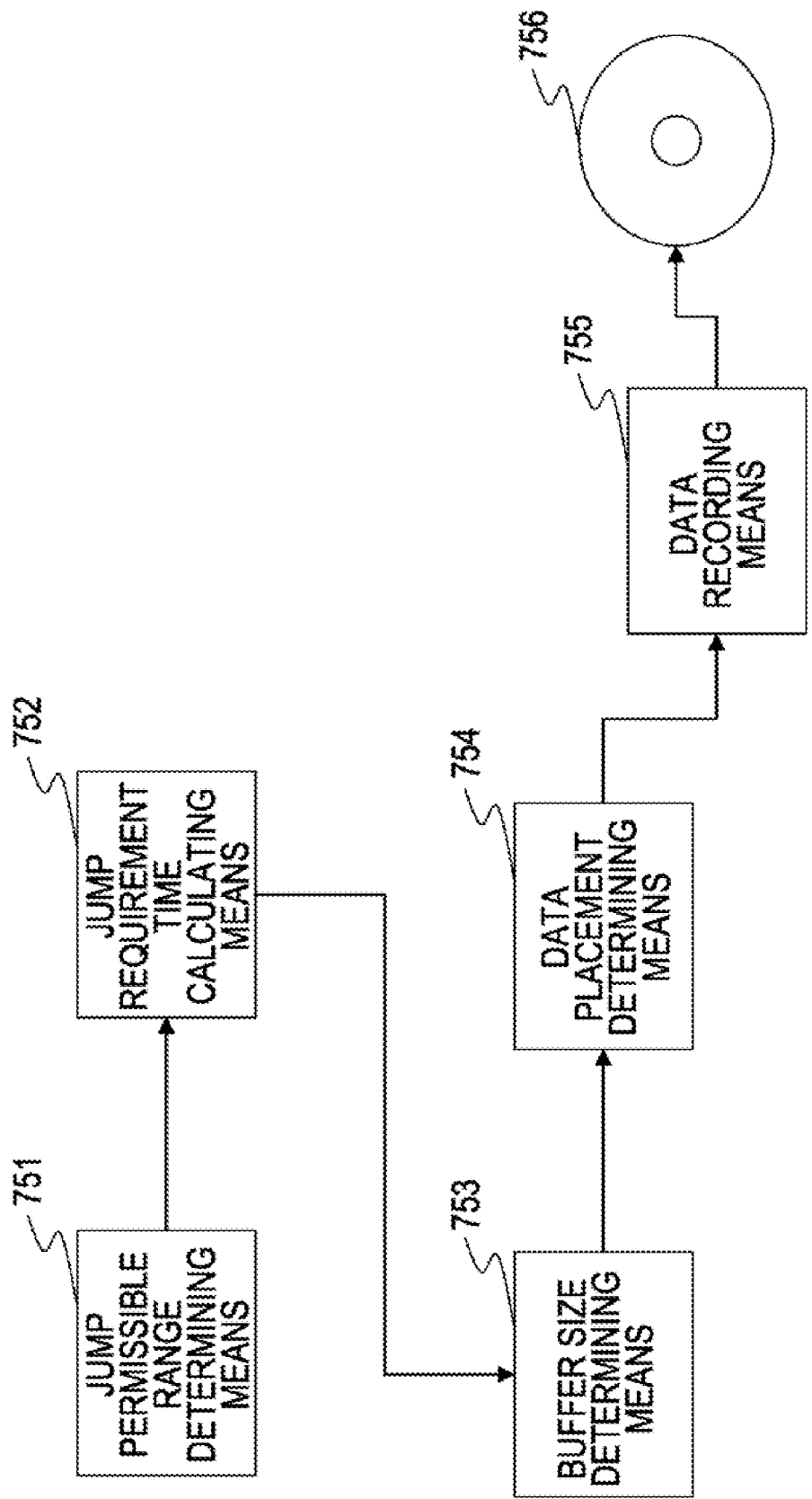
FIG. 34 is a diagram for describing a configuration example of an information processing device which performs generating of recording data as to an information recording medium.

Next, the configuration of the information processing device executing the above-described data processing will be described with reference to FIG. 34. The information processing device of the present invention is an information processing device for determining the data placement configuration in the event of recording sequence key usage content data requiring switching between the segment key and the unit key, having jump permissible range determining means 751, jump requirement time calculating means 752, buffer size determining means 753, data placement determining means 754, and data recording means 755, and writes data to an information recording medium 756.

The jump permissible range determining means 751 executes processing for determining the permissible range of intra-layer jumping and inter-layer jumping in playback processing of an information recording medium. For example, processing is performed for setting one of the jump models described with reference to FIG. 23.

The jump requirement time calculating means 752 calculates the amount of time required for intra-layer jumping or inter-layer jumping, based on the jump permissible range information determined with the jump permissible range determining means 751.

The jump requirement time calculating means 752 calculates the added values of seek time of a pickup, the overhead time accompanying processing of data in increments of blocks read out from the information recording medium, and the sequence key usage time, as the jump requirement time for intra-layer jumping, and calculates the added values of the pickup adjusting time accompanying inter-layer movement, the overhead time accompanying processing of data in increments of blocks read out from the information recording medium, and the sequence key usage time, as the jump requirement time for inter-layer jumping.

The buffer size determining means 753 determine the size of the data buffer which stored data read out from the information recording medium, based on the jump requirement time calculated with the jump requirement time calculating means 752.

The data placement determining means 754 determine data placement within the jump permissible range calculated with the jump permissible range determining means 751 so as to record content including segment data formed of multiple variations. The data placement aspect determines the data placement configuration of various settings described with reference to FIG. 28 through FIG. 32.

That is to say, the maximum jump distance executed between a segment portion and a non-segment portion in the event of playback processing determines placement of the segment data and the non-segment portion configuring data so as to be at or below a maximum jump distance set beforehand, with regard to content having a segment portion formed of segment data serving as encoded data of differing variation having application to individual segment keys, and a non-segment portion serving as encoded data having application to unit keys which are set corresponding to a content management unit set as content usage segmentation.

The data recording means 755 executes data recording as to the information recording medium 756 according to the data placement configuration determined by the above-described data placement determining means 754. That is to say, recording processing is executed as to the information recording medium 756 of the segment data and non-segment portion configuration data, based on the placement information determined with the data placement determining means 754.

Note that the data placement determining means 754 determines the placement of the segment data and non-segment portion configuration data so that the maximum jump distance executed between the segment portion and the non-segment portion in the event of playback processing is at or below the distance capable of jumping within the jump permissible time that has been set beforehand. The jump permissible time for the intra-layer jumping is determined based on the added values of seek time of a pickup, the overhead time accompanying processing of data in increments of blocks read out from the information recording medium, and the sequence key usage time which is application key switchover time occurring at the time of making transition between the configuring data of the segment data and the non-segment portion, and the jump permissible time for the inter-layer jumping is determined based on the added values of seek time of a pickup, pickup adjusting time accompanying inter-layer movement, overhead time accompanying processing of data in increments of blocks read out from the information recording medium, and sequence key usage time which is application key switchover time occurring at the time of making transition between data configuring the segment data and non-segment portion.

Also, as described before with reference to FIG. 28 through FIG. 31, the data placement determining means 754 determine various aspects of data placement configurations such as data placement not including a consecutive recording portion of multiple segment data belonging to different segments, data placement which does not include a recording portion spanning different recording layers for multiple segment data belonging to the same segment, and, in the event of performing divided recording on different recording layers for a plurality of segment data belonging to the same segment, data placement of non-segment portion data consecutively played at the segment to which the segment data belongs, either between segment data at a plurality of segment data positions being subjected to divided recording, or a position adjacent to segment data.

Also, in the event that the recorded contents are multi-angle contents including angle data, control information for forbidding angle switchover at a non-segment portion and segment portion immediately prior to a segment is generated and recorded to the information recording medium 756.

The information recording medium 756 thus generated stores, as recorded data, contents having a segment portion made up of segment data which is encrypted data of different variations regarding each of which an individual segment key has been applied, and a non-segment portion which is encrypted data to which has been applied a unit key that has been set corresponding to a content management unit set as a usage section of contents, wherein the placement of data configuring the segment data and non-segment portion is such that the maximum jump distance executed between the segment portion and the non-segment portion at the time of playback processing is equal to or smaller than a maximum jump distance that has been set beforehand. Specifically, the information recording medium 756 has the various types of data placement configuration described above with reference to FIG. 23 through FIG. 32.

Figure 35:
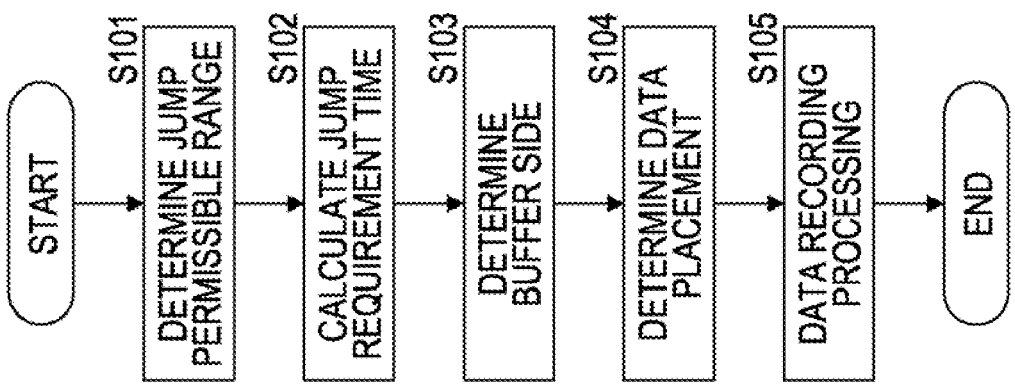
FIG. 35 is a diagram illustrating a flowchart for describing a data processing sequence for generating recording data as to an information recording medium.

Next, determination of data placement accompanying content recording, and a recording processing sequence will be described with reference to FIG. 35. This sequence is a sequence for determining the data placement configuration in the event of recording sequence key usage content data requiring switching between the segment key and the unit key onto an information recording medium.

First, in step S101, the jump permissible range executed with the playback processing of the information recording medium is determined. For example, processing for setting one of the jump models described with reference to FIG. 23 is performed.

Next, in step S102, the jump requirement time is calculated. The required time for intra-layer jumping and inter-layer jumping is calculated based on the jump permissible range determining information determined in step Specifically, with regard to an intra-layer jump, the added values of seek time of a pickup, the overhead time accompanying processing of data in increments of blocks read out from the information recording medium, and the sequence key usage time are calculated as jump requirement time, and with regard to an inter-layer jump, the added values of seek time of a pickup, pickup adjusting time accompanying inter-layer movement, overhead time accompanying processing of data in increments of blocks read out from the information recording medium, and sequence key usage time are calculated as jump requirement time.

In step S103, the buffer size for storing the data read out from the information recording medium is determined based on the jump requirement time calculated in step S102.

In step S104, the data placement for the contents stored in the information recording medium is determined. That is to say, the data placement is determined such that contents including segment data made up of multiple variations are recorded within a jump permissible range.

In step S105, data recording to the information recording medium is performed according to the data placement configuration determined in the data placement determining step of step S104.

With playback of the contents stored in the information recording medium by the above-described processing, seamless continuous playback can be performed without causing data interruption even if a jump occurs.

[6. Configuration Example of Information Processing Device]

Figure 36:
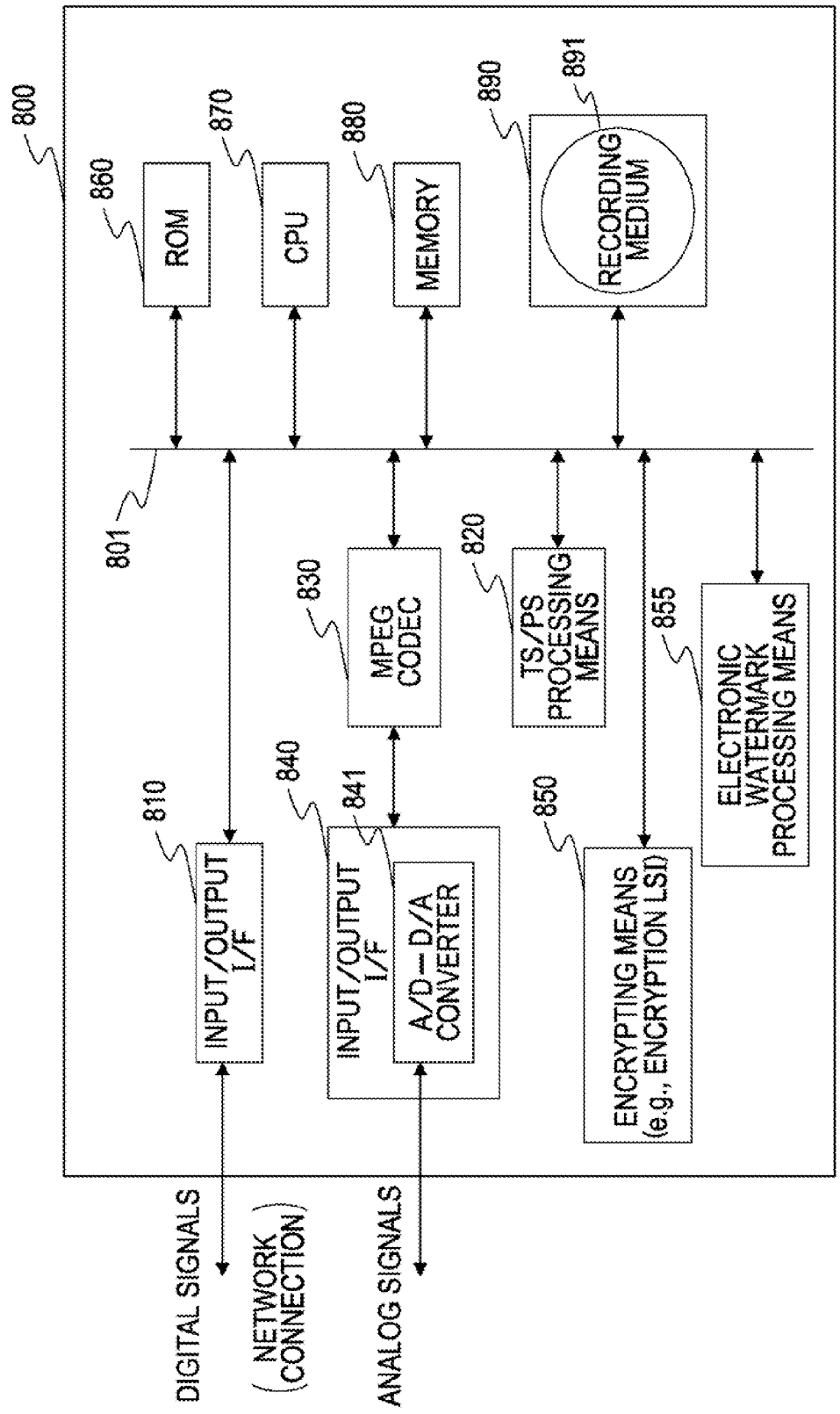
FIG. 36 is a diagram for describing a configuration example of an information processing device which performs data recording processing in an information recording medium or playback from an information recording medium.

Next, description is made regarding a configuration example of the information processing device configured to execute the above-described data processing, mounting an information recording medium to perform data recording playback processing, with reference to FIG. 36. The information processing device described in FIG. 34 is a block diagram for describing the functions of the present invention, and the information processing device shown in FIG. 36 is a diagram for describing a specific hard configuration for executing the functions described in FIG. 34.

An information processing device 800 comprises a drive 890 configured to drive an information recording medium 891 and perform input/output of data recording/playback signals, a CPU 870 configured to execute data processing according to various programs, ROM 860 serving as a storage area for programs, parameters, and the like, memory 880, an input/output interface 810 configured to input and output digital signals, an input/output interface 840 configured to input and output analog signals and which has an A/D, D/A converter 841, an MPEG codec 830 configured to execute encoding and decoding processing of MPEG data, TS/PS processing means 820 configured to execute TS (Transport Stream)/PS (Program Stream) processing, encrypting processing means 850 configured to execute various types of encryption processing, and electronic watermark processing means 855, wherein the blocks are each connected to a bus 801. Note that the electronic watermark processing means is necessary for a configuration performing generating of recording data at an authoring facility or disk factory or the like to perform contents editing, and is not a configuration necessarily needed for an information processing device executing normal data playback.

Description will be made regarding the operation at time of data recording. Two cases of recording data can be assumed as digital signal input and analog signal input.

In the case of digital signals, a signal is input from the digital signal input/output interface 810, is converted to a data format for storing by the CPU 870 and TS/PS processing means 820, and performs data converting processing to an MPEG 2 format, for example, with the MPEG codec 830. Next, encryption processing is performed by the encryption processing means 850. Encryption processing is executed as encryption processing applying a CPS unit key and segment key, as described above. The necessary key data is generated to perform encryption processing. The data encrypted by the encryption processing means 850 is stored in an information recording medium 891.

In the case of analog signals, an analog signal input into the input/output interface 840 becomes a digital signal with the A/D converter 841, and is converted to a codec used during recording by the MPEG codec 830. Subsequently, the signal is converted to an AV multiplex data having a format of the recording data, subjected to encryption processing by the encryption processing means 850, and stored in the recording medium 891.

Next, description will be made regarding processing in the case of performing data playback from the information recording medium. In the case of playback of AV stream data made up of MPEG-TS data for example, the data read out from the information recording medium 891 at the drive 890 is identified as contacts management unit, following which the necessary key data is generated at the encryption processing means 850 and decryption processing with the applicable keys is executed. That is to say, processing is performed to obtain the unit key and segment key corresponding to the content management unit, and the encryption processing with the applicable keys is performed at the encryption processing means 850 based on the obtained unit key or segment key.

The encrypted contents data is subsequently divided into various data such as Video, Audio, subtitles, and so forth by the TS (Transport Stream)/PS (Program Stream) processing means 820. Further, the digital data encrypted at the MPEG codec 830 is converted to an analog signal by the D/A converter 841 within the input/output interface 840 and output. Also, in the case of performing digital output, the MPEG-TS data passes through the input/output interface 810 and is output as digital data. The output in this case is made to a digital interface such as IEEE 1394, an Ethernet cable, a wireless LAN, or the like. Note that the input/output interface 810 provides a network connection function in the case of corresponding to a network connection function. Also, in the case of converting data to a format receivable by an output destination device within the playback apparatus and outputting, the Video, Audio, subtitles and the like which have been temporarily divided at the TS/PS processing means 820 are subjected to rate conversion and codec conversion processing applied at the MPEG codec 830, whereby the data subjected to multiplexing at the MPEG-TS or MPEG-PS again at the TS/PS processing means 820 is output from the digital input/output interface 810. Also, codec or multiplexing files other than MPEG can be converted using the CPU 870 and output from the digital input/output interface 810.

Note that a program configured to execute playback processing and recording processing is stored in the ROM 860, and memory 880 is used as necessary for parameter and data storage and a work area while executing programs. Note that FIG. 30 is described showing a device configuration capable of data recording and playback, but device only with playback function or a device only with recording function may also be configured, and the present invention can be applied to these devices as well.

The present invention has been described as above, with reference to specific embodiments. However, it goes without saying that one skilled in the art can make modifications or substitutions to these embodiments within the range of the intent of the present invention. That is to say, the present invention has been disclosed as a description of examples, and should not be interpreted to be limited to this. In order to determine the essence of the present invention, the section of the Claims should be referenced.

Note that the string of processing described in the specification can be executed with hardware, software, or a combined configuration of the two. In the case of executing processing with software, a program storing the processing sequence can be installed in memory within a computer built into dedicated hardware, and executed, or a program can be installed in a general-use computer capable of executing various processing, and executed.

For example, a program can be recorded beforehand to a hard disk or ROM (Read Only Memory) serving as a recording medium. Alternatively, the program can be temporarily or permanently stored (recorded) on a removable recording medium such as a flexible disk, CD-ROM (Compact Disc Read Only Memory), MO (Magneto-optical) disk, DVD (Digital Versatile Disc), magnetic disk, semiconductor memory and so forth. Such removable recording medium can be provided as so-called packaged software.

Note that other than installing a program from a removable recording medium onto a computer as described above, the program can be wirelessly transmitted from a download site to the computer, or transmitted by wire to the computer via a network such as a LAN (Local Area Network), the Internet, or the like, whereby the computer receives the program thus transmitted and installs the program to an internal recording medium such as a hard disk.

Note that the various processing described in the specification is not only to be executed in time-sequence according to the description therein, but can be executed in parallel or independently, according to processing capabilities of the device performing the processing or as necessary. Also, according to the present specification, system means a theoretical collective configuration of multiple devices, and is not restricted to each device being configured within the same housing.

Industrial Applicability

As described above, according to the configuration of the present invention, an arrangement is made wherein, with regard to contents having a segment portion made up of segment data which is encrypted data of different variations regarding each of which an individual segment key has been applied, and a non-segment portion which is encrypted data to which has been applied a unit key that has been set corresponding to a content management unit set as a usage section of contents, the placement of data configuring the segment data and non-segment portion is determined such that the maximum jump distance executed between the segment portion and the non-segment portion at the time of playback processing is equal to or smaller than a maximum jump distance that has been set beforehand. Therefore, even in the case of selecting and setting one piece of segment data from the segment portion and executing playback processing along various paths, seamless playback without playback interruption can be realized.

According to the configuration of the present invention, permissible jump distance is calculated based on jump permissible time, wherein the jump permissible time for the intra-layer jumping is determined based on the added values of seek time of a pickup, the overhead time accompanying processing of data in increments of blocks read out from the information recording medium, and the sequence key usage time which is application key switchover time occurring at the time of making transition between data configuring of the segment data and the non-segment portion, and the jump permissible time for the inter-layer jumping is determined based on the added values of seek time of a pickup, pickup adjusting time accompanying inter-layer movement, overhead time accompanying processing of data in increments of blocks read out from the information recording medium, and sequence key usage time which is application key switchover time occurring at the time of making transition between data configuring the segment data and non-segment portion, thereby a data placement configuration is arranged so that jump between a segment and a non-segment portion within this jump distance is executable, so even in the case of executing playback processing along various paths, seamless playback without playback interruption can be realized.

Also, according to the present invention, various configurations of data placement are provided, such as data placement not including a consecutive recording portion of multiple segment data belonging to different segments, data placement which does not include a recording portion spanning different recording layers for multiple segment data belonging to the same segment, and, in the event of performing divided recording on different recording layers for multiple segment data belonging to the same segment, data placement of non-segment portion data consecutively played at the segment, either between segment data subjected to divided recording, or a position adjacent to segment data. Also, according to an arrangement wherein, in the event that the recorded contents are multi-angle contents, control information for forbidding angle switchover at a segment portion and non-segment portion immediately prior to a segment is generated and recorded to the information recording medium, thereby realizing seamless playback of content playback.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing device comprising:
a processor; and
a memory device storing instructions which when executed by the processor, causes the processor to, for an information recording medium:
(a) determine a placement of a plurality of contents which include a segment data portion and a non-segment data portion, the placement being such that a maximum jump distance which is executed between said segment portion and said non-segment data portion at the time of playback processing is equal to or smaller than a preset maximum jump distance, the plurality of contents including:
(i) the segment data portion, the segment data portion including:

(A) first segment data which is first encrypted data of a first variation and is encrypted by a first segment key; and (B) second, different segment data which is second, different encrypted data of a second, different variation and is encrypted by a second, different segment key; and (ii) the non-segment data portion, the non-segment data portion being third, different encrypted data which has been applied a unit key that has been set corresponding to a content management unit set as a usage section of contents;

(b) execute, using the placement of the plurality of contents, recording processing of the plurality of contents to the information recording medium; and (c) in an event of performing divided recording on different recording layers for a plurality of segment data belonging to the segment data portion, determine data placement of the non-segment data portion either at a first position between the plurality of segment data or a second position adjacent to the plurality of segment data.

2. The information processing device of claim 1, wherein the instructions, when executed by the processor, cause the processor to determine said segment data portion and non-segment data portion such that the maximum jump distance is equal to or smaller than a distance which can be jumped within a preset jump permissible time, wherein:

(a) for intra-layer jumping, the preset jump permissible time is determined based on:
  (i) added values of seek time of a pickup;
  (ii) overhead time accompanying processing of data in increments of blocks read out from the information recording medium; and
  (iii) sequence key usage time which is application key switchover time occurring at the time of making transition between data configuring said segment data portion and non-segment data portion; and (b) for inter-layer jumping, the preset jump permissible time is determined based on:
  (i) the added values of seek time of a pickup;
  (ii) pickup adjusting time accompanying inter-layer movement;
  (iii) overhead time accompanying processing of data in increments of blocks read out from the information recording medium; and
  (iv) sequence key usage time which is application key switchover time occurring at the time of making transition between data configuring said segment data portion and non-segment data portion.

3. A method of operating an information processing device including a plurality of instructions, said method comprising:

(a) causing a processor to execute the instructions to, for an information recording medium, determine a placement of a plurality of contents which include a segment data portion and a non-segment data portion, the determined placement being such that a maximum jump distance which is executed between said segment portion and said non-segment data portion at the time of playback processing is equal to or smaller than a preset maximum jump distance, the plurality of contents including:
  (i) the segment data portion, the segment data portion including:
    (A) first segment data which is first encrypted data of a first variation and is encrypted by a first segment key; and
    (B) second, different segment data which is second, different encrypted data of a second, different variation and is encrypted by a second, different segment key;
  (ii) the non-segment data portion, the non-segment data portion being third, different encrypted data which has been applied a unit key that has been set corresponding to a content management unit set as a usage section of contents;

(b) causing the processor to execute the instructions to execute, using the placement of the plurality of contents, recording processing of the plurality of contents to the information recording medium; and (c) causing the processor to execute the instructions to determine, in an event of performing divided recording on different recording layers for a plurality of segment data belonging to the segment data portion, determine data placement of the non-segment data portion either at a first position between the plurality of segment data or a second position adjacent to the plurality of segment data.

4. The method of claim 3, which includes causing the processor to execute the instructions to determine said segment data portion and non-segment data portion such that the maximum jump distance is equal to or smaller than a distance which can be jumped within a preset jump permissible time, wherein:

(a) for intra-layer jumping, the preset jump permissible time is determined based on:
  (i) added values of seek time of a pickup;
  (ii) overhead time accompanying processing of data in increments of blocks read out from the information recording medium; and
  (iii) sequence key usage time which is application key switchover time occurring at the time of making transition between data configuring said segment data portion and non-segment data portion; and (b) for inter-layer jumping, the preset jump permissible time is determined based on:
  (i) the added values of seek time of a pickup;
  (ii) pickup adjusting time accompanying inter-layer movement;
  (iii) overhead time accompanying processing of data in increments of blocks read out from the information recording medium; and
  (iv) sequence key usage time which is application key switchover time occurring at the time of making transition between data configuring said segment data portion and non-segment data portion.

5. A non-transitory computer readable medium storing instructions structured to cause a computer to:

(a) determine a placement of a plurality of contents which include a segment data portion and a non-segment data portion, the determined placement being such that a maximum jump distance which is executed between said segment portion and said non-segment data portion at the time of playback processing is equal to or smaller than a preset maximum jump distance, the plurality of contents including:
  (i) the segment data portion, the segment data portion including:
    (A) first segment data which is first encrypted data of a first variation and is encrypted by a first segment key; and (B) second, different segment data which is second, different encrypted data of a second, different variation and is encrypted by a second, different segment key;

(ii) the non-segment data portion, the non-segment data portion being third, different encrypted data which has been applied a unit key that has been set corresponding to a content management unit set as a usage section of contents;

(b) execute, using the placement of the plurality of contents, recording processing of the plurality of contents; and (c) in an event of performing divided recording on different recording layers for a plurality of segment data belonging to the segment data portion, determine data placement of the non-segment data portion either at a first position between the plurality of segment data or a second position adjacent to the plurality of segment data.

6. An information processing device comprising:

a processor; and a memory device storing instructions which when executed by the processor, causes the processor to, for an information recording medium:

(a) determine a placement of a plurality of contents which include a segment data portion and a non-segment data portion, the placement being such that a maximum jump distance which is executed between said segment portion and said non-segment data portion at the time of playback processing is equal to or smaller than a preset maximum jump distance, the plurality of contents including:

(i) the segment data portion, the segment data portion including:

(A) first segment data which is first encrypted data of a first variation and is encrypted by a first segment key; and (B) second, different segment data which is second, different encrypted data of a second, different variation and is encrypted by a second, different segment key; and (ii) the non-segment data portion, the non-segment data portion being third, different encrypted data which has been applied a unit key that has been set corresponding to a content management unit set as a usage section of contents;

(b) execute, using the placement of the plurality of contents, recording processing of the plurality of contents to the information recording medium; and (c) in an event that the recorded plurality of contents are multi-angle contents including angle data, generate and record control information for forbidding angle switchover.

7. A method of operating an information processing device including a plurality of instructions, said method comprising:

(a) causing a processor to execute the instructions to, for an information recording medium, determine a placement of a plurality of contents which include a segment data portion and a non-segment data portion, the determined placement being such that a maximum jump distance which is executed between said segment portion and said non-segment data portion at the time of playback processing is equal to or smaller than a preset maximum jump distance, the plurality of contents including:

(i) the segment data portion, the segment data portion including:

(A) first segment data which is first encrypted data of a first variation and is encrypted by a first segment key; and (B) second, different segment data which is second, different encrypted data of a second, different variation and is encrypted by a second, different segment key;

(ii) the non-segment data portion, the non-segment data portion being third, different encrypted data which has been applied a unit key that has been set corresponding to a content management unit set as a usage section of contents; and (b) causing the processor to execute the instructions to execute, using the placement of the plurality of contents, recording processing of the plurality of contents to the information recording medium; and (c) causing the processor to execute the instructions to, in an event that the recorded contents are multi-angle contents including angle data, generate and record control information for forbidding angle switchover.

8. A non-transitory computer readable medium storing instructions structured to cause a computer to:

(a) determine a placement of a plurality of contents which include a segment data portion and a non-segment data portion, the determined placement being such that a maximum jump distance which is executed between said segment portion and said non-segment data portion at the time of playback processing is equal to or smaller than a preset maximum jump distance, the plurality of contents including:

(i) the segment data portion, the segment data portion including:

(A) first segment data which is first encrypted data of a first variation and is encrypted by a first segment key; and (B) second, different segment data which is second, different encrypted data of a second, different variation and is encrypted by a second, different segment key;

(ii) the non-segment data portion, the non-segment data portion being third, different encrypted data which has been applied a unit key that has been set corresponding to a content management unit set as a usage section of contents;

(b) execute, using the placement of the plurality of contents, recording processing of the plurality of contents; and (c) in an event that the recorded contents are multi-angle contents including angle data, generate and record control information for forbidding angle switchover.

* * * * *